(12) United States Patent
Arai et al.

(10) Patent No.: US 10,840,506 B2
(45) Date of Patent: *Nov. 17, 2020

(54) NEGATIVE ELECTRODE ACTIVE MATERIAL FOR ELECTRICAL DEVICE AND ELECTRICAL DEVICE USING THE SAME

(71) Applicant: Nissan Motor Co., Ltd., Yokohama (JP)

(72) Inventors: Masaya Arai, Kanagawa (JP); Nobutaka Chiba, Kanagawa (JP); Youichi Yoshioka, Kanagawa (JP); Manabu Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/309,848

(22) PCT Filed: Jun. 16, 2016

(86) PCT No.: PCT/JP2016/068017
§ 371 (c)(1),
(2) Date: Dec. 13, 2018

(87) PCT Pub. No.: WO2017/216940
PCT Pub. Date: Dec. 21, 2017

(65) Prior Publication Data
US 2019/0173081 A1 Jun. 6, 2019

(51) Int. Cl.
*H01M 4/38* (2006.01)
*C22C 28/00* (2006.01)
(Continued)

(52) U.S. Cl.
CPC ............ *H01M 4/386* (2013.01); *C22C 28/00* (2013.01); *H01M 4/134* (2013.01); *H01M 4/38* (2013.01);
(Continued)

(58) Field of Classification Search
CPC . H01M 4/386; H01M 4/134; H01M 2004/027
See application file for complete search history.

(56) References Cited

U.S. PATENT DOCUMENTS

| 2006/0040182 A1 | 2/2006 | Kawakami et al. |
| 2007/0020521 A1 | 1/2007 | Obrovac et al. |

(Continued)

FOREIGN PATENT DOCUMENTS

| CN | 101179126 A | 5/2008 |
| CN | 103403926 A | 11/2013 |

(Continued)

*Primary Examiner* — Andrew J. Oyer
(74) *Attorney, Agent, or Firm* — Young Basile Hanlon & MacFarlane, P.C.

(57) ABSTRACT

A negative electrode active material containing a Si-containing alloy having a composition to be represented by Chemical Formula (1): $Si_xSn_yM_zAl_wA_a$ (in Chemical Formula (1) above, M is one or two or more transition metal elements, A is an unavoidable impurity, and x, y, z, w, and a represent values of percentage by mass, where y, z, and w are $2 \leq y \leq 10$, $25 \leq z \leq 35$, and $0.3 \leq w \leq 3$, respectively, and x and a are remainder) is used in an electrical device, providing a means capable of improving the cycle durability of the electrical device such as a lithium ion secondary battery.

15 Claims, 55 Drawing Sheets

(51) Int. Cl.
*H01M 4/134* (2010.01)
*H01M 4/02* (2006.01)
*H01M 10/0525* (2010.01)

(52) U.S. Cl.
CPC ...... *C01P 2002/85* (2013.01); *C01P 2004/03* (2013.01); *C01P 2004/04* (2013.01); *H01M 2004/027* (2013.01)

(56) References Cited

U.S. PATENT DOCUMENTS

| | | |
|---|---|---|
| 2008/0113271 A1 | 5/2008 | Ueda et al. |
| 2010/0270497 A1 | 10/2010 | Hezeque et al. |
| 2013/0302691 A1 | 11/2013 | Sawada |
| 2014/0353546 A1 | 12/2014 | Watanabe et al. |
| 2014/0370386 A1 | 12/2014 | Hirono et al. |
| 2015/0303450 A1* | 10/2015 | Miki ............... C22C 30/04 429/217 |
| 2015/0303451 A1 | 10/2015 | Miki et al. |

FOREIGN PATENT DOCUMENTS

| | | |
|---|---|---|
| CN | 104170127 A | 11/2014 |
| CN | 104798227 A | 7/2015 |
| JP | 2001297757 A | 10/2001 |
| JP | 2004311429 A | 11/2004 |
| JP | 2012038708 A | 2/2012 |
| WO | 2006129415 A1 | 12/2006 |
| WO | 2013115223 A1 | 8/2013 |
| WO | WO-2014080885 A1 * | 5/2014 ............ H01M 4/583 |

* cited by examiner

FIG.2
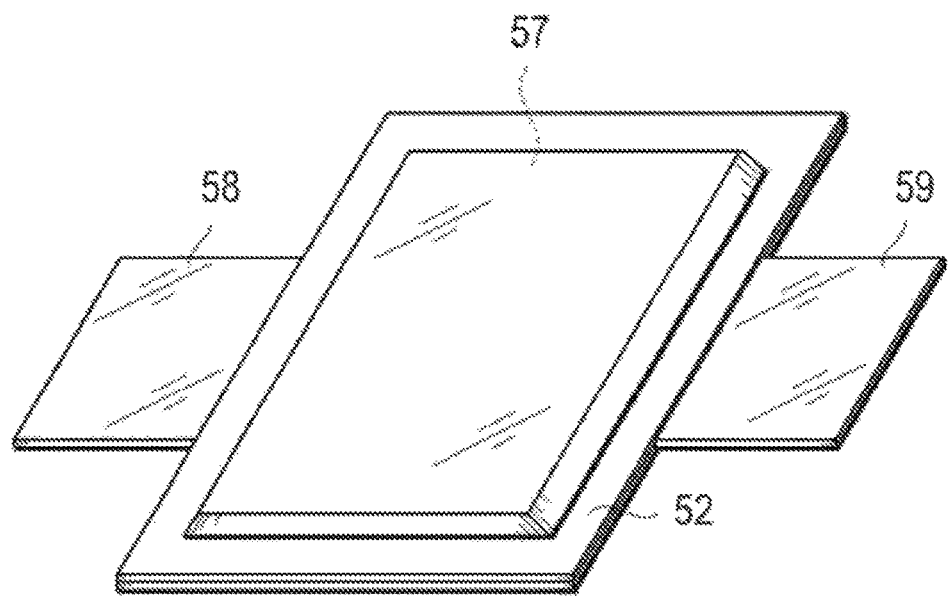
FIG.3
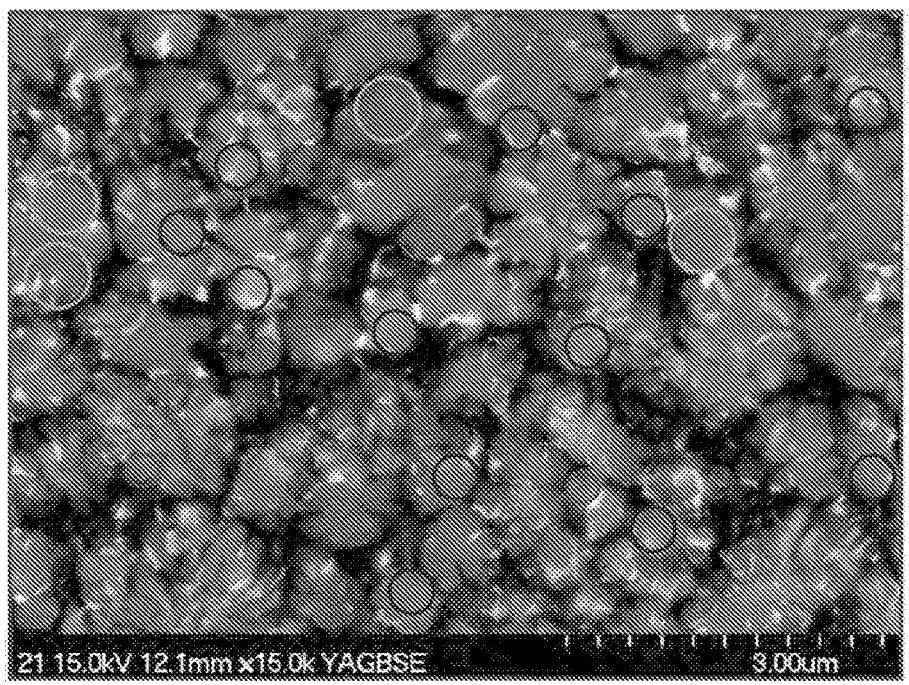
RADIUS 160nm
≒ DIAMETER 320nm
MODAL RADIUS 220nm
≒ DIAMETER 440nm
RADIUS 300nm
≒ DIAMETER 600nm

FIG.4A
BF-STEM Image
FIG.4B
HAADF-STEM Image
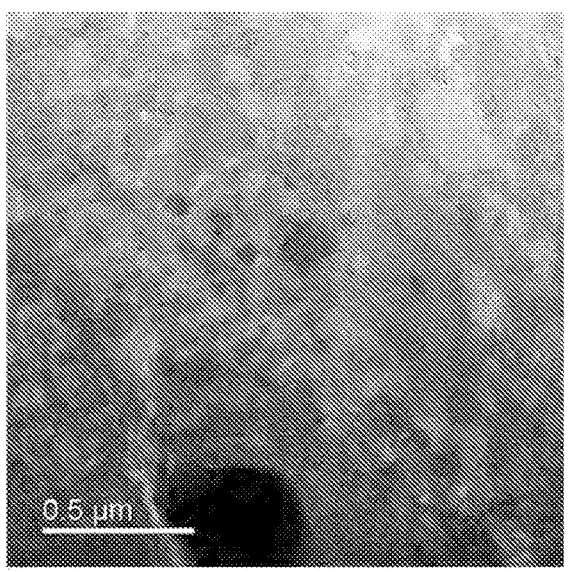
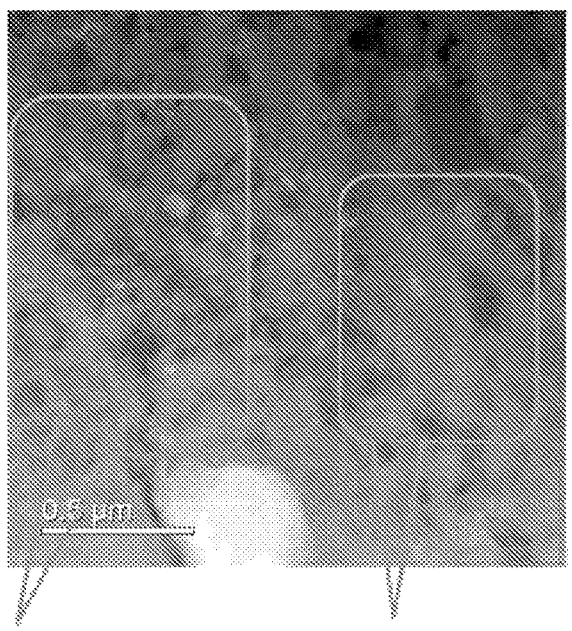
EUTECTIC (TiSi2-Si)   PROEUTECTIC TiSi2
FIG.5A
HAADF-STEM Image
FIG.5E
Red;Ti, Green;Sn, Blue;Si
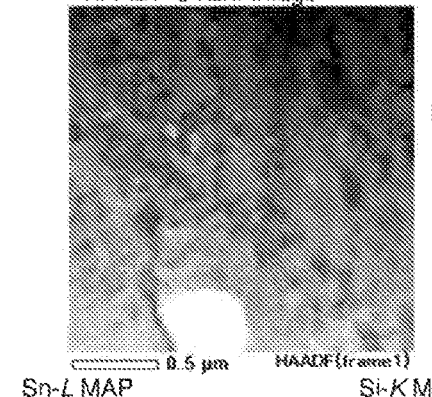
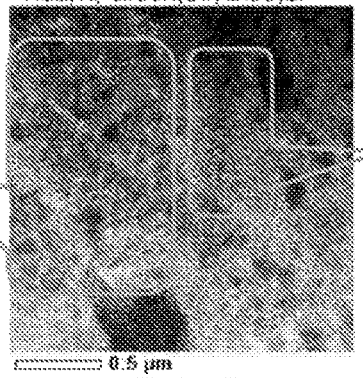
EUTECTIC (TiSi2-Si)   PROEUTECTIC TiSi2
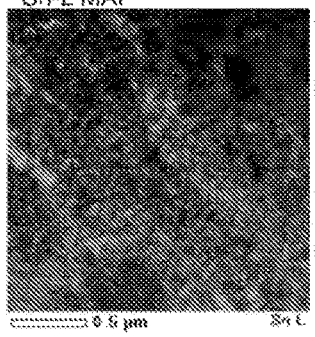
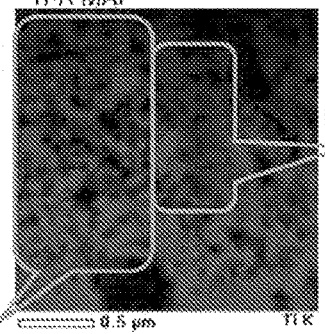
Sn-L MAP    Si-K MAP    Ti-K MAP
PROEUTECTIC TiSi2
EUTECTIC (TiSi2-Si)
FIG.5B    FIG.5C    FIG.5D

FIG.8A
BF-STEM Image
FIG.8B
HAADF-STEM Image
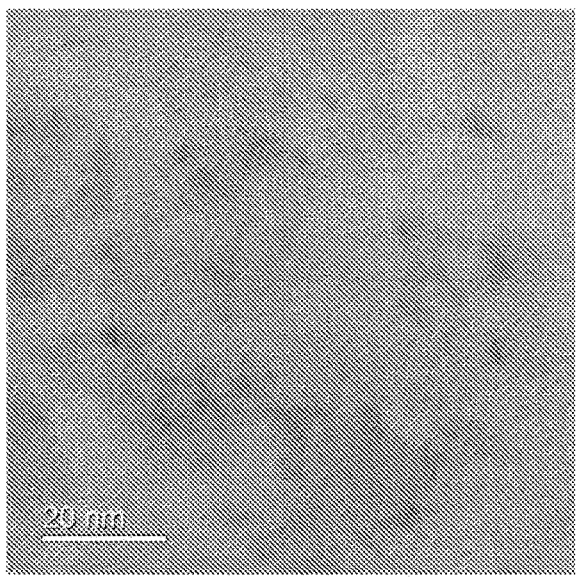
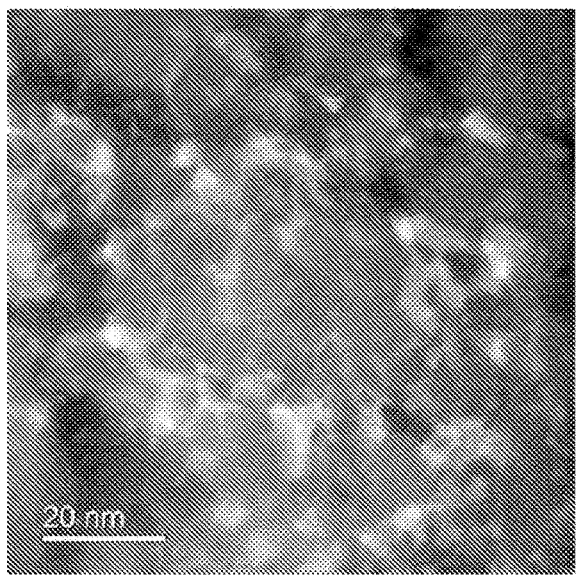
FIG.9A
HAADF-STEM Image
FIG.9E
Red:Ti, Green:Sn, Blue:Si
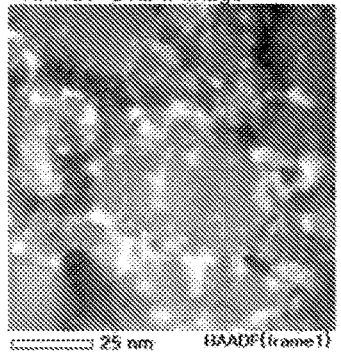
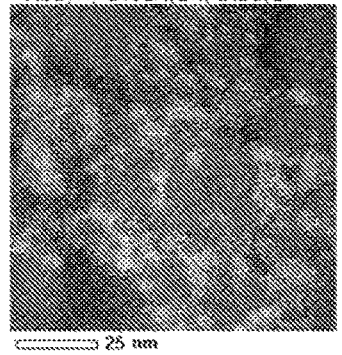
PLACE WITHOUT Ti
⇒ EUTECTIC Si PHASE
Sn-L MAP
Si-K MAP
Ti-K MAP
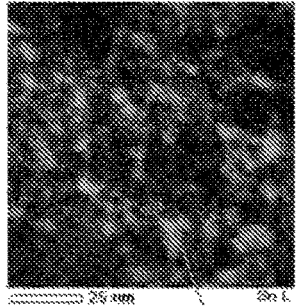
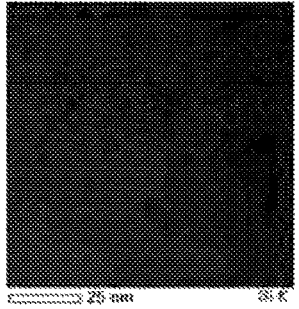
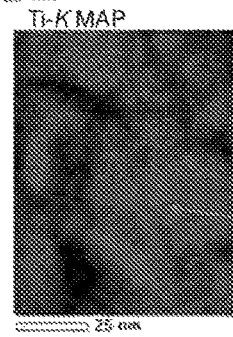
PLACE WITH GREAT AMOUNT OF Ti
⇒ EUTECTIC TiSi2 PHASE
Sn IS FINELY DISPERSED AS Al ENTERS
FIG.9B
FIG.9C
FIG.9D FIG.10A
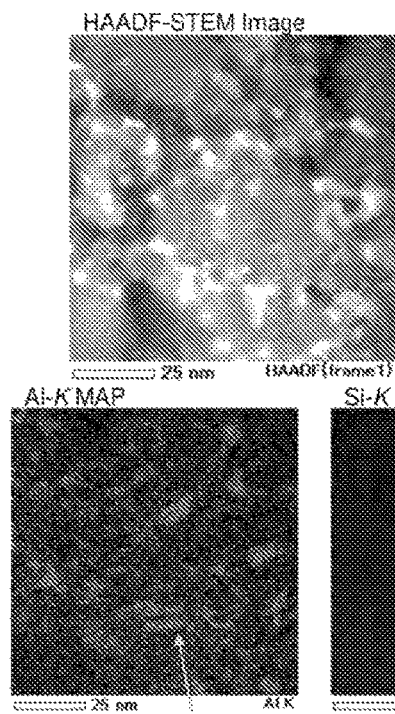
FIG.10E
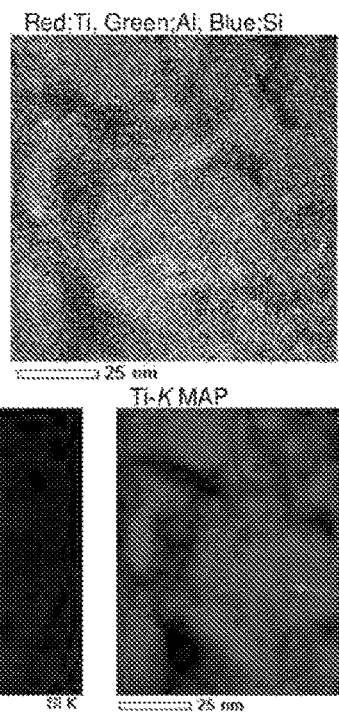
FIG.10B  FIG.10C  FIG.10D
FIG.11A
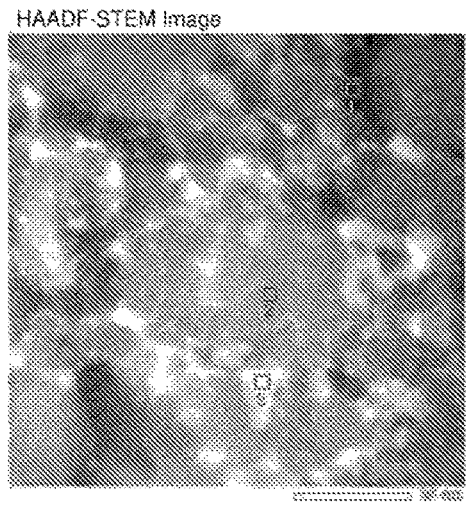
FIG.11B
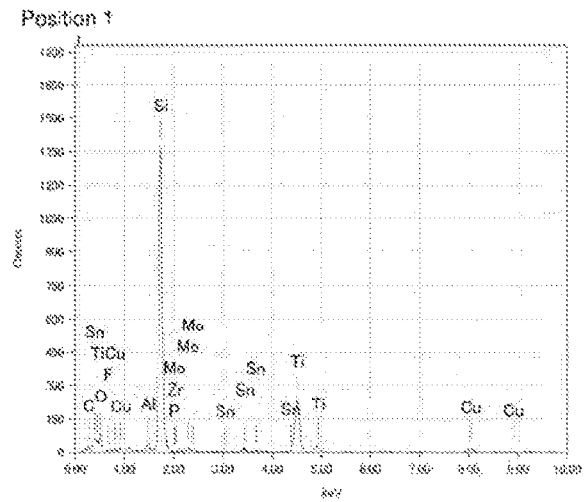

FIG.12A
FIG.12B
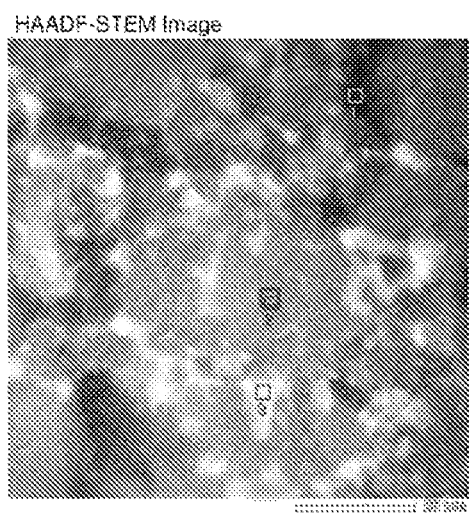
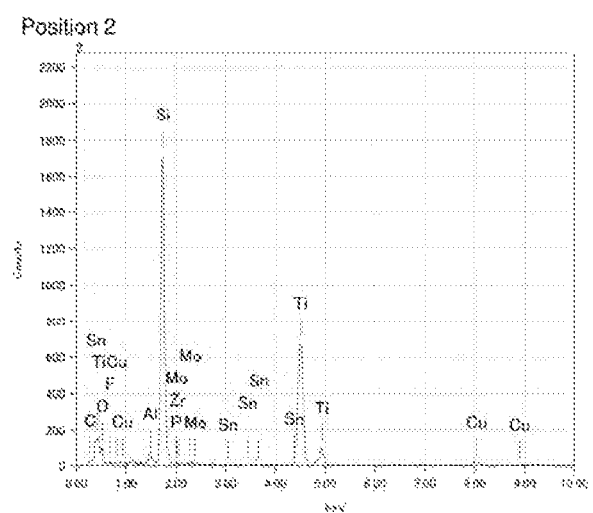

FIG.13A
BF-STEM Image
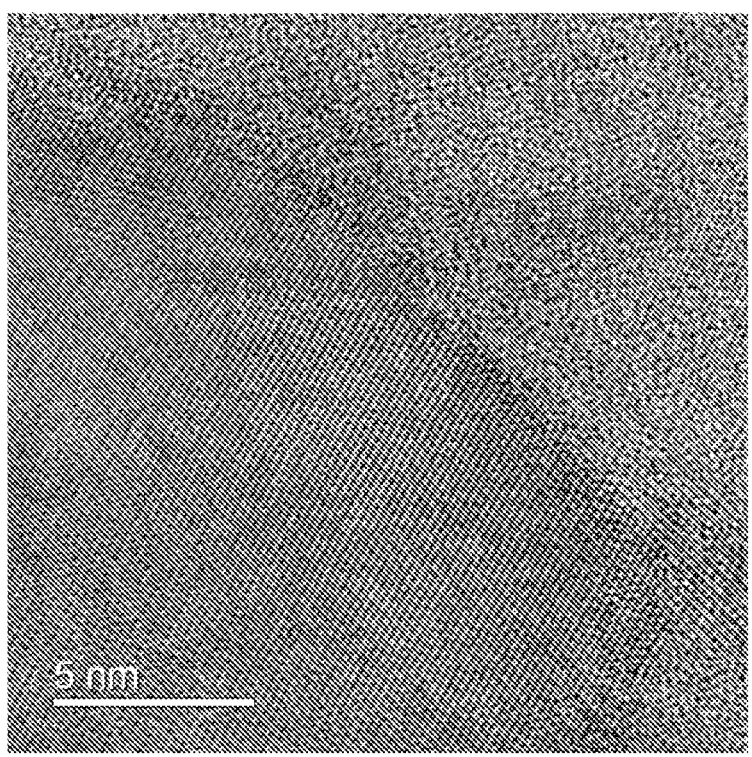
FIG.13B
EUTECTIC PORTION TiSi2 PHASE
FFT pattern 1
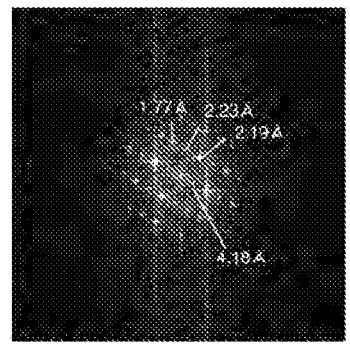
EUTECTIC PORTION Si PHASE
(AMORPHOUS Si)
FFT pattern 2
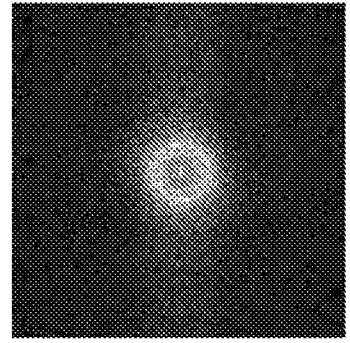
FIG.13C

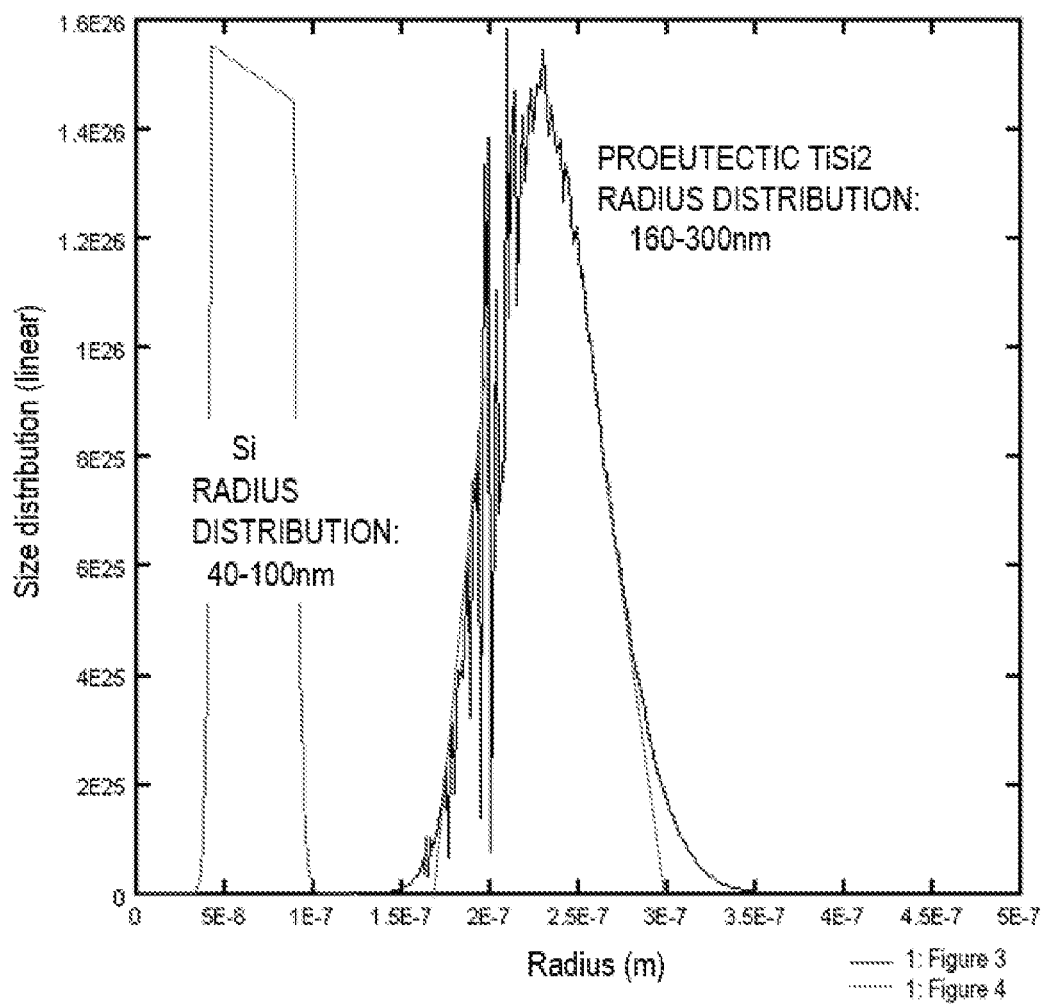

EUTECTIC TiSi2 / TOTAL TiSi2 = 0.468

TTT DIAGRAM FOR PRECIPITATION OF Si OF Si64.6-Sn14.2-Ti18.0-Al3.2
(LIQUID PHASE COMPOSITION OF Si60.0-Sn8.1-Ti30.1-Al1.8 AT START OF EUTECTIC FORMATION)

| | |
|---|---|
| $T_m$: MELTING TEMPERATURE [K] | 1,566 |
| $T_g$: GLASS TRANSITION TEMPERATURE [K] | 940 |
| $H_m^f$: MELTING ENTHALPY [J/mol] | 25,064 |
| $R_c$: CRITICAL COOLING VELOCITY [K/s] (Vol. Frac. 1E-06) | 187,598,189 |

FIG.16A
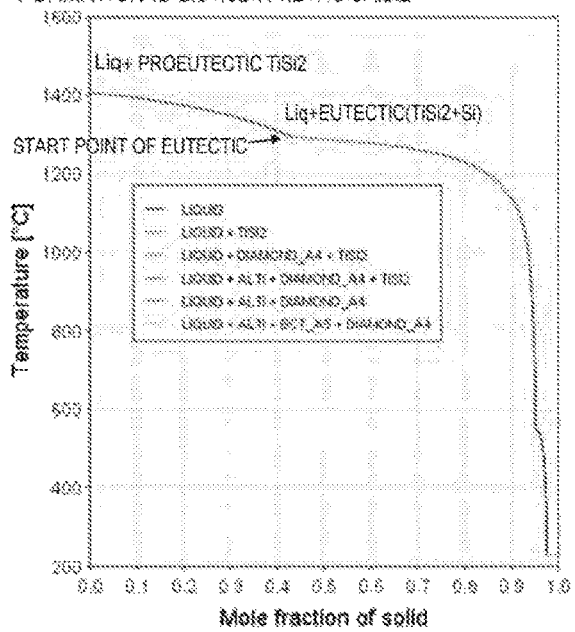
FIG.16C
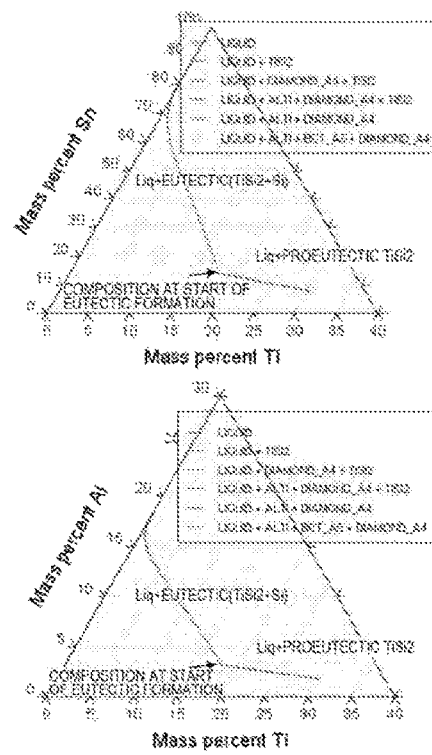
FIG.16B
FIG.17
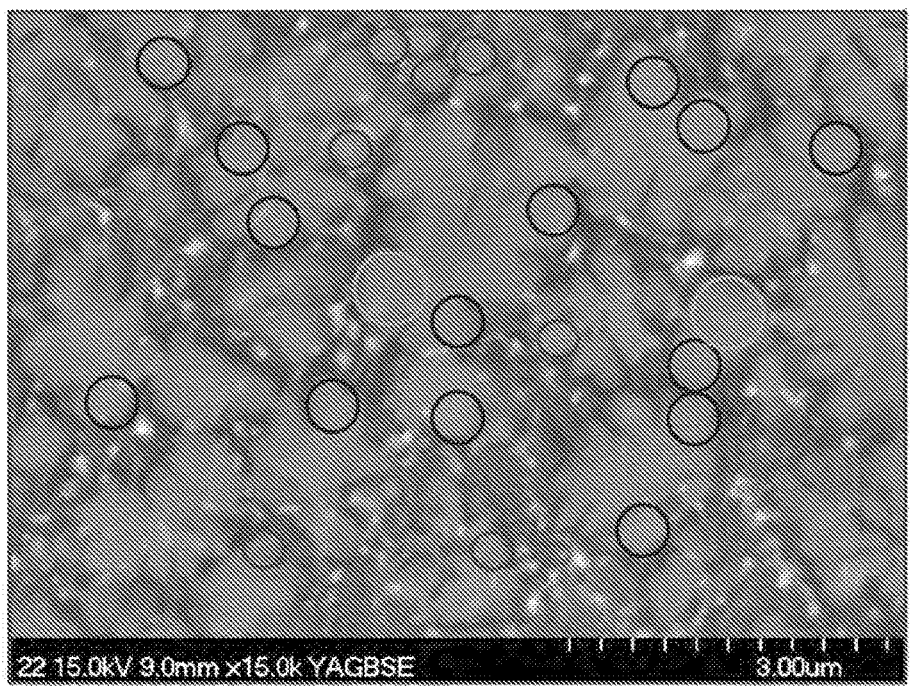
RADIUS 190nm
≒ DIAMETER 380nm
MODAL RADIUS 250nm
≒ DIAMETER 500nm
RADIUS 340nm
≒ DIAMETER 680nm

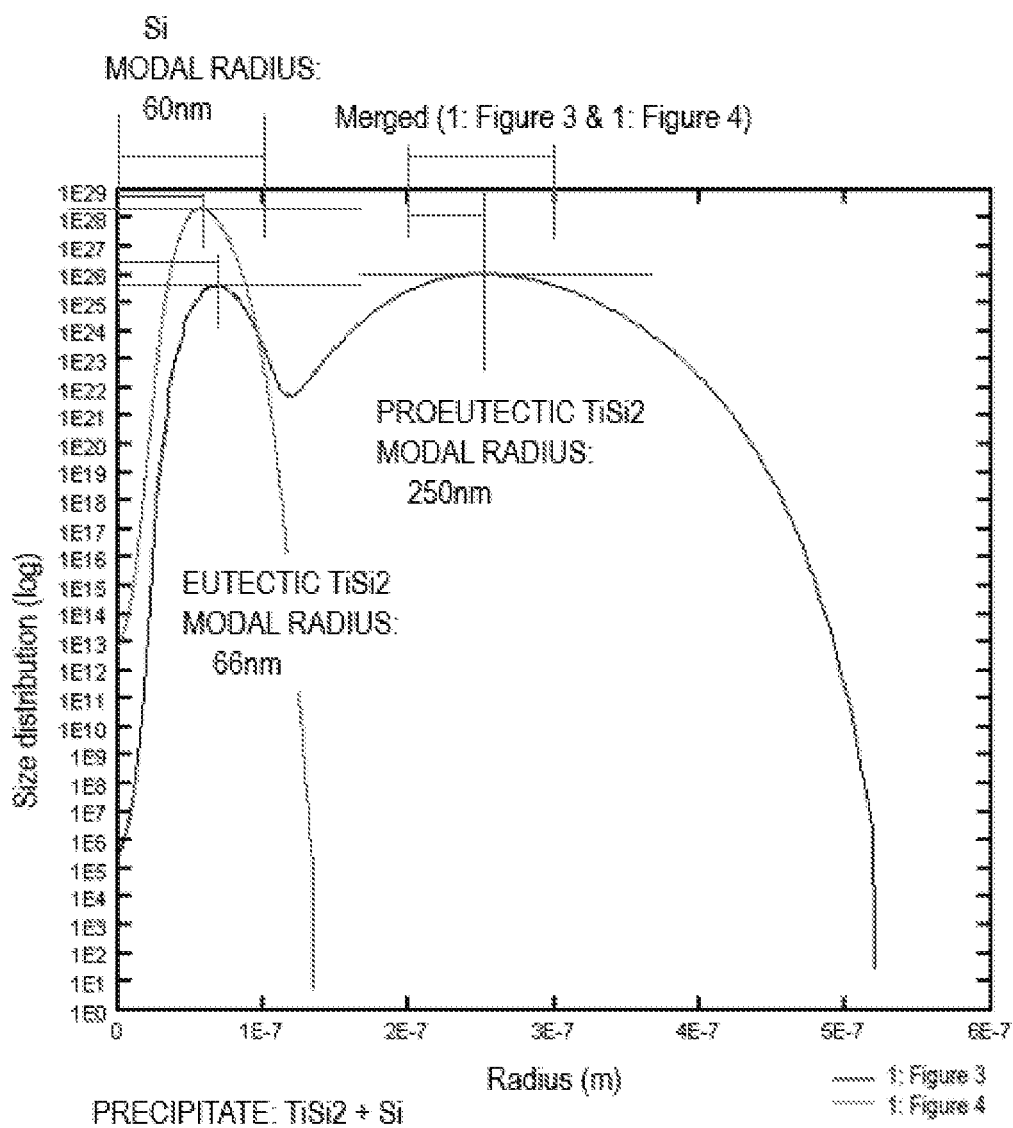

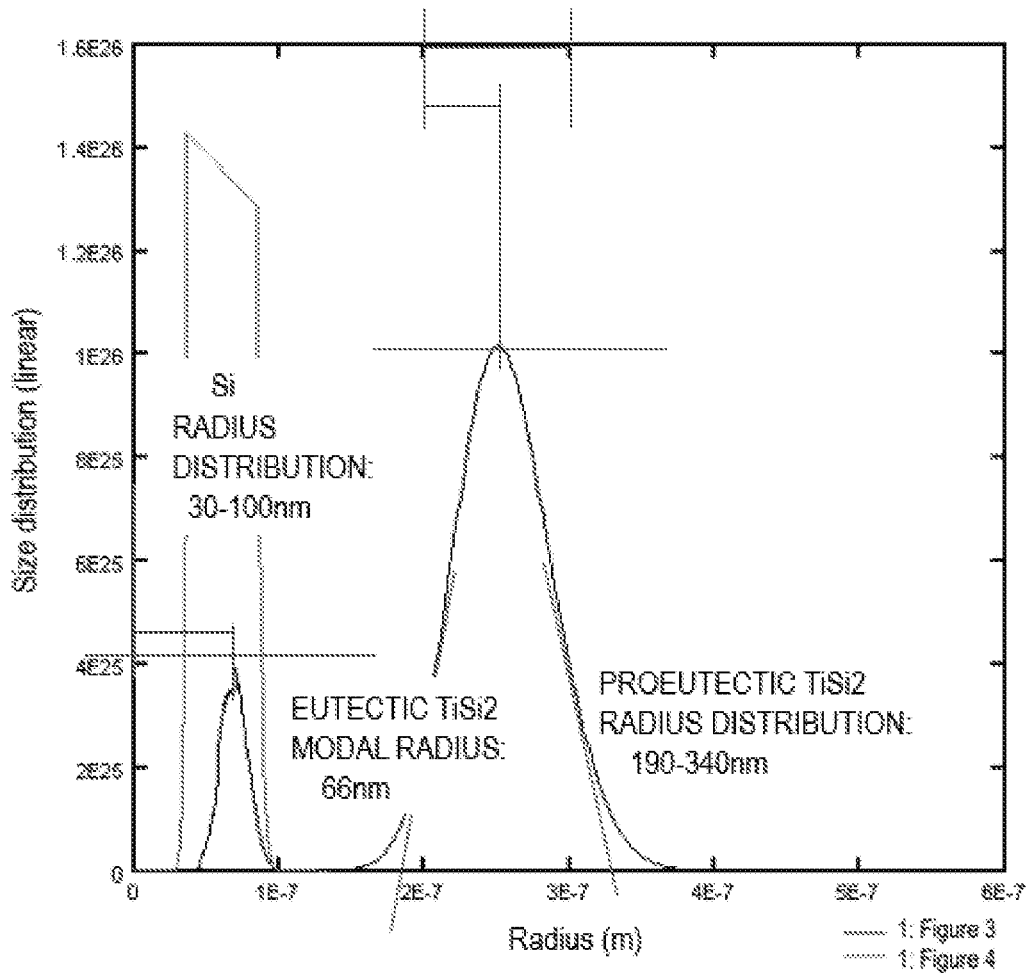

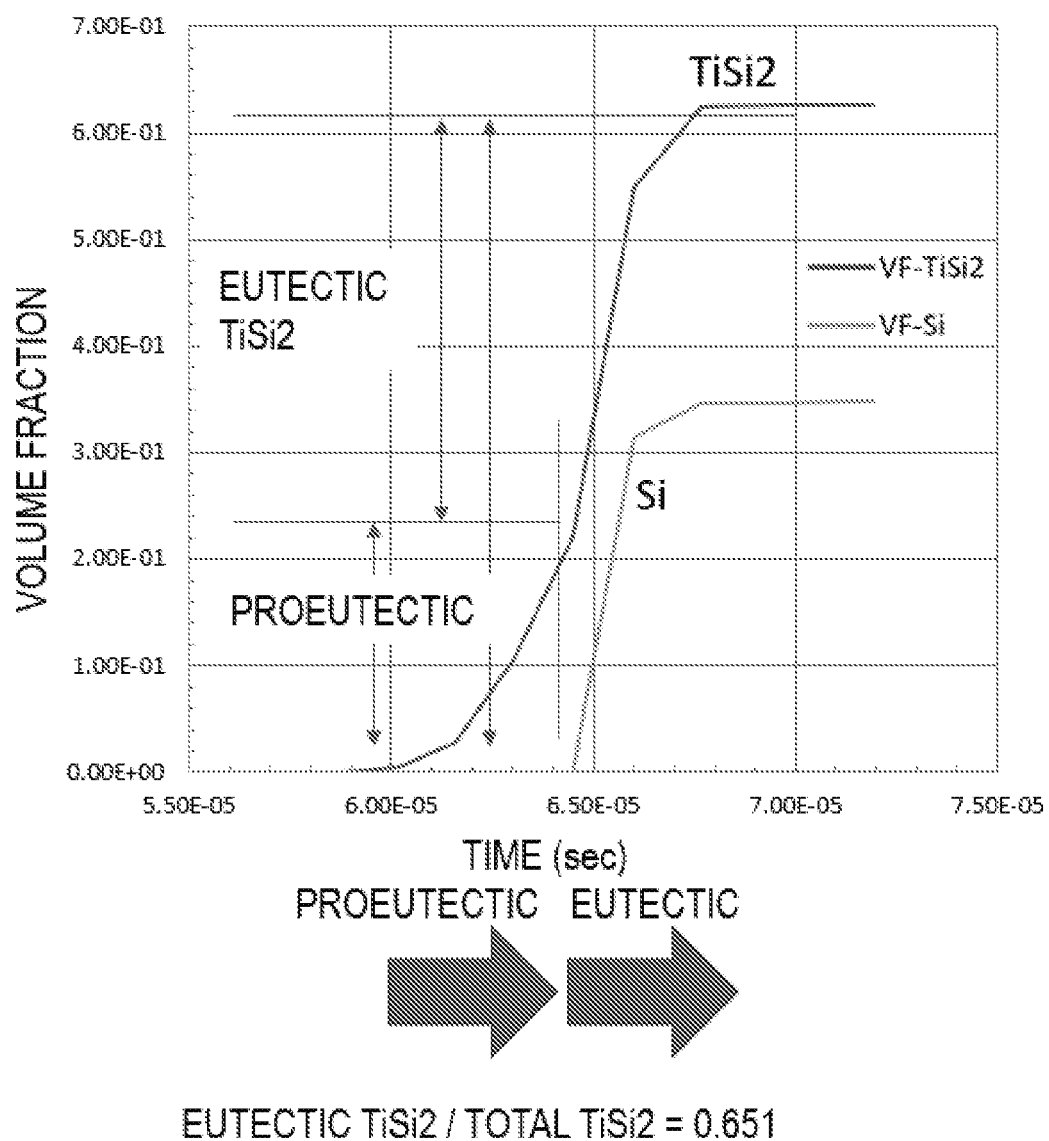

TTT DIAGRAM FOR PRECIPITATION OF Si OF Si70.9-Sn7.8-Ti20.6-Al0.6
(LIQUID PHASE COMPOSITION OF Si64.7-Sn5.0-Ti29.9-Al0.4 AT
START OF EUTECTIC FORMATION)

| | |
|---|---:|
| $T_m$: Melting Temperature [K] | 1,590 |
| $T_g$: Glass Transition Temperature [K] | 954 |
| $H_m^f$: Melting Enthalpy [J/mol] | 24,525 |
| $R_c$: Critical Cooling Velocity [K/s] (Vol. Frac. 1E-06) | 264,269,183 |

TTT DIAGRAM FOR PRECIPITATION OF Si OF Si70.3-Sn8.1-Ti19.8-Al1.8 (LIQUID PHASE COMPOSITION OF Si64.0-Sn4.9-Ti30.0-Al1.1 AT START OF EUTECTIC FORMATION)

| | |
|---|---:|
| $T_m$: Melting Temperature [K] | 1,583 |
| $T_g$: Glass Transition Temperature [K] | 950 |
| $H_m^f$: Melting Enthalpy [J/mol] | 24,977 |
| $R_c$: Critical Cooling Velocity [K/s] (Vol. Frac. 1E-06) | 207,791,944 |

TTT DIAGRAM FOR PRECIPITATION OF Si OF Si70.7-Sn7.9-Ti20.4-Al0.95
(LIQUID PHASE COMPOSITION OF Si64.6-Sn5.0-Ti29.8-Al0.6 AT
START OF EUTECTIC FORMATION)

| | |
|---|---:|
| $T_m$: Melting Temperature [K] | 1,588 |
| $T_g$: Glass Transition Temperature [K] | 953 |
| $H_m^f$: Melting Enthalpy [J/mol] | 24,642 |
| $R_c$: Critical Cooling Velocity [K/s] (Vol. Frac. 1E-06) | 248,141,268 |

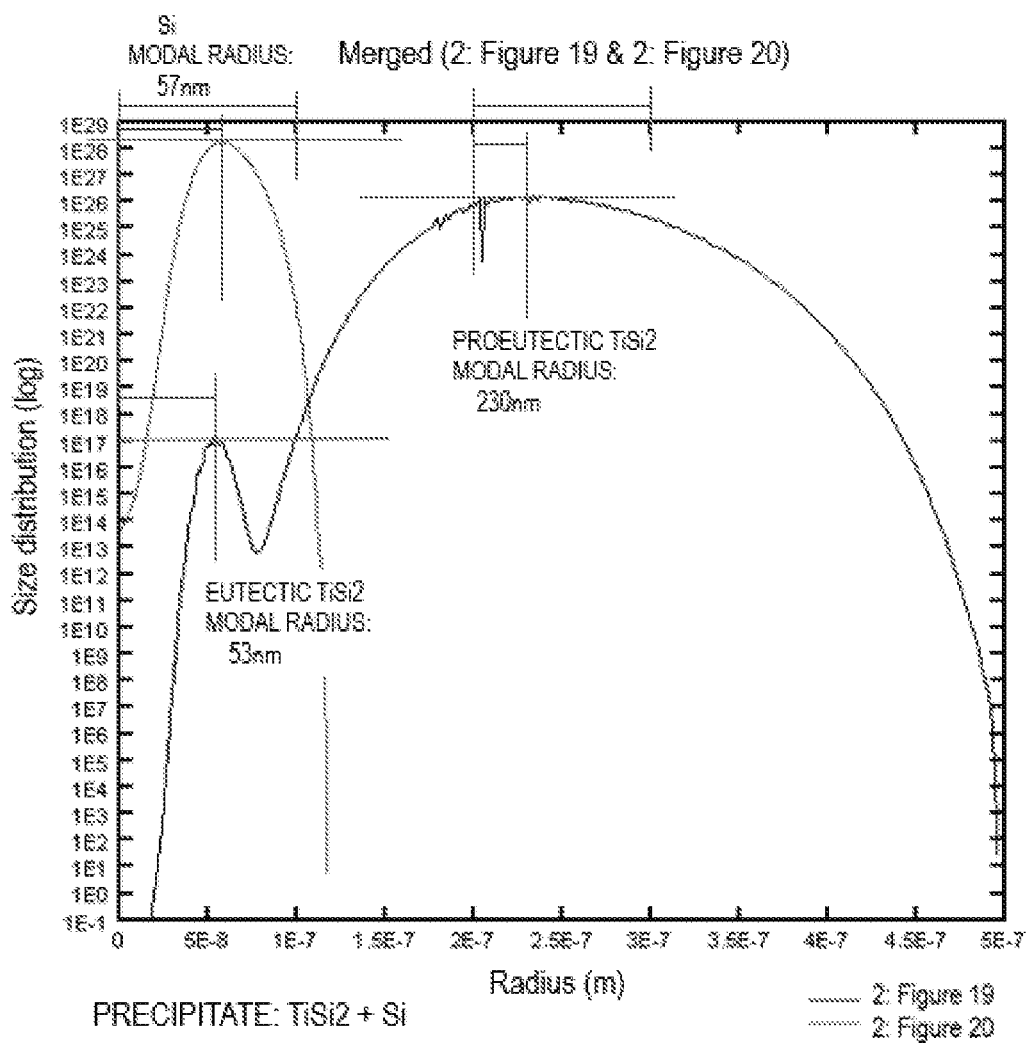

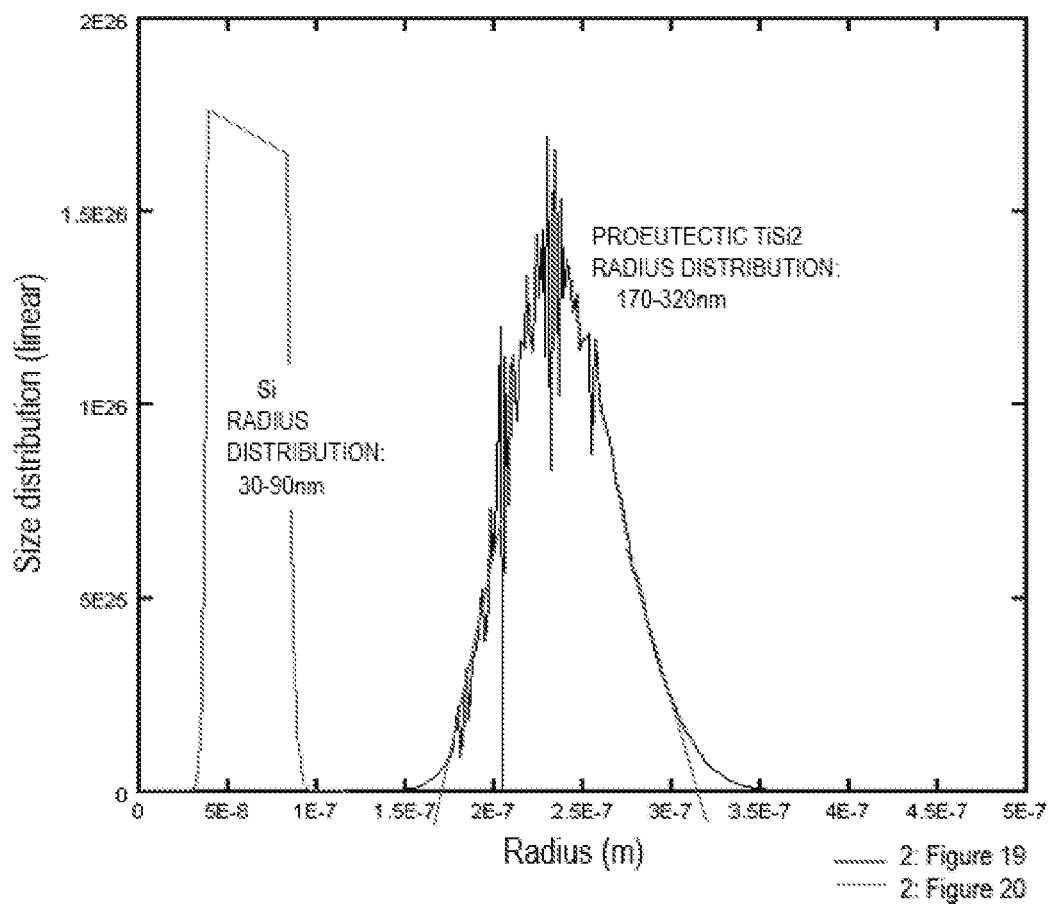

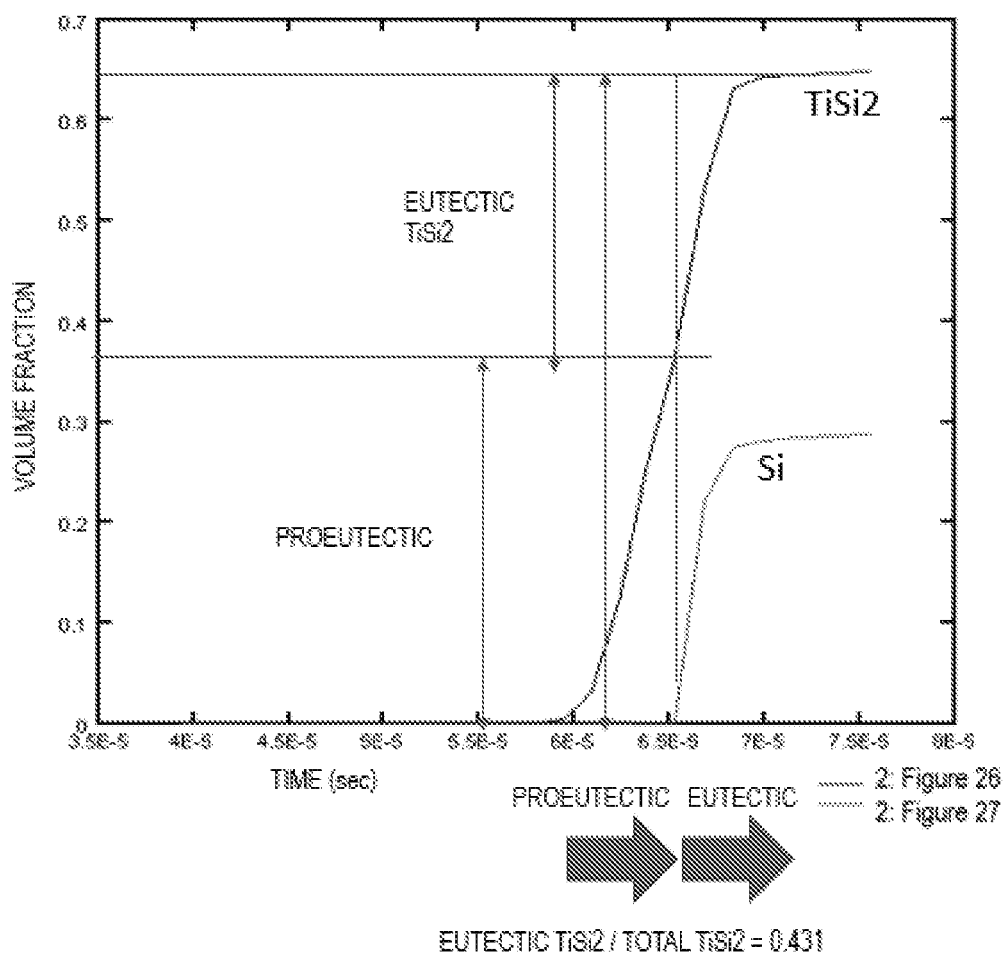

TTT DIAGRAM FOR PRECIPITATION OF Si OF Si63.07-Sn16.6-Ti18.4-Al1.9 (LIQUID PHASE COMPOSITION OF Si59.3-Sn9.9-Ti29.7-Al1.1 AT START OF EUTECTIC FORMATION)

| | |
|---|---:|
| $T_m$: Melting Temperature [K] | 1,572 |
| $T_g$: Glass Transition Temperature [K] | 943 |
| $H_m^f$: Melting Enthalpy [J/mol] | 24,451 |
| $R_c$: Critical Cooling Velocity [K/s] (Vol. Frac. 1E-06) | 257,173,859 |

TTT DIAGRAM FOR PRECIPITATION OF Si OF Si69.9-Sn8.4-Ti19.3-Al2.5
(LIQUID PHASE COMPOSITION OF Si65.5-Sn3.0-Ti30.0-Al1.5 AT
START OF EUTECTIC FORMATION)

| | |
|---|---:|
| $T_m$: Melting Temperature [K] | 1,584 |
| $T_g$: Glass Transition Temperature [K] | 950 |
| $H_m^f$: Melting Enthalpy [J/mol] | 25,543 |
| $R_c$: Critical Cooling Velocity [K/s] (Vol. Frac. 1E-06) | 158,046,722 |

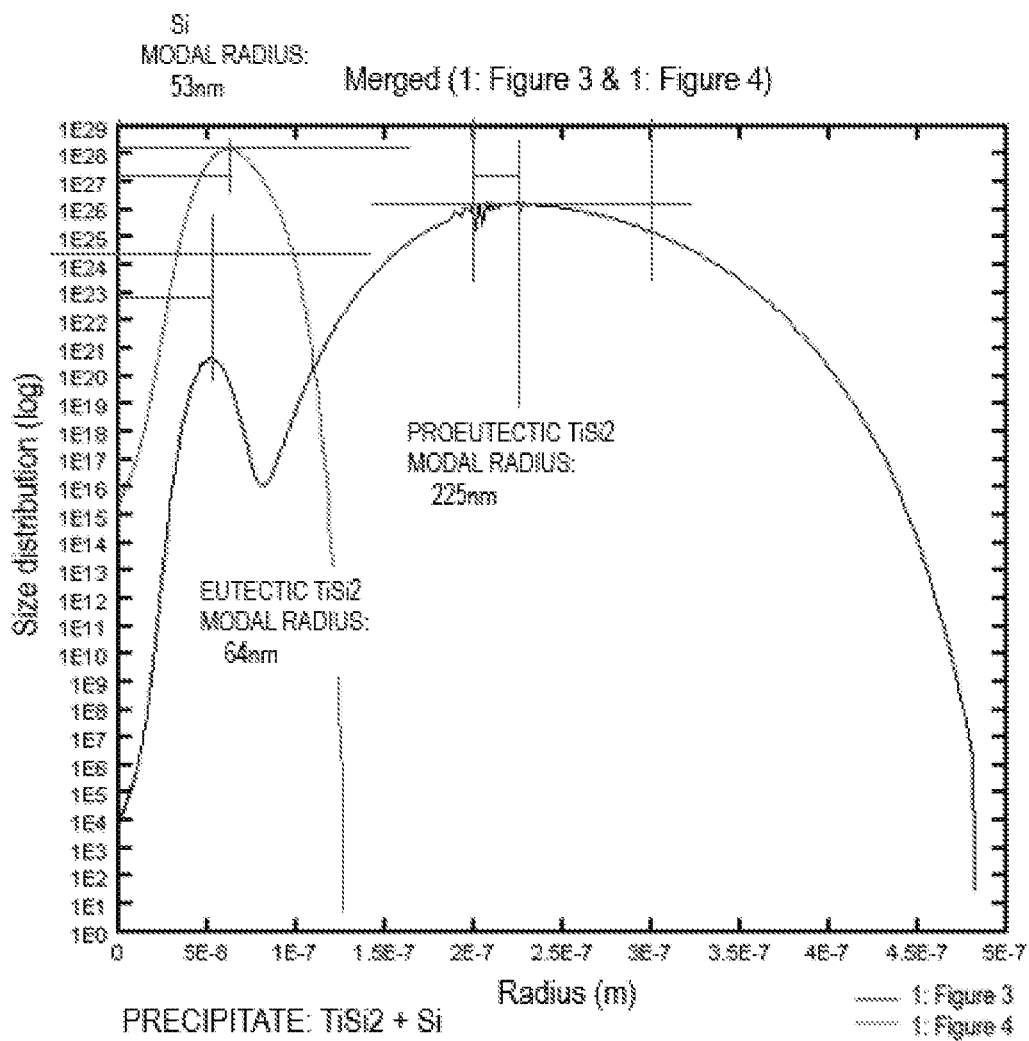

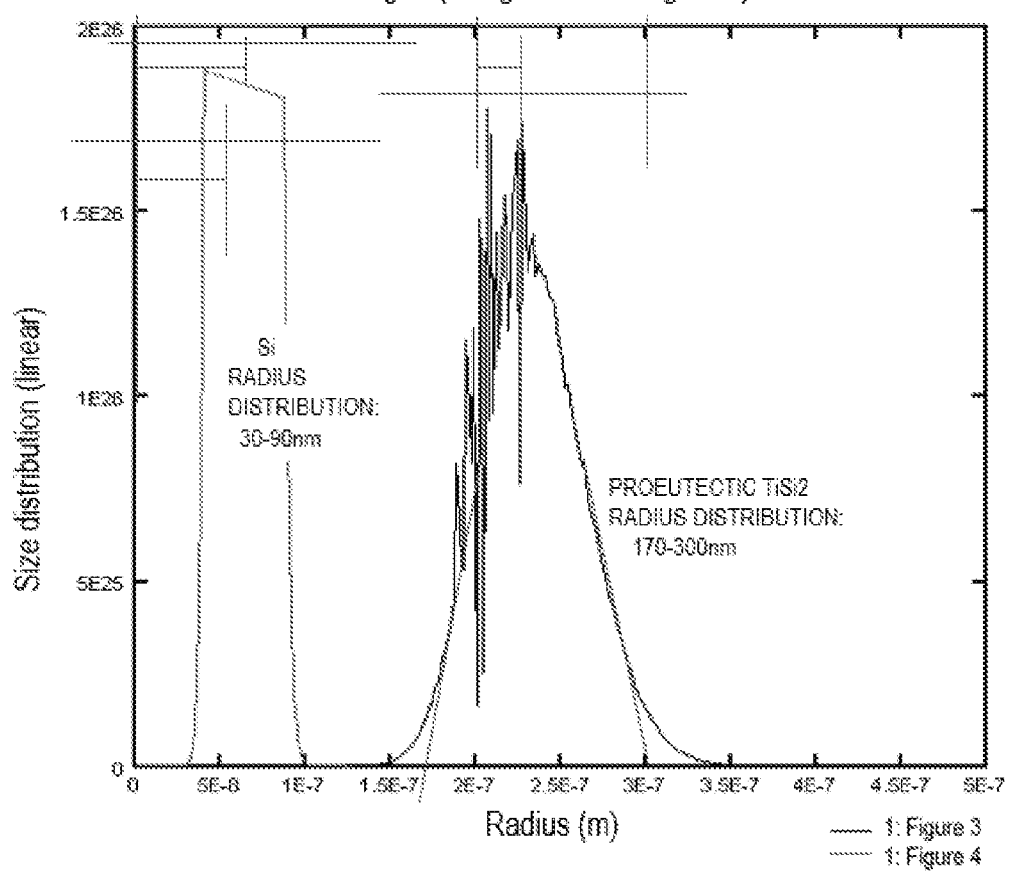

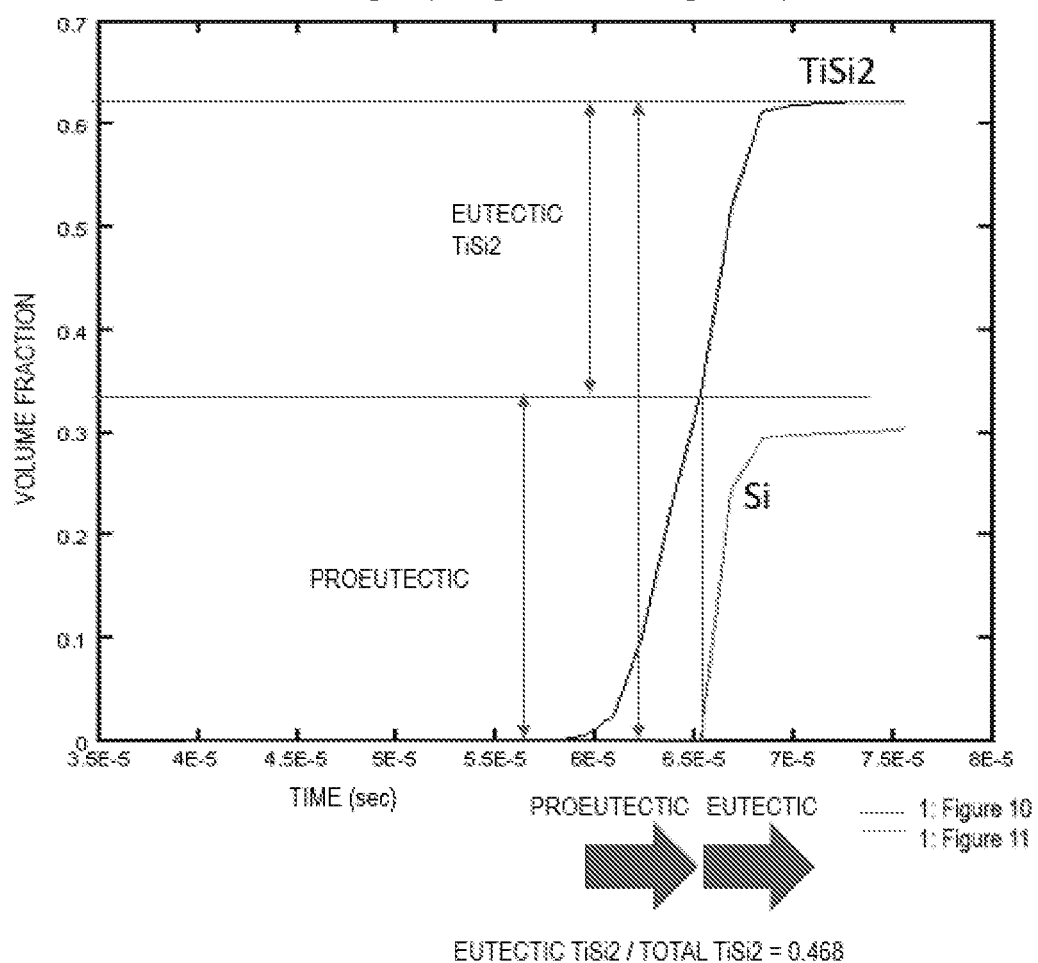

TTT DIAGRAM FOR PRECIPITATION OF Si OF Si69.9-Sn8.5-Ti18.6-Al3.1
(LIQUID PHASE COMPOSITION OF Si63.2-Sn5.0-Ti30.0-Al1.8 AT
START OF EUTECTIC FORMATION)

| | |
|---|---|
| $T_m$: Melting Temperature [K] | 1,576 |
| $T_g$: Glass Transition Temperature [K] | 845 |
| $H_m^f$: Melting Enthalpy [J/mol] | 25,490 |
| $R_c$: Critical Cooling Velocity [K/s] (Vol. Frac. 1E-06) | 157,471,220 |

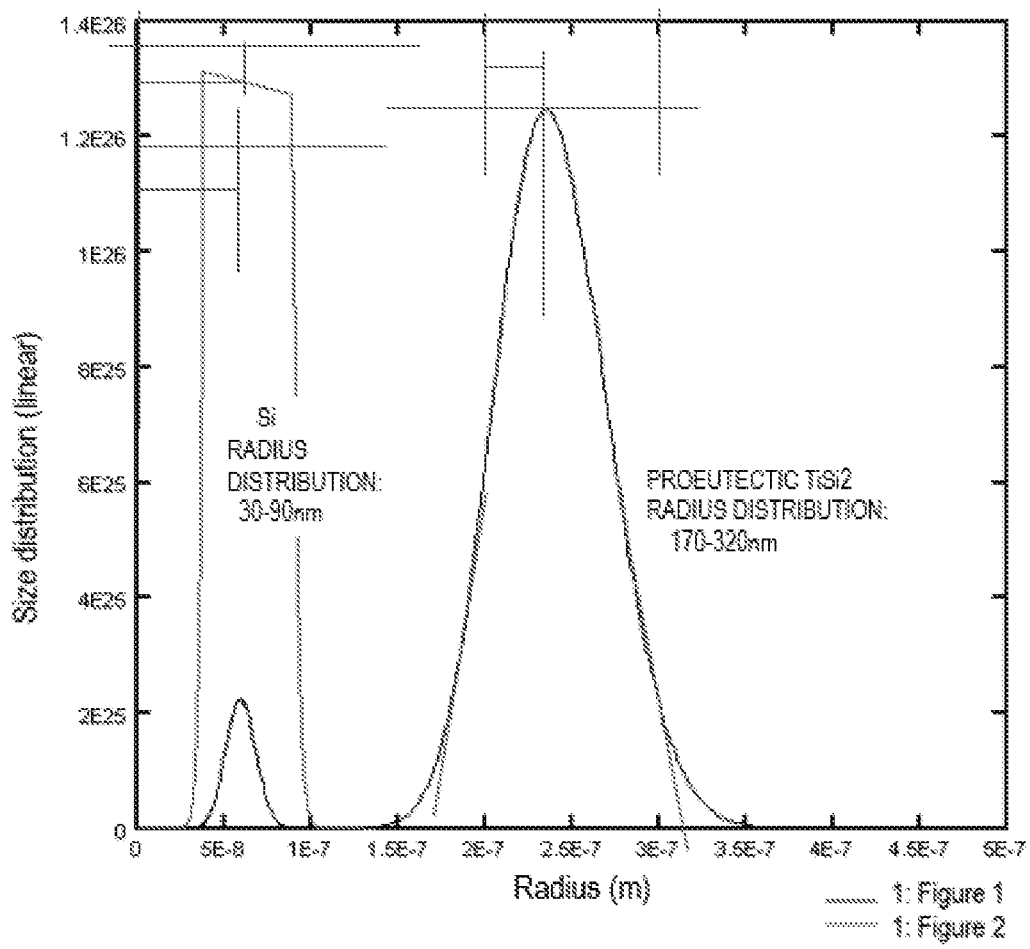

TTT DIAGRAM FOR PRECIPITATION OF Si OF Si74.34-Sn3.27-Ti19.96-Al2.43
(LIQUID PHASE COMPOSITION OF Si66.5-Sn2.0-Ti30.0-Al1.5 AT
START OF EUTECTIC FORMATION)

| | |
|---|---:|
| $T_m$: Melting Temperature [K] | 1,586 |
| $T_g$: Glass Transition Temperature [K] | 952 |
| $H_m^f$: Melting Enthalpy [J/mol] | 25,686 |
| $R_c$: Critical Cooling Velocity [K/s] (Vol. Frac. 1E-06) | 148,569,672 |

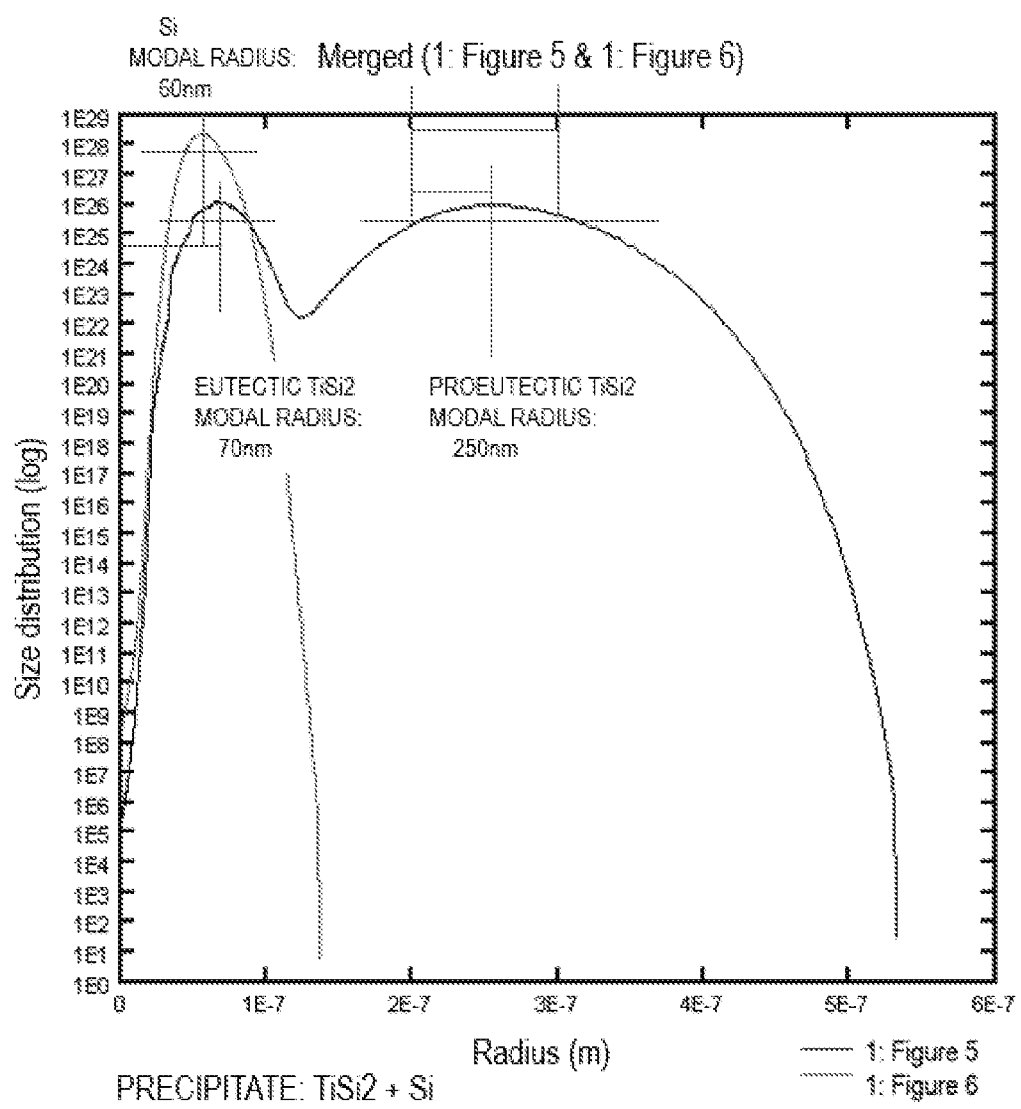

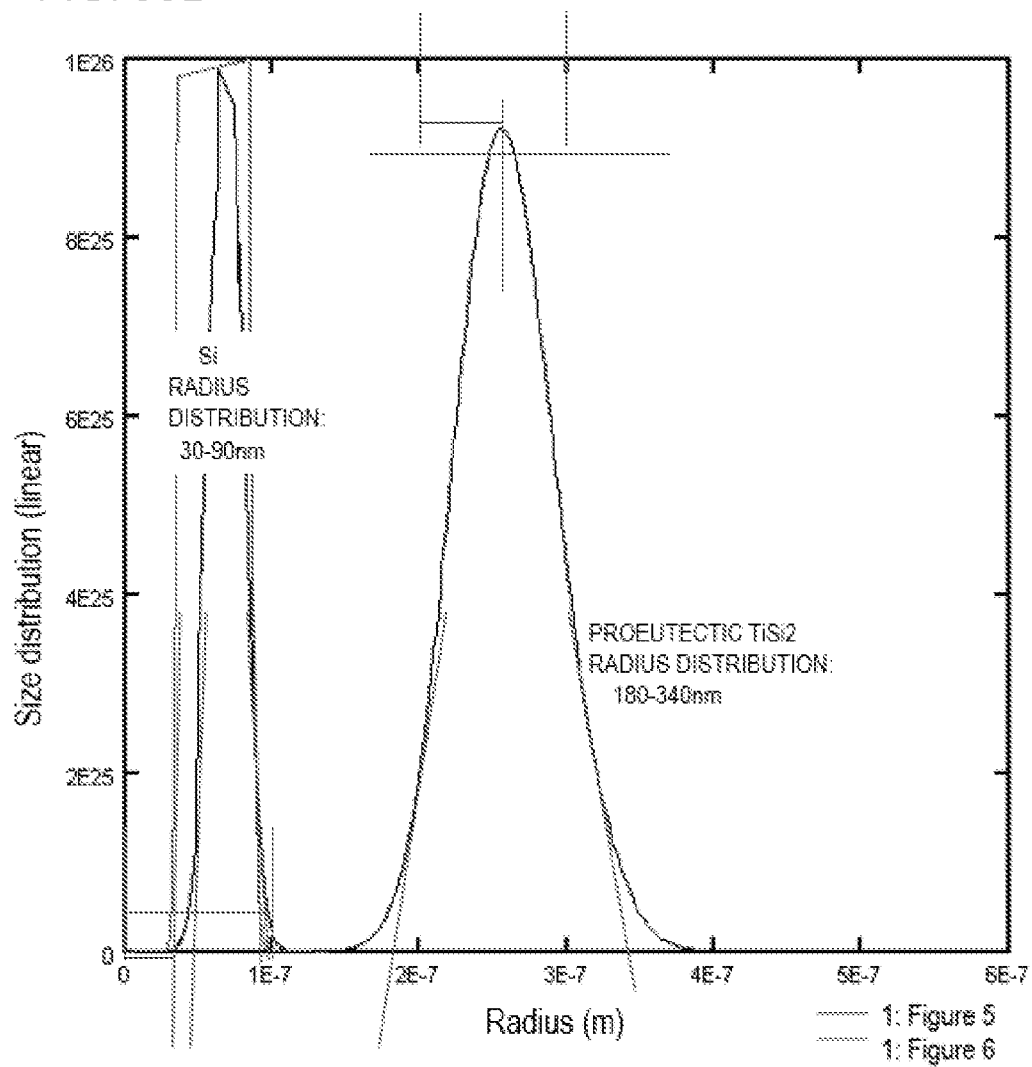

TTT DIAGRAM FOR PRECIPITATION OF Si OF Si71.12-Sn7.78-Ti21.1
(LIQUID PHASE COMPOSITION OF Si65-Sn5-Ti30 AT START OF
EUTECTIC FORMATION)

| | |
|---|---|
| $T_m$: Melting Temperature [K] | 1,594 |
| $T_g$: Glass Transition Temperature [K] | 956 |
| $H_m^f$: Melting Enthalpy [J/mol] | 24,217 |
| $R_c$: Critical Cooling Velocity [K/s] (Vol. Frac. 1E-06) | 308,645,488 |

EUTECTIC TiSi2 / TOTAL TiSi2 = 0.455

TEMPERATURE PROFILE FOR PRECIPITATION CALCULATION

TTT DIAGRAM FOR PRECIPITATION OF Si OF Si63.8-Sn16.3-Ti19.9
(LIQUID PHASE COMPOSITION OF Si60-Sn10-Ti30 AT START OF
EUTECTIC FORMATION)

| | |
|---|---:|
| $T_m$: Melting Temperature [K] | 1,583 |
| $T_g$: Glass Transition Temperature [K] | 950 |
| $H_m^f$: Melting Enthalpy [J/mol] | 23,430 |
| $R_c$: Critical Cooling Velocity [K/s] (Vol. Frac. 1E-06) | 426,127,049 |

FIG.38
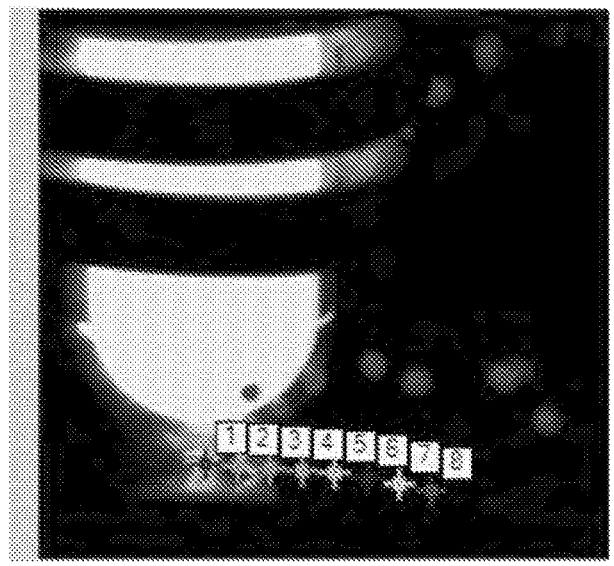
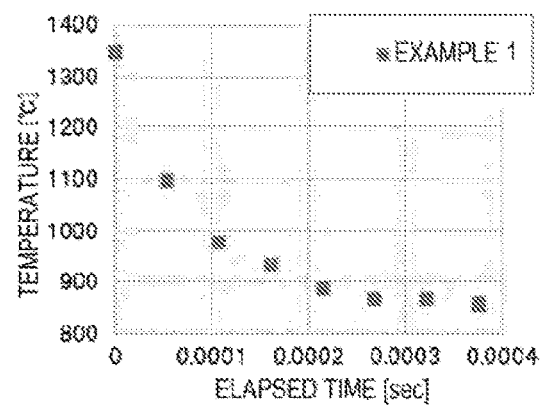
FIG.39B
TIME FROM RAPID QUENCHING NOZZLE AND TEMPERATURE
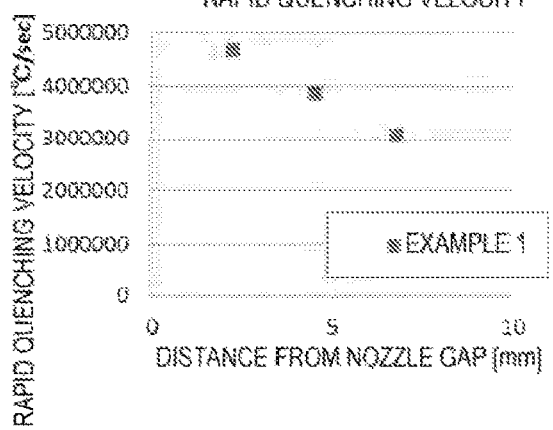
FIG.39C RAPID QUENCHING VELOCITY Si-Ti STATE DIAGRAM Si-Sn STATE DIAGRAM Ti-Sn STATE DIAGRAM Si-Al STATE DIAGRAM Ti-Al STATE DIAGRAM

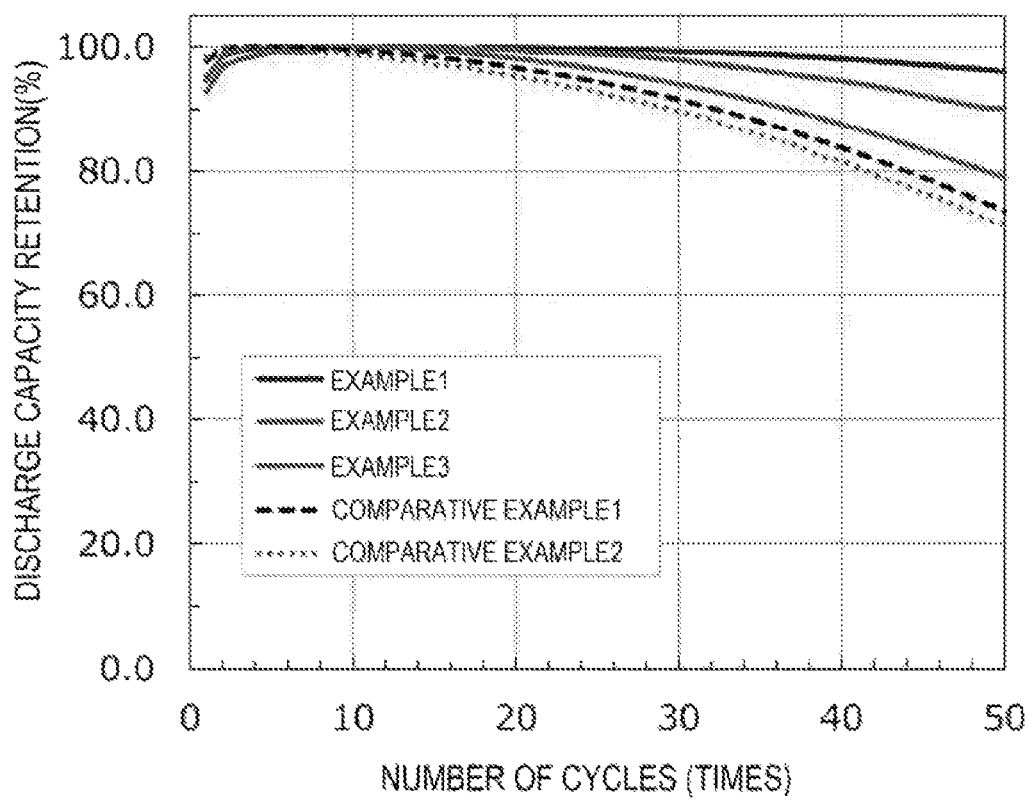

NEGATIVE ELECTRODE ACTIVE MATERIAL FOR ELECTRICAL DEVICE AND ELECTRICAL DEVICE USING THE SAME

TECHNICAL FIELD

The present invention relates to a negative electrode active material for an electrical device and an electrical device using the same. The negative electrode active material for an electrical device and the electrical device using the same according to the present invention are used in a power source for driving a motor of a vehicle such as an electric vehicle, a fuel cell vehicle, or a hybrid electric vehicle and an auxiliary power source as, for example, a secondary battery or a capacitor.

BACKGROUND

In recent years, a decrease in the amount of carbon dioxide is ardently desired in order to cope with the air pollution and global warming. In the motor vehicle industry, it is greatly expected that the carbon dioxide emission is decreased by the introduction of electric vehicles (EV) and hybrid electric vehicles (HEV) and the development of electrical devices such as secondary batteries for driving a motor, which hold the key to practical application of these, has been actively conducted.

Secondary batteries for driving a motor are required to have extremely high output characteristics and high energy as compared with consumer lithium ion secondary batteries to be used in mobile phones, notebook computers, and the like. Hence, lithium ion secondary batteries having the highest theoretical energy among all batteries are attracting attention, and the development thereof is being rapidly conducted at present.

A lithium ion secondary battery generally has a configuration in which a positive electrode fabricated by applying a positive electrode active material and the like on both sides of a positive electrode current collector using a binder and a negative electrode fabricated by applying a negative electrode active material and the like on both sides of a negative electrode current collector using a binder are connected to each other via an electrolyte layer and stored in a battery case.

Hitherto, carbon and graphite-based materials, which are advantageous from the viewpoint of the life of charge and discharge cycles and cost, have been used in the negative electrode of a lithium ion secondary battery. However, in the carbon and graphite-based negative electrode materials, charge and discharge are performed by occlusion of lithium ions into and release of the lithium ions from the graphite crystals and there is thus a disadvantage that it is impossible to obtain a charge and discharge capacity of 372 mAh/g or more of a theoretical capacity to be obtained from $LiC_6$ which is a compound containing lithium in the largest amount. For this reason, it is difficult to obtain a capacity and an energy density which satisfy the practical level for a vehicle application from carbon and graphite-based negative electrode materials.

In contrast, a battery in which a material to be alloyed with Li is used in the negative electrode is expected as a negative electrode material in a vehicle application since the energy density thereof is improved as compared with conventional carbon and graphite-based negative electrode materials. For example, a Si material occludes and releases 3.75 moles of lithium ions per 1 mole in charge and discharge as presented in the following Reaction Formula (A) and the theoretical capacity to be obtained from $Li_{15}Si_4$ ($=Li_{3.75}Si$) is 3600 mAh/g.

$$Si+3.75Li^{+}+e^{-} \rightleftharpoons Li_{3.75}Si \qquad (A)$$

However, in the lithium ion secondary battery in which a material to be alloyed with Li is used in the negative electrode, the negative electrode is greatly expanded and shrunk at the time of charge and discharge. For example, the volume expansion of a graphite material in the case of occluding Li ions is about 1.2 times, but the Si material is transformed from an amorphous state to a crystalline state when Si and Li are alloyed with each other and a large volume change (about 4 times) is caused, and thus there is a problem that the cycle life of the electrode is diminished. In addition, in the case of a Si negative electrode active material, there is a trade-off relation between the capacity and the cycle durability and there is thus a problem that it is difficult to improve the cycle durability while having a high capacity.

Here, WO 2006/129415 A discloses an invention intended to provide a nonaqueous electrolyte secondary battery including a negative electrode pellet which has a high capacity and an excellent cycle life. Specifically, it is disclosed that a silicon-containing alloy which is obtained by mixing a silicon powder and a titanium powder by a mechanical alloying method and wet pulverizing the mixture and contains a first phase containing silicon as a main component and a second phase containing a silicide of titanium ($TiSi_2$ or the like) is used as a negative electrode active material. At this time, it is also disclosed that at least either of these two phases is amorphous or low crystalline.

SUMMARY

According to the investigations by the inventors of the present invention, it has been revealed that the cycle durability is not sufficient in some cases though it is described that favorable cycle durability can be exhibited in an electrical device such as a lithium ion secondary battery in which the negative electrode pellet described in WO 2006/129415 A above is used.

Accordingly, an object of the present invention is to provide a means capable of improving the cycle durability of an electrical device such as a lithium ion secondary battery.

Solution to Problem

The inventors of the present invention have conducted intensive studies in order to solve the above problems. As a result, it has been found out that the above problems can be solved by using a silicon-containing alloy having a configuration having a particular composition in which a small amount of Al is added to an alloy to be represented by Si—Sn-M (M: transition metal element) as a negative electrode active material for an electrical device, and the present invention has been thus completed. In addition, it has been found out that the above problems can be solved by using a silicon-containing alloy which has a quaternary alloy composition to be represented by Si—Sn-M-Al (M is one or two or more transition metal elements) and a microstructure which has a first phase (silicide phase) containing a silicide (also referred to as a silicide) of a transition metal as a main component and a second phase (amorphous Si phase (a-Si phase)) containing Sn and Al in part and amorphous or low crystalline silicon (also referred to as a-Si) as a main component and of which a part is composed of a plurality of the first phases which are independent and a part has a eutectic structure composed of the first phase and the second phase as a negative electrode active material for an electrical device, and the present invention has been thus completed.

In other words, the present invention relates to a negative electrode active material for an electrical device, which contains a silicon-containing alloy. Moreover, the silicon-containing alloy has a composition to be represented by the following Chemical Formula (1):

(in Chemical Formula (1) above,
M is one or two or more transition metal elements,
A is an unavoidable impurity, and
x, y, z, w, and a represent values of percentage by mass, where y, z, and w are 2≤y≤10, 25≤z≤35, and 0.3≤w≤3, respectively, and x and a are remainder).

In addition, the silicon-containing alloy has a composition to be represented by the following Chemical Formula (1):

(in Chemical Formula (1) above,
M is one or two or more transition metal elements,
A is an unavoidable impurity, and
x, y, z, w, and a represent values of percentage by mass, where y, z, and w are 0<y<100, 0<z<100, and 0<w<100, respectively, and x and a are remainder), in which a microstructure of the Si-containing alloy has a first phase containing a silicide of a transition metal as a main component and a second phase containing Sn and Al in part and amorphous or low crystalline Si as a main component and further a part of the microstructure is composed of a plurality of the first phases which are independent and a part of the microstructure has a eutectic structure composed of the first phase and the second phase.

In the silicon-containing alloy constituting the negative electrode active material according to the present invention, it is possible to obtain an alloy having a particular microstructure by adding a small amount of Al to a Si—Sn-M (hereinafter, described using Ti as an example) alloy having a particular composition. Specifically, the microstructure has a first phase containing a silicide of a transition metal M (Ti) as a main component and a second phase containing Sn and Al in part and amorphous or low crystalline Si as a main component and a part of the microstructure is composed of a plurality of the first phases which are independent and a part of the microstructure has a eutectic structure composed of the first phase and the second phase. By this, the silicon-containing alloy has actions that 1. a silicide of a transition metal M, particularly that of Ti (TiSi$_2$) can be refined (the modal radius of the independent first phases can be decreased), 2. the proportion of Si in the eutectic can be increased, and 3. forming ability of the amorphous (amorphous or low crystalline Si) phase can be enhanced. For these reasons, it is possible to suppress the expansion of Si during charge and discharge and to improve the cycle durability by refinement and amorphization.

Specifically, by adding a small amount of Al to the Si—Sn-M (to be described using Ti as an example) alloy, the microstructure of the alloy has a configuration in which the second phase (Si phase) is eutecticized with the first phase (TiSi$_2$ phase) and the eutectic further enters the gaps between a plurality of independent first phases (TiSi$_2$ phases). In addition, the first phase (TiSi$_2$ phase) is superior to the second phase (a-Si phase) in the hardness and electron conductivity. Hence, the expansion of the second phase (a-Si phase) in the eutectic structure in the charge and discharge process can be suppressed by so-called two step repression that the expansion is repressed by the eutecticized first phase (TiSi$_2$ phase) and further by a plurality of independent first phases (TiSi$_2$ phases). This suppresses the phase transformation (crystallization into Li$_{15}$Si$_4$) between the amorphous phase and the crystalline phase when Si is alloyed with Li at the time of charge. As a result, expansion and shrinkage of the silicon-containing alloy constituting the negative electrode active material in the charge and discharge process of the electrical device are diminished and the second phase (a-Si phase) can be uniformly reacted as the second phase is eutecticized with the first phase (silicide phase) to be composed of a silicide exhibiting electrical conductivity. As a result, the cycle durability of the electrical device in which the negative electrode active material is used can be improved while the electrical device has a high capacity.

BRIEF DESCRIPTION OF THE DRAWINGS

FIG. 2 is a perspective view schematically illustrating the appearance of a stacked type flat lithium ion secondary battery, which is a representative embodiment of the electrical device according to the present invention;

FIG. 3 is a diagram illustrating a cross-sectional SEM (scanning electron microscope) image of a rapidly quenched ribbon alloy having an alloy composition Si$_{60.0}$Sn$_{8.1}$Ti$_{30.1}$Al$_{1.8}$ (mass ratio) of Example 1;

FIG. 4(a) is an image (low magnification) of a sample prepared from particles of a negative electrode active material (Si-containing alloy) having an alloy composition Si$_{60.0}$Sn$_{8.1}$Ti$_{30.1}$Al$_{1.8}$ (mass ratio) of Example 1 by a FIB method and observed by BF-STEM (bright field-scanning transmission electron microscopic imaging). FIG. 4(b) is an image (low magnification) of the particles of the negative electrode active material in the same visual field as in FIG. 4(a) observed by HAADF-STEM (high-angle annular dark-field scanning transmission electron microscopic imaging);

FIGS. 5(a)-5(e) are diagrams (low magnification) illustrating the quantitative mapping data by STEM-EDX (scanning transmission electron microscope-energy dispersive X-ray spectroscopy).

FIG. 5(a) is the same HAADF-STEM image as that in FIG. 4(b). FIG. 5(b) is a diagram illustrating the mapping data of Sn measured in the same visual field as HAADF-STEM (FIG. 5(a)). FIG. 5(c) is a diagram illustrating the mapping data of Si measured in the same visual field as HAADF-STEM (FIG. 5(a)). FIG. 5(d) is a diagram illustrating the mapping data of Ti measured in the same visual field as HAADF-STEM (FIG. 5(a)). FIG. 5(e) is a diagram obtained by superimposing the mapping data in FIGS. 5(b) to 5(d) (Sn, Si, and Ti) one on another;

FIG. 6(a) is the same HAADF-STEM image as that in FIG. 4(b). FIG. 6(b) is a diagram illustrating the mapping data of Al measured in the same visual field as HAADF-STEM (FIG. 6(a)). FIG. 6(c) is a diagram illustrating the mapping data of Si measured in the same visual field as HAADF-STEM (FIG. 6(a)). FIG. 6(d) is a diagram illustrating the mapping data of Ti measured in the same visual field as HAADF-STEM (FIG. 6(a)). FIG. 6(e) is a diagram obtained by superimposing the mapping data in FIGS. 6(b) to 6(d) (Al, Si, and Ti) one on another;

FIG. 8(a) is an image (high magnification) of a portion (portion enlarged at high magnification) obtained by enlarging an inner portion surrounded with a square frame in FIG. 7(b) observed by BF-STEM (bright field-scanning transmission electron microscopic imaging). FIG. 8(b) is an image (high magnification) in the same visual field as in FIG. 8(a) observed by HAADF-STEM (high-angle annular dark-field scanning transmission electron microscopic imaging);

FIGS. 9(a)-9(e) are diagrams (high magnification) illustrating the quantitative mapping data by STEM-EDX (scanning transmission electron microscope-energy dispersive X-ray spectroscopy).

FIG. 9(a) is the same HAADF-STEM image as that in FIG. 8(b). FIG. 9(b) is a diagram illustrating the mapping data of Sn measured in the same visual field as HAADF-STEM (FIG. 9(a)). FIG. 9(c) is a diagram illustrating the mapping data of Si measured in the same visual field as HAADF-STEM (FIG. 9(a)). FIG. 9(d) is a diagram illustrating the mapping data of Ti measured in the same visual field as HAADF-STEM (FIG. 9(a)). FIG. 9(e) is a diagram obtained by superimposing the mapping data in FIGS. 9(b) to 9(d) (Sn, Si, and Ti) one on another;

FIGS. 10(a)-10(e) are diagrams (high magnification) illustrating the quantitative mapping data by STEM-EDX (scanning transmission electron microscope-energy dispersive X-ray spectroscopy). FIG. 10(a) is the same HAADF-STEM image as that in FIG. 8(b). FIG. 10(b) is a diagram illustrating the mapping data of Al measured in the same visual field as HAADF-STEM (FIG. 10(a)). FIG. 10(c) is a diagram illustrating the mapping data of Si measured in the same visual field as HAADF-STEM (FIG. 10(a)). FIG. 10(d) is a diagram illustrating the mapping data of Ti measured in the same visual field as HAADF-STEM (FIG. 10(a)). FIG. 10(e) is a diagram obtained by superimposing the mapping data in FIGS. 10(b) to 10(d) (Al, Si, and Ti) one on another;

FIG. 11(a) is a HAADF-STEM image of the enlarged eutectic structure portion of a Si-containing alloy of Example 1, which is the same as those in FIG. 8(b), FIG. 9(a), and FIG. 10(a).

FIG. 11(b) is a graph (diagram) obtained by elemental analysis of the portion (1 in the image) surrounded with a bold line in FIG. 11(a);

FIG. 12(a) is a HAADF-STEM image of the enlarged eutectic structure portion of a Si-containing alloy of Example 1, which is the same as that in FIG. 11(a). FIG. 12(b) is a graph (diagram) obtained by elemental analysis of the portion (2 in the image) surrounded with a bold line in FIG. 12(a);

FIG. 13(a) is a diagram illustrating a BF-STEM image (bright field scanning transmission electron microscope image) of the enlarged eutectic structure portion of a Si-containing alloy of Example 1. FIG. 13(b) is a diffraction pattern obtained by subjecting the FFT1 region (eutectic portion $TiSi_2$ phase) in FIG. 13(a) to fast Fourier transform processing by electron diffraction measurement. FIG. 13(c) is a diffraction pattern obtained by subjecting the FFT2 region (eutectic portion Si phase) in FIG. 13(a) to fast Fourier transform processing by electron diffraction measurement;

FIG. 14(b) is a graph obtained by linearly illustrating and enlarging the vertical axis (frequency distribution) of the graph in FIG. 14(a) and illustrates the radius distribution of the independent first phases and the second phases in the eutectic structure;

FIGS. 16(a)-16(c) are diagrams illustrating the results on the Scheil solidification simulation of a Si-containing alloy having an alloy composition (alloy seed) $Si_{60.0}Sn_{8.1}Ti_{30.1}Al_{1.8}$ (mass ratio) of Example 1. FIG. 16(a) is a diagram illustrating the relation between temperature and molar fraction of solid phase. FIG. 16(b) is a diagram illustrating the transition of the liquid phase composition by the Scheil solidification simulation on the Si—Sn—Ti ternary composition diagram and illustrates the liquid phase composition at the start of eutectic formation. FIG. 16(c) is a diagram illustrating the transition of the liquid phase composition by the Scheil solidification simulation on the Si—Al—Ti ternary composition diagram and illustrates the liquid phase composition at the start of eutectic formation;

FIG. 17 is a diagram illustrating a cross-sectional SEM (scanning electron microscope) image of a rapidly quenched ribbon alloy having an alloy composition $Si_{64.7}Sn_{5.0}Ti_{29.9}Al_{0.4}$ (mass ratio) of Example 2;

FIG. 18(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{64.7}Sn_{5.0}Ti_{29.9}Al_{0.4}$ (mass ratio) of Example 2 to precipitation simulation, and illustrates the modal radii thereof. FIG. 18(b) is a graph obtained by linearly illustrating and enlarging the vertical axis (frequency distribution) of the graph in FIG. 18(a) and illustrates the radius distribution of the independent first phases and the second phases in the eutectic structure;

FIG. 19(a) is a diagram illustrating the time courses of the volume fractions of $TiSi_2$ and Si obtained by subjecting an alloy composition (alloy seed) $Si_{64.7}Sn_{5.0}Ti_{29.9}Al_{0.4}$ (mass ratio) of Example 2 to precipitation simulation.

FIG. 25(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{59.3}Sn_{9.9}Ti_{29.7}Al_{1.1}$ (mass ratio) of Example 5 to precipitation simulation, and illustrates the modal radii thereof. FIG. 25(b) is a graph obtained by linearly illustrating and enlarging the vertical axis (frequency distribution) of the graph in FIG. 25(a) and a graph illustrating the radius distribution of the independent first phases and the second phases in the eutectic structure;

FIG. 26(a) is a diagram illustrating the time courses of the volume fractions of $TiSi_2$ and Si obtained by subjecting an alloy composition (alloy seed) $Si_{59.3}Sn_{9.9}Ti_{29.7}Al_{1.1}$ (mass ratio) of Example 5 to precipitation simulation.

FIG. 29(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{63.2}Sn_{5.0}Ti_{30.0}Al_{1.8}$ (mass ratio) of Example 7 to precipitation simulation, and illustrates the modal radii thereof. FIG. 29(b) is a graph obtained by linearly illustrating and enlarging the vertical axis (frequency distribution) of the graph in FIG. 29(a) and illustrates the radius distribution of the independent first phases and the second phases in the eutectic structure;

FIG. 30(a) is a diagram illustrating the time courses of the volume fractions of $TiSi_2$ and Si obtained by subjecting an alloy composition (alloy seed) $Si_{63.2}Sn_{5.0}Ti_{30.0}Al_{1.8}$ (mass ratio) of Example 7 to precipitation simulation.

FIG. 31(b) is a graph obtained by linearly illustrating and enlarging the vertical axis (frequency distribution) of the graph in FIG. 31(a) and a graph illustrating the radius distribution of the independent first phases and the second phases in the eutectic structure;

FIG. 33(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{65.0}Sn_{5.0}Ti_{30.0}$ (mass ratio) of Comparative Example 1 to precipitation simulation, and illustrates the modal radii thereof. FIG. 33(b) is a graph obtained by linearly illustrating and enlarging the vertical axis (frequency distribution) of the graph in FIG. 33(a) and a graph illustrating the radius distribution of the independent first phases and the second phases in the eutectic structure;

FIG. 38 is a diagram illustrating a look when the temperature of a rapidly quenched ribbon alloy obtained by using an apparatus used for a liquid quenching solidification method is observed by using an infrared thermograph;

FIG. 39(b) is a graph illustrating the relation between the cooling time (elapsed time) and the measured temperature calculated from the peripheral velocity of the roll based on FIG. 39(a). FIG. 39(c) is a graph illustrating the cooling velocity (rapid quenching velocity) at the positions (distances) every 2.25 mm from the nozzle calculated by the temperature difference between the respective temperature measurement points/the movement time between the respective temperature measurement points;

FIG. 46 is a diagram illustrating the results on a charge and discharge test of each lithium ion secondary battery (coin cell) fabricated in each of Examples 1 to 3 and Comparative Examples 1 and 2 and a graph (diagram) illustrating the relation between the number of charge and discharge cycles and discharge capacity retention of each coin cell.

DETAILED DESCRIPTION

Figure 1:
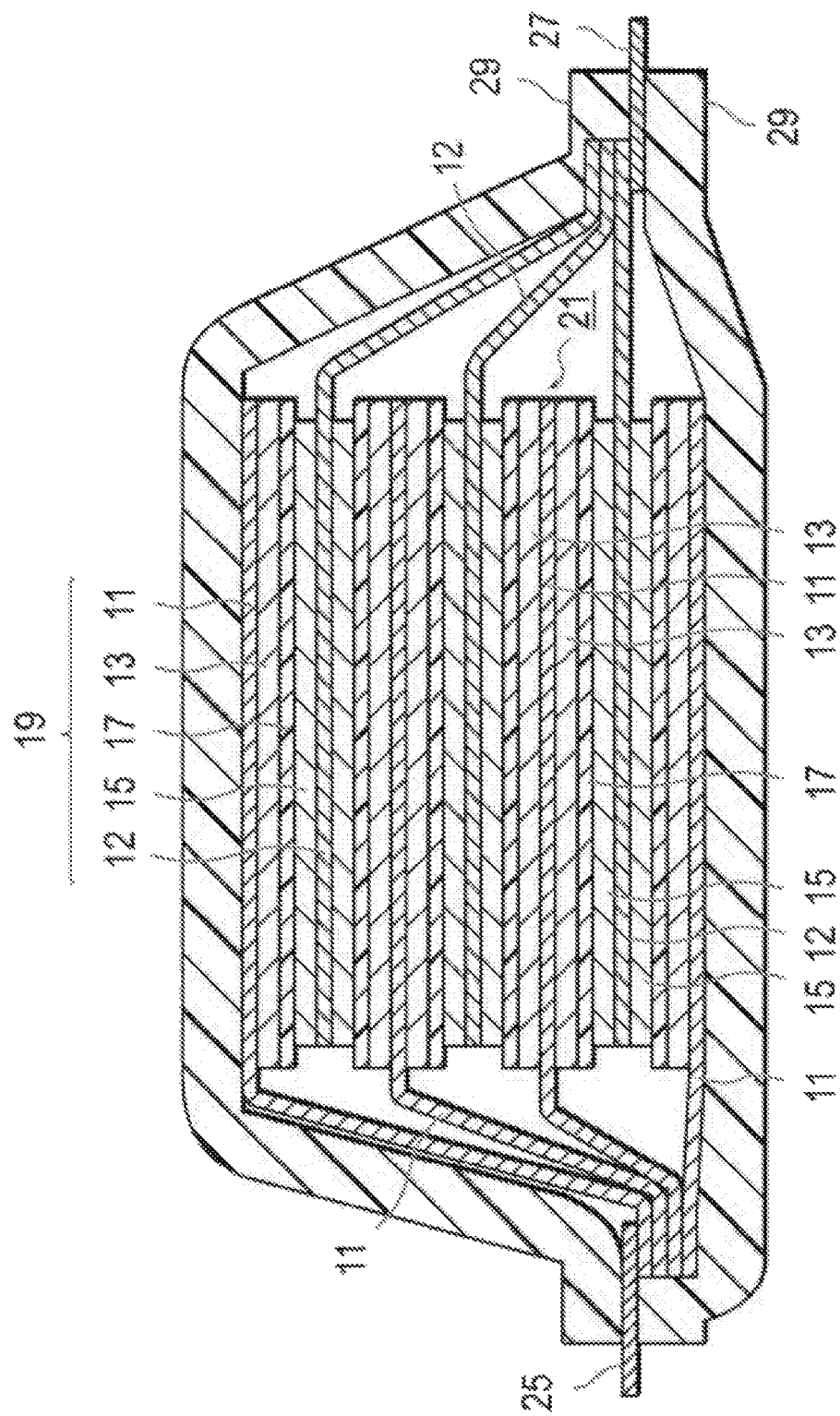
FIG. 1 is a schematic cross-sectional view schematically illustrating the outline of a stacked type flat non-bipolar lithium ion secondary battery, which is a representative embodiment of the electrical device according to the present invention.

Hereinafter, embodiments of a negative electrode active material for an electrical device and a negative electrode for an electrical device and an electrical device which are fabricated using the same of the present invention will be described with reference to the drawings. However, the technical scope of the present invention should be determined based on the description of claims and is not limited to only the following forms. Incidentally, in the description of the drawings, the same elements are denoted by the same reference numerals and duplicate descriptions are omitted. In addition, the dimensional ratios in the drawings are exaggerated for convenience of explanation and may differ from the actual ratios.

Hereinafter, a basic configuration of an electrical device to which the negative electrode active material for an electrical device of the present invention can be applied will be described with reference to the drawings. In the present embodiment, a lithium ion secondary battery will be described as an example of the electrical device.

First, in a negative electrode for a lithium ion secondary battery, which is a representative embodiment of a negative electrode containing the negative electrode active material for an electrical device according to the present invention, and a lithium ion secondary battery using the same, the voltage of the cell (single cell layer) is large and a high energy density and a high output density can be attained. Hence, a lithium ion secondary battery fabricated using the negative electrode active material for a lithium ion secondary battery of the present embodiment is excellent as a driving power source of vehicles and an auxiliary power source. As a result, it can be suitably utilized as a lithium ion secondary battery for a driving power source of vehicles and the like. In addition to this, it can be sufficiently applied to lithium ion secondary batteries for mobile devices such as mobile phones.

In other words, the lithium ion secondary battery to be the target of the present embodiment may be any one as long as it is fabricated using the negative electrode active material for a lithium ion secondary battery of the present embodiment to be described below, and other constituent requirements thereof are not particularly limited.

For example, in a case in which the lithium ion secondary battery is distinguished by the form and structure, the lithium ion secondary battery can be applied to any conventionally known form and structure such as a stacked type (flat type) battery and a wound type (cylindrical type) battery. It is advantageous from the viewpoint of cost and workability to adopt a stacked type (flat type) battery structure since long-term reliability can be secured by a simple sealing technique such as thermocompression bonding.

In addition, in the case of being viewed in the electrical connection form (electrode structure) in the lithium ion secondary battery, the lithium ion secondary battery can be applied to both a non-bipolar (internal parallel connection type) battery and a bipolar (internal series connection type) battery.

In the case of being distinguished by the kind of the electrolyte layer in the lithium ion secondary battery, the lithium ion secondary battery can be applied to batteries having any kind of conventionally known electrolyte layer such as a solution electrolyte type battery in which a solution electrolyte such as a nonaqueous electrolytic solution is used in the electrolyte layer and a polymer battery in which a polymer electrolyte is used in the electrolyte layer. The polymer battery is classified into a gel electrolyte type battery using a polymer gel electrolyte (also simply referred to as a gel electrolyte) and a solid polymer (all solid type)

battery using a polymer solid electrolyte (also simply referred to as polymer electrolyte).

Accordingly, in the following description, a non-bipolar (internal parallel connection type) lithium ion secondary battery fabricated using the negative electrode active material for a lithium ion secondary battery of the present embodiment will be quite briefly described with reference to the drawings. However, the technical scope of the lithium ion secondary battery of the present embodiment should not be limited to these.

<Overall Structure of Battery>

FIG. 1 is a schematic cross-sectional view schematically illustrating the overall structure of a flat type (stacked type) lithium ion secondary battery (hereinafter also simply referred to as a "stacked type battery") which is a representative embodiment of the electrical device of the present invention.

As illustrated in FIG. 1, a stacked type battery 10 of the present embodiment has a structure in which a substantially rectangular power generating element 21 in which a charge and discharge reaction actually takes place is sealed inside a laminate sheet 29 which is an exterior packaging body. Here, the power generating element 21 has a configuration in which a positive electrode in which a positive electrode active material layer 15 is disposed on both sides of a positive electrode current collector 12, an electrolyte layer 17, and a negative electrode in which a negative electrode active material layer 13 is disposed on both sides of a negative electrode current collector 11 are layered. Specifically, the negative electrode, the electrolyte layer, and the positive electrode are layered in this order so that one positive electrode active material layer 15 and the negative electrode active material layer 13 adjacent to this face each other via the electrolyte layer 17.

By this, the adjacent positive electrode, electrolyte layer, and negative electrode constitute one single cell layer 19. Consequently, it can also be said that the stacked type battery 10 illustrated in FIG. 1 has a configuration in which a plurality of single cell layers 19 are electrically connected in parallel by being stacked one on another. Incidentally, the positive electrode active material layer 15 is disposed only on one side of each of the outermost layer positive electrode current collectors positioned at both outermost layers of the power generating element 21, but the active material layer may be provided on both sides thereof. In other words, a current collector having an active material layer on both sides may be used as the current collector of the outermost layer as it is instead of using a current collector dedicated to the outermost layer in which the active material layer is provided only on one side. In addition, the outermost layer negative electrode current collector may be positioned on both outermost layers of the power generating element 21 by reversing the disposition of the positive electrode and the negative electrode from that in FIG. 1, and thus the negative electrode active material layer may be disposed on one side or both sides of the outermost layer negative electrode current collector.

The positive electrode current collector 12 and the negative electrode current collector 11 have a structure in which a positive electrode current collecting plate 27 and a negative electrode current collecting plate 25, which are electrically conducted with the respective electrodes (positive electrode and negative electrode), are respectively attached to the positive electrode current collector 12 and the negative electrode current collector 11 and led to the outside of the laminate sheet 29 so as to be sandwiched between the end portions of the laminate sheet 29. The positive electrode current collecting plate 27 and the negative electrode current collecting plate 25 may be respectively attached to the positive electrode current collector 12 and the negative electrode current collector 11 of the respective electrodes via a positive electrode lead and a negative electrode lead (not illustrated) by ultrasonic welding, resistance welding, or the like if necessary.

The lithium ion secondary battery described above is characterized by a negative electrode. Hereinafter, the main constituent members of the battery including the negative electrode will be described.

<Active Material Layer>

The active material layer 13 or 15 contains an active material and further other additives if necessary.

[Positive Electrode Active Material Layer]

The positive electrode active material layer 15 contains a positive electrode active material.

(Positive Electrode Active Material)

Examples of the positive electrode active material may include lithium-transition metal complex oxides such as $LiMn_2O_4$, $LiCoO_2$, $LiNiO_2$, $Li(Ni-Mn-Co)O_2$ and those in which a part of these transition metals are substituted with other elements, a lithium-transition metal phosphate compound, and a lithium-transition metal sulfate compound. In some cases, two or more kinds of positive electrode active materials may be used concurrently. Preferably, a lithium-transition metal complex oxide is used as a positive electrode active material from the viewpoint of capacity and output characteristics. More preferably, a complex oxide containing lithium and nickel is used, and still more preferably $Li(Ni-Mn-Co)O_2$ and those in which a part of these transition metals are substituted with other elements (hereinafter also simply referred to as "NMC complex oxides") are used. The NMC complex oxide has a layered crystal structure in which a lithium atom layer and a transition metal (Mn, Ni, and Co are orderly disposed) atom layer are alternately layered via an oxygen atom layer and the NMC complex oxide contains one Li atom per one atom of transition metal M, thus the amount of Li that can be taken out is two times that of spinel type lithium manganese oxide, that is, the supply capability is two times and the NMC complex oxide can have a high capacity.

As described above, the NMC complex oxide also includes a complex oxide in which a part of transition metal elements is substituted with other metal elements. Examples of other elements in that case may include Ti, Zr, Nb, W, P, Al, Mg, V, Ca, Sr, Cr, Fe, B, Ga, In, Si, Mo, Y, Sn, V, Cu, Ag, and Zn, Ti, Zr, Nb, W, P, Al, Mg, V, Ca, Sr, and Cr are preferable, Ti, Zr, P, Al, Mg, and Cr are more preferable, and Ti, Zr, Al, Mg, and Cr are still more preferable from the viewpoint of improving the cycle characteristics.

The NMC complex oxide preferably has a composition to be represented by General Formula (1): $Li_aNi_bMn_cCo_dM_xO_2$ (where a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c=d=1$. M is at least one kind of element selected from Ti, Zr, Nb, W, P, Al, Mg, V, Ca, Sr, or Cr) since the theoretical discharge capacity is high. Here, a represents the atomic ratio of Li, b represents the atomic ratio of Ni, c represents the atomic ratio of Mn, d represents the atomic ratio of Co, and x represents the atomic ratio of M. It is preferable that $0.4 \leq b \leq 0.6$ in General Formula (1) from the viewpoint of cycle characteristics. Incidentally, the composition of the respective elements can be measured by, for example, inductively coupled plasma (ICP) emission spectroscopy.

It is generally known that nickel (Ni), cobalt (Co), and manganese (Mn) contribute to capacity and output characteristics from the viewpoint of improving the purity of a material and the electron conductivity. Ti and the like partially substitute the transition metals in the crystal lattice. From the viewpoint of cycle characteristics, it is preferable that a part of the transition elements is substituted with other metal elements, and particularly it is preferable that $0<x\le0.3$ in General Formula (1). It is considered that the crystal structure is stabilized as at least one kind selected from the group consisting of Ti, Zr, Nb, W, P, Al, Mg, V, Ca, Sr, and Cr forms a solid solution and, as a result, a decrease in the capacity of the battery can be prevented even when charge and discharge are repeatedly performed and excellent cycle characteristics can be realized.

As a more preferred embodiment, it is preferable that b, c, and d satisfy $0.44 \le b \le 0.51$, $0.27 \le c \le 0.31$, and $0.19 \le d \le 0.26$ in General Formula (1) from the viewpoint of improving the balance between capacity and life span characteristics. For example, as compared with $LiCoO_2$, $LiMn_2O_4$, $LiNi_{1/3}Mn_{1/3}Co_{1/3}O_2$, and the like that have been proven in general consumer batteries, $LiNi_{0.5}Mn_{0.3}Co_{0.2}O_2$ has an advantage that it has a large capacity per unit weight and thus the energy density can be improved and a compact and high capacity battery can be fabricated and $LiNi_{0.5}Mn_{0.3}Co_{0.2}O_2$ is also preferable from the viewpoint of the cruising distance. Incidentally, $LiNi_{0.5}Co_{0.1}Al_{0.1}O_2$ is more advantageous from the viewpoint of larger capacity, but there is a problem with life span characteristics. In contrast, $LiNi_{0.5}Mn_{0.3}Co_{0.2}O_2$ has excellent life span characteristics equivalent to $LiNi_{1/3}Mn_{1/3}Co_{1/3}O_2$.

In some cases, two or more kinds of positive electrode active materials may be used concurrently. Preferably, a lithium-transition metal complex oxide is used as a positive electrode active material from the viewpoint of capacity and output characteristics. Incidentally, it goes without saying that positive electrode active materials other than those described above may be used.

The average particle diameter of the positive electrode active material to be contained in the positive electrode active material layer 15 is not particularly limited, but it is preferably from 1 to 30 μm and more preferably from 5 to 20 μm from the viewpoint of high output. Incidentally, in the present specification, the term "particle diameter" means the maximum distance among the distances between arbitrary two points on the contour line of the active material particles (observed surface) to be observed by using observation means such as a scanning electron microscope (SEM) and a transmission electron microscope (TEM). In addition, in the present specification, a value to be calculated as an average value of particle diameters of particles to be observed in from several to several tens of visual fields by using observation means such as a scanning electron microscope (SEM) and a transmission electron microscope (TEM) is adopted as the value of "average particle diameter". The particle diameter and average particle diameter of other constituents can be defined in the same manner.

The positive electrode active material layer 15 may contain a binder.

(Binder)

A binder is added for the purpose of maintaining the electrode structure by binding the active materials to each other or the active material with the current collector. The binder to be used in the positive electrode active material layer is not particularly limited, but examples thereof may include the following materials. Thermoplastic polymers such as polyethylene, polypropylene, polyethylene terephthalate (PET), polyether nitrile (PEN), polyacrylonitrile, polyimide, polyamide, polyamideimide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and any hydrogenated product thereof, and a styrene-isoprene-styrene block copolymer and any hydrogenated product thereof; fluorocarbon resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluorocarbon rubbers such as vinylidene fluoride-hexafluoropropylene-based fluorocarbon rubber (VDF-HFP-based fluorocarbon rubber), vinylidene fluoride-hexafluoropropylene-tetrafluoroethylene-based fluorocarbon rubber (VDF-HFP-TFE-based fluorocarbon rubber), vinylidene fluoride-pentafluoropropylene-based fluorocarbon rubber (VDF-PFP-based fluorocarbon rubber), vinylidene fluoride-pentafluoropropylene-tetrafluoroethylene-based fluorocarbon rubber (VDF-PFP-TFE-based fluorocarbon rubber), vinylidene fluoride-perfluoromethyl vinyl ether-tetrafluoroethylene-based fluorocarbon rubber (VDF-PFMVE-TFE-based fluorocarbon rubber), and vinylidene fluoride-chlorotrifluoroethylene-based fluorocarbon rubber (VDF-CTFE-based fluorocarbon rubber); and epoxy resins. Among these, polyvinylidene fluoride, polyimide, styrene-butadiene rubber, carboxymethyl cellulose, polypropylene, polytetrafluoroethylene, polyacrylonitrile, polyamide and polyamideimide are more preferable. These suitable binders exhibit excellent heat resistance, further have an extremely wide potential window, are stable to both the positive electrode potential and the negative electrode potential, and can be used in the active material layers. One kind of these binders may be used singly or two kinds thereof may be used concurrently.

The amount of the binder to be contained in the positive electrode active material layer is not particularly limited as long as it is an amount in which the active material can be bound, but it is preferably from 0.5% to 15% by mass and more preferably from 1% to 10% by mass with respect to the active material layer.

The positive electrode (positive electrode active material layer) can be formed by any method of a kneading method, a sputtering method, a vapor deposition method, a CVD method, a PVD method, an ion plating method, and a thermal spraying method in addition to a conventional method in which a slurry is applied.

[Negative Electrode Active Material Layer]

The negative electrode active material layer 13 contains a negative electrode active material.

(Negative Electrode Active Material)

In the present embodiment, the negative electrode active material has a ternary alloy composition to be represented by Si—Al—M (M is one or two or more transition metal elements). A silicon-containing alloy (hereinafter also referred to as a Si-containing alloy) constituting the negative electrode active material has an alloy composition (quaternary alloy composition) in which Al is added to a ternary alloy to be represented by Si—Sn—M (M is one or two or more transition metal elements). More specifically, the silicon-containing alloy can be expressed as an aspect focused on the alloy composition of the silicon-containing alloy and an aspect focused on the microstructure of the silicon-containing alloy.

The silicon-containing alloy constituting the negative electrode active material in the aspect (first aspect) focused on the alloy composition of the silicon-containing alloy has a composition to be represented by the following Chemical Formula (1).

$$Si_xSn_yM_zAl_wA_a \quad (1)$$

In Chemical Formula (1) above, M is one or two or more transition metal elements, A is an unavoidable impurity, and x, y, z, w, and a represent values of percentage by mass, and at this time, y, z, and w are $2 \leq y \leq 10$, $25 \leq z \leq 35$, and $0.3 \leq w \leq 3$, respectively, and x and a are the remainder.

The silicon-containing alloy constituting the negative electrode active material in the aspect (second aspect) focused on the microstructure of the silicon-containing alloy has a composition to be represented by the following Chemical Formula (1).

$$Si_xSn_yM_zAl_wA_a \quad (1)$$

In Chemical Formula (1) above, M is one or two or more transition metal elements, A is an unavoidable impurity, and x, y, z, w, and a represent values of percentage by mass, and at this time, y, z, and w are $0<y<100$, $0<z<100$, and $0<w<100$, respectively, and x and a are the remainder. Moreover, the microstructure of the Si-containing alloy has a first phase containing a silicide of a transition metal as a main component and a second phase containing Sn and Al in part and amorphous or low crystalline Si as a main component and further has a structure of which a part is composed of a plurality of the first phases which are independent and a part has a eutectic structure composed of the first phase and the second phase.

In a Si-based negative electrode active material, a Si phase is transformed from an amorphous state to a crystalline state when Si and Li are alloyed with each other at the time of charge and a large volume change (about 4 times) is caused. As a result, there is a problem that the active material particles themselves are broken and the function as an active material is lost. For this reason, as the negative electrode active material has the composition to be represented by Chemical Formula (1) above (first aspect), the phase transformation between the amorphous phase and the crystalline phase of the Si phase at the time of charge is suppressed, the collapse of the particles themselves can be thus suppressed, the function (high capacity) as an active material is maintained, and the cycle life can be improved. In addition, as the negative electrode active material has the composition to be represented by Chemical Formula (1) above and the microstructure described above (second aspect) as well, the phase transformation between the amorphous phase and the crystalline phase of the Si phase at the time of charge is suppressed, thus the collapse of the particles themselves can be suppressed, the function (high capacity) as an active material is maintained, and the cycle life can be improved.

These effects result from the fact that Si and Ti extremely strongly bond with each other, Si and Sn repel each other, and Ti and Sn bond with each other, an Al atom is attracted to a Ti atom and a Si atom in a liquid phase state as Al is added, thus the crystallization of $TiSi_2$ is suppressed, proeutectic $TiSi_2$ can be refined, and independent proeutectic $TiSi_2$ phases are finely dispersed in the structure. The inventors of the present invention have found out that the characteristics as described above are exerted by having a small amount of Al contained in Si—Sn—Ti in this manner.

In the alloy composition to be represented by Chemical Formula (1) above (first aspect), when y (composition ratio of Sn:% by mass) is less than 2, the effect of widening the atomic spacing of Si to be obtained as Sn forms a solid solution or is dispersed in the Si phase is insufficient and the durability cannot be sufficiently improved. When y exceeds 10, all Sn cannot form a solid solution and dispersed in the Si phase but a part thereof precipitates as a free Sn phase at the interface between $TiSi_2$ (silicide) and Si and the durability thus deteriorates. In addition, when z (composition ratio of Ti:% by mass) is less than 25, the proportion of silicide in the structure is too small, the expansion and shrinkage of Si associated with charge and discharge cannot be sufficiently suppressed, and the durability cannot be sufficiently improved. When z exceeds 35, the amount of silicide is too large, as a result, the amount of Si that can react with Li is too small, and the characteristics of high capacity, which is the maximum attraction of the Si-based alloy, cannot be fully exerted. Furthermore, when w (composition ratio of Al:% by mass) is less than 0.3, the refinement of the independent silicide phases (proeutectic silicide phases; first phases) is insufficient, also the effect of enhancing the forming ability of amorphous phase (decreasing the critical cooling velocity of crystallization of Si crystal) is insufficient, and the durability cannot be sufficiently improved. When w exceeds 3, The proportion of eutectic in the microstructure is too small (the proportion of proeutectic silicide is too large), the refinement of the structure as the whole alloy is insufficient, and the durability cannot be sufficiently improved.

The silicon-containing alloy constituting the negative electrode active material of the present embodiment has the alloy fine structure described above (second aspect) as it has the alloy composition described above (first aspect). Moreover, the silicon-containing alloy has an action due to the microstructure, and as a result, it can exhibit an effect that the expansion of Si at the time of charge and discharge can be suppressed and cycle durability can be improved. However, with regard to the action due to the alloy microstructure of the second aspect described above, the alloy may be any alloy which can have the microstructure and the alloy composition is not particularly limited, and thus such a limitation is adopted.

More specifically, in the silicon-containing alloy constituting the negative electrode active material of the present embodiment, an alloy having a microstructure can be obtained by adding a small amount of Al to a Si—Sn-M (hereinafter, described using Ti as an example) alloy. This microstructure has a first phase containing a silicide of a transition metal M (Ti) as a main component and a second phase containing Sn and Al in part and amorphous or low crystalline Si as a main component and a part of the microstructure is composed of a plurality of independent first phases and a part of the microstructure has a eutectic structure composed of the first phase and the second phase. By this, the silicon-containing alloy has actions that 1. a silicide of a transition metal M, particularly that of Ti ($TiSi_2$) can be refined (the modal radius of the independent first phases can be decreased), 2. the proportion of Si in the eutectic can be increased, and 3. forming ability of the amorphous (amorphous or low crystalline Si) phase can be enhanced. For this reason, an effect of being able to suppress the expansion of Si during charge and discharge and to improve the cycle durability is obtained by refinement and amorphization.

The reason why the above effect is obtained by the silicon-containing alloy constituting the negative electrode active material of the present embodiment is not clear in detail, but the following action mechanism (mechanism of action) is conceivable. Incidentally, the following action mechanism (mechanism of action) is based on a presumption, and the present invention does not adhere to the following action mechanism (action mechanism) at all.

In the silicon-containing alloy constituting the negative electrode active material of the present embodiment, the microstructure thereof has a configuration in which the second phase (Si phase) is eutecticized with the first phase ($TiSi_2$ phase) and the eutectic further enters the gaps between a plurality of independent first phases ($TiSi_2$ phases). In addition, the first phase ($TiSi_2$ phase) is superior to the second phase (a-Si phase) in the hardness and electron conductivity. Hence, the expansion of the second phase (a-Si phase) in the eutectic structure in the charge and discharge process can be suppressed by so-called two step repression that the expansion is repressed by the eutecticized first phase ($TiSi_2$ phase) and further by a plurality of independent first phases ($TiSi_2$ phases). This suppresses the phase transformation (crystallization into $Li_{15}Si_4$) between the amorphous phase and the crystalline phase when Si is alloyed with Li at the time of charge. As a result, expansion and shrinkage of the silicon-containing alloy constituting the negative electrode active material in the charge and discharge process of the electrical device is diminished and the second phase (a-Si phase) can be uniformly reacted as the second phase is eutecticized with the first phase (silicide phase) to be composed of a silicide exhibiting electrical conductivity. As a result, the cycle durability of the electrical device in which the negative electrode active material is used can be improved while the electrical device has a high capacity.

Furthermore, when the reason is explained by chemical thermodynamics (CALPHAD method=computational phase diagram method) by taking a case in which Ti is selected as a transition metal element M as an example, it can be seen that Si and Ti extremely strongly bond with each other, Si and Sn repel each other, and Ti and Sn bond with each other. Si and Al are attracted to each other in the liquid state but repel each other in the solid phase. In addition, it can be seen that Ti and Al bond with each other. When the effect obtained by adding Al to a Si—Sn—Ti alloy is investigated based on these, there is an effect that Al remains in the liquid phase and attracts Ti and Si and suppresses the crystallization of $TiSi_2$ in the case of performing cooling from a liquid state such as a quenching solidification method as Al is added to the Si—Sn—Ti alloy as in the present embodiment. (In the Si—Sn—Ti alloy, Sn in the liquid phase attracts Ti but repels Si. The crystallization of $TiSi_2$ can be effectively suppressed as Al is added). For this reason, proeutectic $TiSi_2$ can be refined, and independent proeutectic $TiSi_2$ phases are finely dispersed in the structure, thus the expansion and shrinkage of Si associated with charge and discharge can be effectively suppressed, and the durability can be improved.

Even when cooling further proceeds, the crystallization of proeutectic $TiSi_2$ is completed, and a stage in which $TiSi_2$ is eutecticized with Si is started, the amount of $TiSi_2$ in the eutectic structure decreases as the added amount of Al increases since the added Al remains in the liquid phase and suppresses the crystallization of $TiSi_2$. By this, $TiSi_2$ becomes relatively small with respect to Si in the eutectic structure and the Si phase and the $TiSi_2$ phase in the eutectic structure are in the form of being adjacent to each other as a structure, thus the proportion of Si in the eutectic structure increases.

In the present embodiment, the suppression is performed in the form of two step repression as described above and thus effective repression of the Si phase by the $TiSi_2$ phase is possible even if the Si phase is set to be relatively large with respect to the $TiSi_2$ phase. The expansion of Si can be effectively repressed by setting the ratio of the modal radius (also called mode radius) between proeutectic $TiSi_2$ and eutectic Si to 4.5 or less so that proeutectic $TiSi_2$ with respect to the Si phase, which directly contributes to charge and discharge, is not too large. In addition, the expansion of Si can be effectively repressed even if the ratio of the modal radius between eutectic $TiSi_2$ and eutectic Si is set to 1 or less, that is, the eutectic $TiSi_2$ is set to be relatively small with respect to the Si phase.

Furthermore, Si and Al are attracted to each other in the liquid phase but repel each other in the solid phase as described above, thus the stability of the Si-containing alloy in the liquid state is relatively high when Al is added to the Si—Sn—Ti alloy, and this makes it possible to enhance forming ability of the amorphous phase of the Si-containing alloy and to increase the degree of amorphousness. For this reason, the chemical structure of the a-Si phase (second phase) is hardly changed even at the time of intercalation and deintercalation of Li associated with charge and discharge, and it is possible to exhibit still higher durability.

In the present embodiment, as is apparent from the Chemical Formula (1) above, the silicon-containing alloy (having a composition of $Si_xSn_yM_zAl_wA_a$) has a composition in which a small amount of Al is added to a ternary alloy of Si, Sn and M (transition metal) (quaternary alloy composition). It is possible to realize high cycle durability by having such a composition. In other words, the respective values of y, z, and w (values of percentage by mass) in the composition to be represented by the Chemical Formula (1) above are $3 \leq y \leq 10$, $25 \leq z \leq 35$, and $0.3 \leq w \leq 3$ (first aspect) as described above.

In the composition to be represented by the Chemical Formula (1) above, y (composition ratio of Sn:% by mass) is preferably 10 or less, more preferably 9 or less, and still more preferably 8.5 or less. Further, y is preferably 2 or more and still more preferably 3 or more. It is excellent that y is in such a range from the viewpoint of being able to reversibly intercalate and deintercalate Li ions at the time of charge and discharge since Sn forms a solid solution in the second phase (Si phase) and increases the distance between the Si tetrahedrons in the Si phase, and it is possible to sufficiently improve the durability and to more efficiently exert the effect of the present invention.

In the composition to be represented by the Chemical Formula (1) above, z (composition ratio of the transition metal element M:% by mass) is preferably 35 or less, more preferably 34 or less, still more preferably 33 or less, yet more preferably 32 or less, and particularly preferably 31 or less. Further, z is preferably 25 or more, more preferably 28 or more, and still more preferably 29 or more. It is excellent that z is in such a range from the viewpoint of the balance between the maintenance of durability against charge and discharge (intercalation and deintercalation of Li ions) and the initial capacity, and it is possible to sufficiently improve the durability, to obtain a high capacity, and to more efficiently exert the effect of the present invention.

In the composition to be represented by the Chemical Formula (1) above, w (composition ratio of Al:% by mass) is preferably 3 or less, more preferably 2.5 or less, and still more preferably 2.0 or less. Further, w is preferably 0.3 or more, more preferably 0.35 or more, and more preferably 0.4 or more. It is excellent that w is in such a range from the viewpoint of being able to refine the proeutectic silicide precipitate, to keep the eutecticized ratio of silicide high, and to decrease the critical cooling velocity for amorphization, and it is possible to sufficiently improve the durability and to more efficiently exert the effect of the present invention.

In the composition to be represented by the Chemical Formula (1) above, the range of x (composition ratio of Si:% by mass) is not particularly limited as long as y, z, and w are in the above ranges. From the viewpoint of the balance between the maintenance of durability against charge and discharge (intercalation and deintercalation of Li ions) and the initial capacity, x is preferably 70 or less, more preferably 68 or less, still more preferably 67 or less, and particularly preferably 66 or less. From the above viewpoint, x is preferably 58 or more, more preferably 58.5 or more, and still more preferably 59 or more.

In the composition to be represented by the Chemical Formula (1) above, x+y+z+w is 100 at the maximum (not exceeding 100).

A microstructural constitution of the silicon-containing alloy according to the present embodiment can be obtained as the silicon-containing alloy contains a transition metal element M, particularly Ti, in a relatively large amount, Sn in a certain amount, and Al in a small amount while containing Si as a main component as described above. In addition, Sn and Al can be sufficiently dispersed and form a solid solution in part of the Si phase as a transition metal element M (preferably Ti) is selected as an element to be added to a negative electrode active material (Si-containing alloy; that is, Si as a main component), Sn is further added as a second additive element in the above range, and Al is further added as a third additive element in a small amount in the above range. Particularly, as Al is added, Sn can be finely dispersed (form a solid solution) in the Si phase (see FIGS. 8(b) to 8(e)). In addition, Al can be comparatively uniformly dispersed in the entire region of the Si phase (Al can be eutecticized with Si in part) (see FIGS. 9(b) to 9(e)). Hence, it possible to enhance the amorphous phase forming ability of the amorphous phase of the Si-containing alloy and to increase the degree of amorphousness by adding Al to the Si—Sn—Ti alloy as can be seen from the mechanism of action described above as well. For this reason, the chemical structure of the a-Si phase (second phase) is hardly changed even at the time of intercalation and deintercalation of Li associated with charge and discharge, and it is possible to obtain still higher durability. In addition, Sn and Al which are not dispersed or form a solid solution in part of the Si phase do not segregate as crystalline Sn or Al in the Si phase but crystallize at the boundary portion between the silicide phase and Si phase of the eutectic structure in the microstructure and further at the boundary portion between the independent silicide phase and the eutectic structure and the like. Among these, Sn functions as a Sn active material and thus sufficient cycle durability can be obtained while a high capacity is maintained. However, the suitable numerical ranges of the composition ratios of the respective constituent elements described above merely illustrate the respective preferred embodiments, and the ranges are within the technical scope of the present invention as long as they are included in the scope of claims.

Incidentally, in the present specification, the "inevitable impurities" means those contained in the Si-containing alloy since they have been present in the raw materials or inevitably mixed in the manufacturing process. The inevitable impurities are originally unnecessary, but they are allowable impurities since they are contained in a trace amount and do not affect the characteristics of the Si alloy. In the composition to be represented by the Chemical Formula (1) above, a is preferably less than 0.5 and more preferably less than 0.1. It is possible to confirm whether or not the negative electrode active material (silicon-containing alloy) has the composition to be represented by the Chemical Formula (1) above through qualitative analysis by fluorescent X-ray analysis (XRF) and quantitative analysis by inductively coupled plasma (ICP) emission spectroscopy.

In the preferred embodiment of the present invention, it is desirable to decrease the modal radius of proeutectic silicide ($TiSi_2$) in order to suppress the expansion and shrinkage of Si associated with charge and discharge, and it is also desirable to decrease the critical cooling velocity for amorphization of the mother alloy (to improve forming ability of the amorphous phase). The atomic ratio of Sn to Al in the Si-containing alloy is preferably in a range of from 0.3:1 to 3:1 from this viewpoint. The atomic ratio is more preferably in a range of from 0.3:1 to 1:2 and still more preferably in a range of from 0.3:1 to 1:1.

In the composition to be represented by the Chemical Formula (1) above, the kind of M (transition metal) is not particularly limited as long as it is an element that forms a silicide (silicide) with Si (also simply referred to as a "silicide forming element" in the present specification). The silicide forming element is preferably at least one kind selected from the group consisting of Ti, Zr, Ni, Cu, Mo, V, Nb, Sc, Y, Co, Cr, and Fe, more preferably at least one kind selected from Ti and Zr, and particularly preferably Ti. These elements have higher electron conductivity than silicides of other elements when forming a silicide and have a high strength. Among these, by selecting Ti as the transition metal, it is possible to suppress the phase transformation between the amorphous phase and the crystalline phase at the time of Li alloy formation and thus to improve the cycle life. In addition, the negative electrode active material has a higher capacity than a conventional negative electrode active material (for example, carbon-based negative electrode active material) by this. Particularly by selecting Ti as the first element to be added to the negative electrode active material (Si-containing alloy), Sn as the second additive element and Al as the third additive element, it is possible to further suppress the phase transformation between the amorphous phase and the crystalline phase at the time of Li alloy formation and thus to further improve the cycle life. Consequently, in a preferred embodiment of the present invention, M is titanium (Ti) in the composition to be represented by the Chemical Formula (1) above. Next, the particle diameter of the Si-containing alloy constituting the negative electrode active material in the present embodiment is not particularly limited, but it is preferably from 0.1 to 20 μm and more preferably from 0.2 to 10 μm as an average particle diameter D50. The particle diameter is preferably from 5 to 30 μm and more preferably from 10 to 25 μm as an average particle diameter D90.

(Microstructural Constitution of Si-Containing Alloy)

In the silicon-containing alloy constituting the negative electrode active material in the present embodiment, it is preferable that the microstructure has (1) a silicide phase (first phase) containing a silicide (silicide) of a transition metal as a main component and (2) a second phase (Si phase, preferably an amorphous Si phase (a-Si phase)) containing Sn and Al in part (specifically, obtained as Sn and Al are dispersed and form a solid solution (dispersed in a solid solution state) in Si, or Sn and Al are dispersed in Si in the form of being incorporated therein) and amorphous or low crystalline Si as a main component and further has a structure of which (3) a part is composed of a plurality of the first phases which are independent and (4) a part has a eutectic structure composed of the first phase and the second phase.

In the Si-containing alloy having the microstructural constitution, the microstructure thereof has a configuration in which the second phase (Si phase) is eutecticized with the first phase (silicide phase) and the eutectic further enters the gaps between a plurality of independent first phases (silicide phases). Further, the first phase (silicide phase), for example, the $TiSi_2$ phase is superior to the second phase (Si phase), for example, a-Si phase in the hardness and electron conductivity. Hence, the expansion of the a-Si phase in the eutectic structure in the charge and discharge process can be suppressed by so-called two step repression that the expansion is repressed by the eutecticized $TiSi_2$ phase and further by a plurality of independent $TiSi_2$ phases. This suppresses the phase transformation (crystallization into $Li_{15}Si_4$) between the amorphous phase and the crystalline phase when Si is alloyed with Li at the time of charge. As a result, expansion and shrinkage of the silicon-containing alloy in the charge and discharge process is diminished and the a-Si phase (particularly Si active material) can be uniformly reacted as the a-Si phase (second phase) is eutecticized with the silicide phase (first phase) to be composed of a silicide exhibiting electrical conductivity. As a result, the cycle durability of the electrical device in which the negative electrode active material is used can be improved while the electrical device has a high capacity.

The first phase (silicide phase) contains a silicide (silicide) of a transition metal as a main component, and thus M is one or more kinds of transition metal elements selected from the above silicide forming elements. In other words, M is the silicide forming element which constitutes the first phase (silicide phase) in a case in which M is one transition metal element. In addition, in a case in which M is two or more transition metal elements, at least one kind of M is a silicide forming element which constitutes the first phase (silicide phase). The rest of the transition metal elements may be a transition metal element to be contained in the second phase (a-Si phase) or a silicide forming element which constitutes the first phase (silicide phase). Alternatively, the rest of the transition metal elements may be a transition metal element which constitutes a phase (transition metal phase) formed as a transition metal crystallizes other than the first phase and the second phase (a-Si phase).

Hereinafter, in the present embodiment, the Si-containing alloy (negative electrode active material) having the preferred microstructural constitution will be described.

(1) First Phase (Silicide Phase) Containing Silicide (Silicide) of Transition Metal as Main Component In the Si-containing alloy having a microstructural constitution, the first phase (silicide phase) contains a silicide (silicide) of a transition metal as a main component. This first phase (silicide phase) is superior to the second phase (a-Si phase) in the hardness and electron conductivity. Hence, the silicide phase (first phase) can improve the low electron conductivity of the a-Si phase (particularly the Si active material) (see the mechanism of action described above) as well as the silicide phase (first phase) plays a role of maintaining the shape of the Si active material in the a-Si phase (second phase) against the stress at the time of expansion. Furthermore, this silicide phase (first phase) contains a silicide (for example, $TiSi_2$) of a transition metal, and thus it exhibits excellent affinity for the a-Si phase (second phase) and can suppress cracking at the (crystal) interface particularly by the volume expansion at the time of charge.

In addition, it is preferable that M is titanium (Ti) in the composition to be represented by the Chemical Formula (1) above as described above. The first phase and the second phase can be further refined in the eutectic structure of the Si-containing alloy particularly as Ti is selected as an element to be added to the negative electrode active material (Si-containing alloy), Sn is added as the second additive element, and Al is added as the third additive element in a small amount. As a result, it is possible to further suppress the phase transformation between the amorphous phase and the crystalline phase at the time of Li alloy formation and thus to further improve the cycle life (durability). In addition, the negative electrode active material (Si-containing alloy) of the present invention has a higher capacity than a conventional negative electrode active material (for example, carbon-based negative electrode active material) by this. Consequently, it is preferable that the silicide phase (first phase) containing a silicide (silicide) of a transition metal as a main component in the microstructure is titanium silicide ($TiSi_2$).

In the silicide phase (first phase), to contain a silicide "as a main component" means that the silicide accounts for 50% by mass or more, preferably 80% by mass % or more, still more preferably 90% by mass or more, particularly preferably 95% by mass or more, and most preferably 98% by mass or more of the silicide phase. Incidentally, it is ideal that a silicide accounts for 100% by mass of the silicide phase. However, the alloy can contain inevitable impurities which have been present in the raw materials or inevitably mixed in the manufacturing process. It is thus practically difficult to obtain the first phase containing silicide at 100% by mass.

(2) Second Phase (Amorphous Si Phase (a-Si Phase)) Containing Al in Part and Amorphous or Low Crystalline Si as Main Component In the Si-containing alloy having the microstructural constitution, the second phase (amorphous Si phase (a-Si phase)) can contain Sn and Al in part (specifically, obtained as Sn and Al are dispersed and form a solid solution (dispersed in a solid solution state) in Si or Sn and Al are (finely) dispersed in Si in the form of being incorporated therein) and amorphous or low crystalline Si as a main component. This a-Si phase (second phase) is a phase containing amorphous or low crystalline Si as a main component.

This a-Si phase (second phase; a phase containing a-Si as a main component) is a phase to be involved in occlusion and release of lithium ions at the time of operation of the electrical device (lithium ion secondary battery) of the present embodiment and a phase to be electrochemically reactive with Li. The a-Si phase (second phase) can occlude and release a large amount of Li per weight and per volume since it contains Si as a main component. However, Si exhibits poor electron conductivity, and thus the a-Si phase (second phase) may contain a trace amount of additive elements such as phosphorus and boron, a transition metal and the like. Incidentally, it is preferable that the a-Si phase (second phase; a phase containing Si as a main component) is amorphized more than the silicide phase (first phase). By adopting such a configuration, the negative electrode active material (Si-containing alloy) can have a higher capacity. It is possible to confirm whether or not the a-Si phase (second phase) is amorphized more than the silicide phase (first phase) by electron diffraction analysis. Specifically, a net pattern (lattice-like spot) in two-dimensional point arrangement is obtained for a single crystal phase, a Debye-Scherrer ring (diffraction ring) is obtained for a polycrystalline phase, and a halo pattern is obtained for an amorphous phase by electron diffraction analysis. The above confirmation is possible by utilizing this.

In addition, Sn (Sn which is dispersed and forms a solid solution inside the crystal structure of Si) in the a-Si phase (second phase) can also occlude and release a large amount of Li per weight and per volume as compared with a carbon negative electrode material (carbon negative electrode material). In addition, when it is described by taking a case in which Ti is selected as a transition metal element M as an example, it can be seen that Si and Ti extremely strongly bond with each other, Si and Sn repel each other, and Ti and Sn bond with each other. Si and Al are attracted to each other in the liquid state but repel each other in the solid phase. In addition, it can be seen that Ti and Al bond with each other. When the effect obtained by adding Al to a Si—Sn—Ti alloy is investigated based on these, there is an effect that Al remains in the liquid phase and is attracted to Ti and Si and suppresses the crystallization of $TiSi_2$ in the case of performing cooling from a liquid state in the manufacturing process (preferably a quenching solidification method and the like) as Al is added to the Si—Sn—Ti alloy as in the present embodiment. (In the Si—Sn—Ti alloy, Sn in the liquid phase is attracted to Ti but repels Si. The crystallization of $TiSi_2$ can be effectively suppressed as Al enters). For this reason, proeutectic $TiSi_2$ can be refined, and an independent proeutectic $TiSi_2$ phase is finely dispersed in the structure, thus the expansion and shrinkage of Si associated with charge and discharge can be effectively suppressed, and the durability can be improved. The amount of $TiSi_2$ in the eutectic structure decreases as the amount of Al added increases since Al added remains in the liquid phase and suppresses the crystallization of $TiSi_2$ even when cooling further proceeds in the manufacturing process (preferably a quenching solidification method and the like), the crystallization of proeutectic $TiSi_2$ is completed, and a stage in which $TiSi_2$ is eutecticized with Si is started. By this, $TiSi_2$ becomes relatively small with respect to Si in the eutectic structure and the Si phase and $TiSi_2$ phase in the eutectic structure are in the form of being adjacent to each other, thus the proportion of Si in the eutectic structure increases. Furthermore, Si and Al are attracted to each other in the liquid phase but repel each other in the solid phase, thus the stability of the Si-containing alloy in the liquid state is relatively high when Al is added to the Si—Sn—Ti alloy, and this makes it possible to enhance the amorphous phase forming ability of the Si-containing alloy and to increase the degree of amorphousness. For this reason, the chemical structure of the a-Si phase (second phase) is hardly changed even at the time of intercalation and deintercalation of Li associated with charge and discharge, and it is possible to exhibit still higher durability (see the mechanism of action described above).

It is preferable that M is titanium (Ti) in the composition to be represented by Chemical Formula (1) above as described above. It is possible to further suppress the phase transformation between the amorphous phase and the crystalline phase at the time of Li alloy formation and thus to further improve the cycle life particularly as Ti is selected as an element to be added to the negative electrode active material (Si-containing alloy), Sn is added as the second additive element, and Al is added as the third additive element in a small amount. In addition, the negative electrode active material (Si-containing alloy) of the present invention has a higher capacity than a conventional negative electrode active material (for example, carbon-based negative electrode active material) by this. Consequently, it is preferable that the Si phase (second phase) containing amorphous or low crystalline Si as a main component in the microstructure contains amorphous (amorphous) Si as a main component.

From the fact described above, it is preferable that the silicide of a transition metal of the first phase in the microstructure is titanium silicide ($TiSi_2$) and the Si phase (second phase) is Si phase containing amorphous (amorphous) Si as a main component. By adopting such a configuration, the cycle durability of an electrical device can be further improved while the electrical device has a high capacity.

In the a-Si phase (second phase), to contain Sn and Al and amorphous or low crystalline Si "as a main component" means that Si accounts for 50% by mass or more, preferably 80% by mass % or more, more preferably 90% by mass or more, particularly preferably 95% by mass or more, and most preferably 98% by mass or more of the Si phase. However, the alloy can contain inevitable impurities which have been present in the raw materials or inevitably mixed in the manufacturing process. It is thus practically difficult to obtain the second phase containing Si at 100% by mass.

The reason why it is described that the Si phase (second phase) "contains Sn in part" is because a portion containing Sn is observed in the Si phase although most of the Si phase is a portion which does not almost contain Al (the Si portion functions as an active material), for example, in a case in which FIG. 7(*b*) and FIG. 9(*b*) are compared with FIG. 9(*e*). It can be seen that Sn is finely dispersed in the eutectic portion particularly as a small amount of Al is added (see FIG. 7(*b*) and FIG. 9(*b*)). In addition, at the portion containing Sn in the Si phase, Sn is dispersed in Si and forms a solid solution or dispersed in Si in the form of being incorporated therein (the Sn—Si solid solution or incorporated Sn functions as an active material). In addition, the rest of Sn in the eutectic structure crystallizes not on the Si phase but on the silicide phase in the eutectic structure, at the boundary portion of the Si phase, and the like to form a Sn phase containing Sn as a main component (to function as an active material). This also applies to the entire microstructure, and Sn also crystallizes at the boundary portion with the independent silicide phase and the like to form a Sn phase (to function as an active material) in addition to the silicide phase in the eutectic structure and the boundary portion of the Si phase. To contain Sn "as a main component" means that Sn accounts for 50% by mass or more, preferably 80% by mass % or more, still more preferably 90% by mass or more, particularly preferably 95% by mass or more, and most preferably 98% by mass or more of the Sn phase. However, the alloy can contain inevitable impurities which have been present in the raw materials or inevitably mixed in the manufacturing process. It is thus practically difficult to obtain a Sn phase containing Sn at 100% by mass.

The reason why it is described that the Si phase (second phase) "contains Al in part" is because a portion containing Al is observed in the Si phase although most of the Si phase is a portion which does not almost contain Al (the Si portion functions as an active material), for example, in a case in which FIG. 10(*b*) is compared with FIG. 10(*e*). Particularly, Al is comparatively uniformly dispersed in the entire region of the eutectic portion. Incidentally, a portion at which Al overlaps with Si and is concentrated is recognized in the eutectic portion. It is considered that this is because Al is eutecticized with Si at this portion (see FIG. 10(*b*)). At the portion containing Al in the Si phase, Al is dispersed in Si and forms a solid solution or dispersed in Si in the form of being incorporated therein (see the mechanism of action described above for this effect by Al). In addition, the rest of Al in the eutectic structure crystallizes not on the Si phase but inside the silicide phase in the eutectic structure, on the silicide phase, at the boundary portion of the Si phase, and the like in the form of being finely dispersed as a whole to form an Al phase containing Al as a main component or a TiAl$_x$Si$_y$ (x+y=2) compound phase. This also applies to the entire microstructure, and Al also crystallizes inside the independent silicide phase, at the boundary portion with the independent silicide phase and the like in the form of being finely dispersed as a whole to form an Al phase or a TiAl$_x$Si$_y$ (x+y=2) compound phase in addition to the inside of the silicide phase in the eutectic structure, the silicide phase, and the boundary portion of the Si phase. Incidentally, the reason why the TiAl$_x$Si$_y$ (x+y=2) compound phase in which a part of TiSi$_2$ is substituted with Al is added in addition to the Al phase containing Al as a main component is because there is a portion at which three elements overlap in the EDX mapping composite image of Si—Al—Ti (FIG. 10(e)) and it is indicated that a TiAl$_{0.3}$Si$_{1.7}$ compound (the same crystal structure as C49-TiSi$_2$) exists on the homepage (inorganic material database) of NIMS (National Institute for Materials Science). To contain Al "as a main component" means that Al accounts for 50% by mass or more, preferably 80% by mass % or more, more preferably 90% by mass or more, particularly preferably 95% by mass or more, and most preferably 98% by mass or more of the Al phase. However, the alloy can contain inevitable impurities which have been present in the raw materials or inevitably mixed in the manufacturing process. It is thus practically difficult to obtain an Al phase containing Al at 100% by mass.

(3) Part Composed of a Plurality of Independent First Phases

In the Si-containing alloy having the preferred structure described above, the microstructure has a structure of which a part is composed of a plurality of independent first phases. As the Si-containing alloy has the structure, expansion of the second phase (a-Si phase) in the eutectic structure in the charge and discharge process can be suppressed by the repression by a plurality of independent first phases. In addition, it is possible to improve the low electron conductivity of the a-Si phase (particularly the Si active material).

The upper limit of the modal radius A of a plurality of independent first phases constituting a part of the microstructure is not particularly limited, but it is, for example, 280 nm or less, preferably 260 nm or less, more preferably 252 nm or less, still more preferably 250 nm or less, and particularly preferably 235 nm or less. The lower limit of the modal radius A of the independent first phases in the eutectic structure is not particularly limited, but it is preferably 160 nm or more, more preferably 170 nm or more, still more preferably 180 nm or more, and particularly preferably 190 nm or more. A plurality of independent first phases constituting a part of the microstructure can be finely dispersed in the microstructure as the modal radius A is in such a range. Consequently, it is possible to effectively suppress the expansion and shrinkage of Si associated with charge and discharge and thus to improve the durability.

The radius distribution of a plurality of independent first phases constituting a part of the microstructure is preferably from 80 to 1000 nm, more preferably from 100 to 800 nm, still more preferably from 110 to 500 nm, and particularly preferably from 120 to 400 nm, and among these, the radius distribution is preferably from 150 to 360 nm. A plurality of independent first phases constituting a part of the microstructure can be finely dispersed in the microstructure as the radius distribution is in such a range. Consequently, it is possible to effectively suppress the expansion and shrinkage of Si associated with charge and discharge and thus to improve the durability.

(4) Structure of which Part has Eutectic Structure Composed of First Phase and Second Phase In the Si-containing alloy having the preferred structure described above, the microstructure has a structure of which a part has a eutectic structure composed of the first phase and the second phase. As a part of the microstructure has a eutectic structure composed of the first phase and the second phase, the expansion of the second phase (a-Si phase) in the eutectic structure in the charge and discharge process can be suppressed through repression by the eutecticized first phase. In other words, the expansion of the a-Si phase can be repressed by the eutecticized first phase (TiSi$_2$ phase) and the part composed of a plurality of independent first phases (TiSi$_2$ phase), that is, expansion of the second phase can be suppressed by two step stage repression. In addition, it is possible to improve the low electron conductivity of the second phase (particularly a-Si phase; Si active material) since the first phase (TiSi$_2$ phase) and the second phase (Si phase) in the eutectic structure are in the form of being adjacent to each other as a structure.

The upper limit of the modal radius B of the first phase in the eutectic structure is not particularly limited, but it is preferably 70 nm or less, more preferably 67 nm or less, particularly preferably 58 nm or less, and particularly preferably 53 nm or less. In addition, the lower limit of the modal radius of the first phase in the eutectic structure is not particularly limited, but it is preferably 20 nm or more, more preferably 25 nm or more, still preferably 30 nm or more, and particularly preferably 35 nm or more, and among these, the lower limit is more preferably 40 nm or more. The effect described above can be more effectively exerted as the lower limit is in such a range.

The upper limit of the modal radius C of the second phase in the eutectic structure is not particularly limited, but it is preferably 80 nm or less, more preferably 75 nm or less, and still more preferably 70 nm or less. In addition, the lower limit of the modal radius of the second phase in the eutectic structure is not particularly limited, but it is preferably 40 nm or more, more preferably 45 nm or more, still more preferably 50 nm or more, and particularly preferably 57 nm or more, and among these, the lower limit is more preferably 61 nm or more. The effect described above can be more effectively exerted as the lower limit is in such a range.

The radius distribution of the second phase in the eutectic structure is preferably from 10 to 200 nm, more preferably from 20 to 150 nm, and still more preferably from 25 to 120 nm. The effect described above can be more effectively exerted as the radius distribution is in such a range.

In the present embodiment, the ratio of the modal radius A of the independent first phase to the modal radius C of the second phases of the eutectic structure in the microstructure: D2 (modal radius A of independent first phases/modal radius C of second phases of eutectic structure) is preferably 4.5 or less. The ratio is more preferably 4.3 or less, still more preferably 4.0 or less, and particularly preferably 3.8 or less, and among these, the ratio is preferably 3.6 or less. Further, the lower limit of the ratio of the modal radius A of the independent first phases to the modal radius C of the second phase of the eutectic structure in the microstructure: D2 is not particularly limited, but it is, for example, 2.0 or more and preferably 3.0 or more. In other words, by setting the ratio of the modal radius A of the independent first phases to the modal radius C of the second phases of the eutectic structure: D2 to 4.5 or less, the independent first phases (proeutectic TiSi$_2$) is not too large with respect to the second phase (Si phase) of the eutectic structure which directly contributes to charge and discharge and the expansion of Si can be thus effectively repressed.

In the present embodiment, the ratio of the modal radius B of the first phases to the modal radius C of the second phases in the eutectic structure: D3 (modal radius B of first phases of eutectic structure/modal radius C of second phases of eutectic structure) is preferably 1.00 or less, more preferably 0.95 or less, and still more preferably 0.90 or less. In addition, the lower limit of the ratio of the modal radius B of the first phases to the modal radius C of the second phases in the eutectic structure: D3 is not particularly limited, but it is, for example, 0.40 or more, preferably 0.50 or more, and more preferably 0.60 or more. In other words, it is possible to effectively repress the expansion of Si even if the ratio of the modal radius B of the first phases to the modal radius C of the second phases in the eutectic structure: D3 is set to 1 or less, that is, the modal radius B of the first phases ($TiSi_2$ phase) is set to be relatively small with respect to the modal radius C of the second phases (Si phase) in the eutectic structure.

The Si-containing alloy having the structures (1) to (4) described above is obtained as predetermined raw materials of the alloy are melted and quenched and alloyed at a predetermined cooling velocity by, for example, a liquid quenching roll solidification method and thus a plurality of the independent first phases crystallize in the liquid phase as a proeutectic, and a eutectic structure composed of the first phase and the second phase crystallizes in the liquid phase in the gap of this independent first phase.

In each of the part composed of a plurality of the independent silicide phases (first phase) and the silicide phase (first phase) in the eutectic structure, a plurality of phases may exist, for example, two or more phases (for example, $MSi_2$ and MSi) having different composition ratios of transition metal elements M to Si may exist. In addition, two or more phases may exist by containing silicides of different transition metal elements. Here, the kind of transition metal to be contained in the silicide phase (first phase) is not particularly limited, but it is preferably at least one kind selected from the group consisting of Ti, Zr, Ni, Cu, Mo, V, Nb, Sc, Y, Co, Cr, and Fe, more preferably Ti or Zr, and particularly preferably Ti. These elements exhibit higher electron conductivity than silicides of other elements when silicides of these elements are formed and have a high strength. Particularly, $TiSi_2$ that is a silicide in a case in which the transition metal element is Ti is preferable since it exhibits extremely excellent electron conductivity.

In a case in which the transition metal element M is Ti and two or more phases (for example, $TiSi_2$ and TiSi) having different composition ratios exist in the silicide phase, 50% by mass or more, preferably 80% by mass or more, more preferably 90% by mass or more, particularly preferably 95% by mass or more and most preferably 100% by mass of the silicide phase is the $TiSi_2$ phase.

Figure 40:
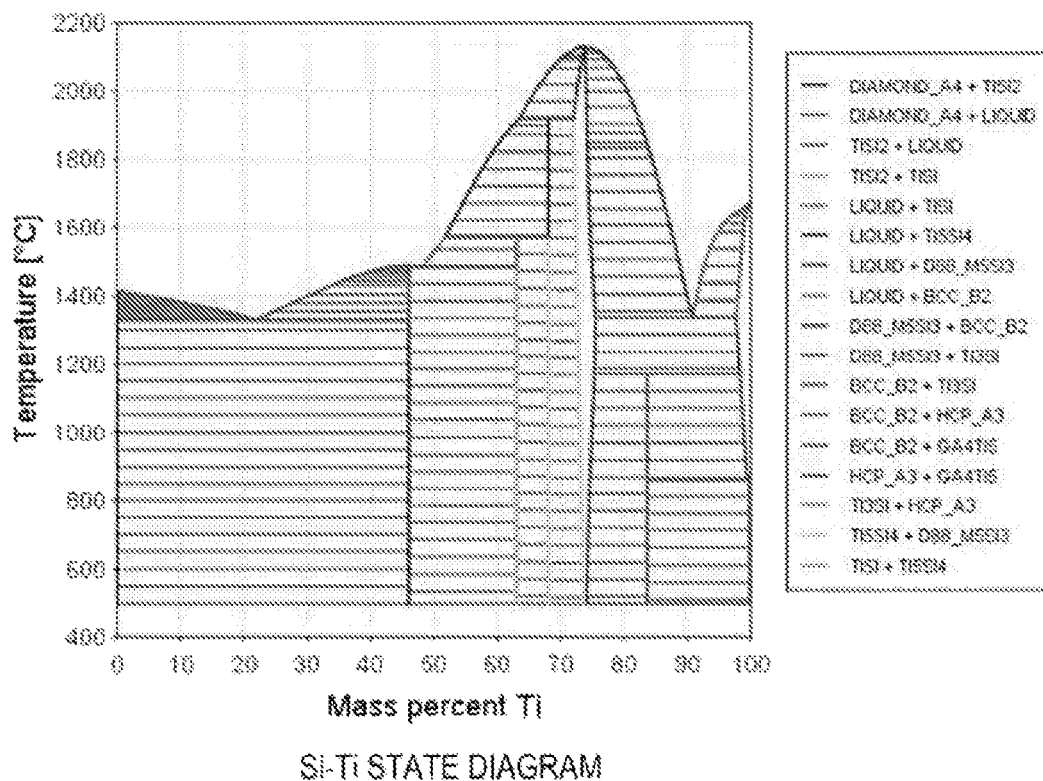
FIG. 40 is a state diagram of a Si—Ti binary system.

Furthermore, in a case in which the transition metal element M is Ti, according to the chemical thermodynamics (CALPHAD method=computational phase diagram method), Si and Ti extremely strongly bond with each other from the Si—Ti binary phase diagram of FIG. 40. Si and Sn repel each other from the Si—Sn binary phase diagram of FIG. 41. In addition, it can be seen that Ti and Sn bond with each other from the Ti—Sn binary phase diagram of FIG. 42. Furthermore, Si and Al are attracted to each other in the liquid state but repel each other in the solid phase from the Si—Al binary phase diagram of FIG. 43. In addition, it can be seen that Ti and Al bond with each other from the Ti—Al binary phase diagram of FIG. 44. In other words, in the Si—Sn—Ti—Al alloy of the present embodiment, Al remains in the liquid phase and is attracted to Ti and Si and can suppress the crystallization of $TiSi_2$, for example, in the case of performing cooling from a liquid state such as a quenching solidification method as Al is contained in a smaller amount as compared with that of Ti. (In the Si—Sn—Ti alloy, Sn in the liquid phase is attracted to Ti but repels Si. The crystallization of $TiSi_2$ can be effectively suppressed as Al enters). For this reason, proeutectic $TiSi_2$ can be refined, an independent proeutectic $TiSi_2$ phase is finely dispersed in the structure, thus the expansion and shrinkage of Si associated with charge and discharge can be effectively suppressed, and the durability can be improved.

The binary phase diagram can be calculated using the integrated thermodynamic calculation system: Thermo-Calc Ver2015a developed by Thermo-Calc software AB Sweden (Japan Agency: Itochu Techno-Solutions Corporation) and solid solution general purpose database: SSOL5 (SGTE* Solution Database, ver. 5.0) as a thermodynamic database. (*SGTE: Scientific Group Thermodata Europe).

With regard to the fact that the microstructure of the Si-containing alloy has the configurations (structures) (1) to (4) described above, the microstructural constitution of the Si-containing alloy (particle) which is the negative electrode active material particle can be clarified, for example, by observation using a high resolution STEM (scanning transmission electron microscope), element analysis by EDX (energy dispersive X-ray spectroscopy), electron diffraction measurement, and the measurement by EELS (electron energy loss spectroscopy). As the analyzer (analysis method), for example, XPS (X-ray photoelectron spectroscopy), TEM-EDX (transmission electron microscope-energy dispersive X-ray spectroscopy), STEM-EDX/EELS (scanning transmission electron microscope-energy dispersive X-ray spectroscopy/electron energy loss spectroscopy), HAADF-STEM (high-angle annular dark-field scanning transmission electron microscopic imaging), and BF-STEM (bright field-scanning transmission electron microscopic imaging) can be used. However, in the present embodiment, the analyzer (analysis method) is not limited to these, and various kinds of existing observation apparatuses (apparatus conditions, measurement conditions) to be used for the microstructure of alloy may be used.

(Analysis on microstructural constitution of Si-containing alloy) Hereinafter, the microstructure of the negative electrode active material having the microstructural constitution described above will be described using an example in which the Si-containing alloy (particle) fabricated in Example 1 is used as a sample (sample). However, for the Si-containing alloys (particles) which are the negative electrode active materials to be obtained in other embodiments as well, the microstructural constitution of the alloy (particle) can be clarified in the same manner. In addition, for Examples 2 to 8 and Comparative Examples 1 and 2 as well, the microstructural constitution can be analyzed by the same method.

1: Analytical Method
1-1: Preparation of Sample
FIB (focused ion beam) method; micro-sampling system (FB-2000A manufactured by Hitachi, Ltd.)
Al grid is used.
1-2: STEM Image, EDX, and EELS (Electron Energy Loss Spectroscopy) Measurement Apparatuses and Conditions are as Follows.
1) Apparatus: Atomic Resolution Analytical Electron Microscope JEM-ARM 200F Manufactured by JEOL Ltd.
EDX (energy dispersive X-ray spectroscopy);
JED-2300 manufactured by JEOL Ltd.
(100 $mm^2$ silicon drift (SDD) type);
System; analysis station
EELS (electron energy loss spectroscopy);
GATAN GIF Quantum
Image acquisition; digital micrograph 2) Measurement Conditions; Acceleration Voltage: 200 kV Beam diameter: about 0.2 nm 4 (diameter)

Energy resolution: about 0.5 eV FWHM 1-3: The Electron Diffraction Measurement Apparatus and Conditions are as Follows.

1) Apparatus: Field Emission Type Electron Microscope JEM 2100F Manufactured by JEOL Ltd.

Image acquisition; digital micrograph

2) Measurement Conditions; Acceleration Voltage: 200 kV

Beam diameter: about 1.0 nm 4 (diameter)

2: (Quantitative Mapping) Analysis by STEM-EDX (Scanning Transmission Electron Microscope-Energy Dispersive X-Ray Spectroscopy)

FIG. 3 is a diagram illustrating a cross-sectional SEM (scanning electron microscope) image of a rapidly quenched ribbon alloy having an alloy composition $Si_{60.0}Sn_{8.1}Ti_{30.1}Al_{1.8}$ (mass ratio) of Example 1. From the analysis results illustrated in FIG. 3 and FIGS. 4 to 10 to be described below, it is confirmed that the Si-containing alloy of Example 1 has a structure of which a part is composed of an independent first phase ($TiSi_2$ phase) and a part has a eutectic structure composed of a first phase and a second phase.

FIGS. 4 to 10 illustrate the results obtained by analyzing the portion (gray portion) of the independent first phase ($TiSi_2$ phase) in FIG. 3 and the structural constitution of the eutectic portion (black portion) of the first phase with the second phase.

FIG. 4(a) and FIG. 4(b) are images (low magnification) of a sample prepared from particles of a negative electrode active material (Si-containing alloy) of Example 1 by a FIB method and observed by BF-STEM (bright field-scanning transmission electron microscopic imaging) and HAADF-STEM (high-angle annular dark-field scanning transmission electron microscopic imaging). The object to be measured was particles of the Si-containing alloy (negative electrode active material) having an alloy composition $Si_{60.0}Sn_{8.1}Ti_{30.1}Al_{1.8}$ (mass ratio) fabricated in Example 1. The average particle diameter D50 of the particles of the Si-containing alloy (negative electrode active material) was 6.7 µm, and the average particle diameter D90 of the particles of the Si-containing alloy (negative electrode active material) was 20.6 µm. Moreover, the surface of the particles of the Si-containing alloy (negative electrode active material) was coated with alumina at 2% by mass and then the cross section of the coated particles was used as the object to be observed.

FIGS. 5(a)-5(e) are diagrams (low magnification) illustrating the quantitative mapping data by STEM-EDX (scanning transmission electron microscope-energy dispersive X-ray spectroscopy). FIG. 5(a) is the same HAADF-STEM image as that in FIG. 4(b). FIG. 5(b) is a diagram illustrating the mapping data of Sn (on lower left) measured in the same visual field as HAADF-STEM (FIG. 5(a) on upper left). FIG. 5(c) is a diagram illustrating the mapping data of Si (on lower center) measured in the same visual field as HAADF-STEM (FIG. 5(a) on upper left). FIG. 5(d) is a diagram illustrating the mapping data of Ti (on lower right) measured in the same visual field as HAADF-STEM (FIG. 5(a) on upper left). FIG. 5(e) is a diagram (on upper right) obtained by superimposing the mapping data in FIGS. 5(b) to 5(d) (Sn, Si, and Ti) measured in the same visual field as HAADF-STEM (FIG. 5(a) on upper left) one on another. Incidentally, the mapping in FIGS. 5(b) to 5(e) can be actually colorized (colored), and thus silicide ($TiSi_2$) can be distinguished at first glance since it becomes pink in which blue of Si is mixed with red of Ti, for example, when Sn is colored to green, Si to blue, and Ti to red. However, it is required to submit the application drawing as a black and white image, and thus the analysis information clarified by such colorization is included in FIG. 4(b) and FIGS. 5(d) and 5(e). This is because those skilled in the art can easily acquire the same analysis information from the quantitative mapping data by STEM-EDX (scanning transmission electron microscope-energy dispersive x-ray spectroscopy) in the same manner as in FIGS. 5(a)-5(e) by the same image analysis as the present application. Meanwhile, in FIGS. 5(b) to 5(d), the portion at which Sn, Si, and Ti do not exist are represented in black and the portion at which each of these elements exists is represented in light and shade of gray or white. This makes it possible to confirm the presence and distribution state of Si, Sn, and Ti which are elements constituting the active material alloy $Si_{60}Sn_{8.1}Ti_{30.1}Al_{1.8}$ (the negative electrode active material of Example 1) of an object to be measured.

Figure 6A:
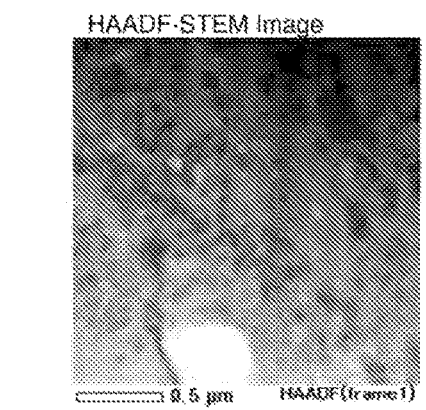
FIGS. 6(a)-6(e) are diagrams (low magnification) illustrating the quantitative mapping data by STEM-EDX (scanning transmission electron microscope-energy dispersive X-ray spectroscopy).
Figure 6E:
Figure 6B:
Figure 6C:
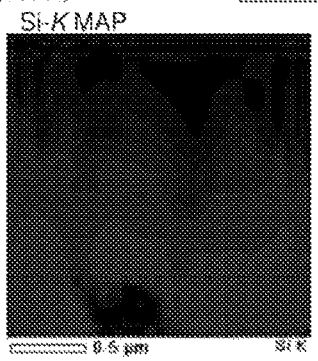
Figure 6D:
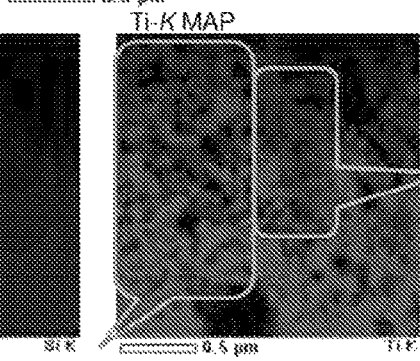

FIGS. 6(a)-6(e) are diagrams (low magnification) illustrating the quantitative mapping data by STEM-EDX (scanning transmission electron microscope-energy dispersive X-ray spectroscopy). FIG. 6(a) is the same HAADF-STEM image as that in FIG. 4(b). FIG. 6(b) is a diagram illustrating the mapping data of Al (on lower left) measured in the same visual field as HAADF-STEM (FIG. 6(a) on upper left). FIG. 6(c) is a diagram illustrating the mapping data of Si (on lower center) measured in the same visual field as HAADF-STEM (FIG. 6(a) on upper left). FIG. 6(d) is a diagram illustrating the mapping data of Ti (on lower right) measured in the same visual field as HAADF-STEM (FIG. 6(a) on upper left). FIG. 6(e) is a diagram (on upper right) obtained by superimposing the mapping data in FIGS. 6(b) to 6(d) (Al, Si, and Ti) measured in the same visual field as HAADF-STEM (FIG. 6(a) on upper left) one on another. Incidentally, the mapping in FIGS. 6(b) to 6(e) can be actually colorized (colored), and thus silicide ($TiSi_2$) can be distinguished at first glance since it becomes pink in which blue of Si is mixed with red of Ti, for example, when Al is colored to green, Si to blue, and Ti to red, but it is required to submit the application drawing as a black and white image, and thus the analysis information clarified by such colorization is included in FIG. 4(b) and FIGS. 6(d) and 6(e). This is because those skilled in the art can easily acquire the same analysis information from the quantitative mapping data by STEM-EDX (scanning transmission electron microscope-energy dispersive x-ray spectroscopy) in the same manner as in FIGS. 6(a)_6(e) by the same image analysis as the present application. Meanwhile, in FIGS. 6(b) to 6(d), the portion at which Al, Si, and Ti do not exist are represented in black and the portion at which these elements exist is represented in light and shade of gray or white. This makes it possible to confirm the presence and distribution state of Si, Al, and Ti which are elements constituting the active material alloy $Si_{60}Sn_{8.1}Ti_{30.1}Al_{1.8}$ (the negative electrode active material of Example 1) of an object to be measured.

In the above analysis, for the STEM image observation, there are two kinds of observation methods of a bright-field (BF) STEM imaging in which imaging is performed using an electron beam transmitted through the sample and a dark-field (DF) STEM imaging in which imaging is performed using an electron beam scattered from the sample. It is possible to observe a transmission image showing the internal structure of the sample in the same manner as a normal TEM image in the BF-STEM image illustrated in FIG. 4(a), and it is possible to observe a composition image from which a contrast reflecting the composition of the sample is obtained in the (HAA)DF-STEM image illustrated in FIG. 4(b). Particularly, the elastic scattering electron contrast due to the atomic number (Z) is dominant in the HAADF (high-angle annular dark-field), it is an imaging method to be also called Z-contrast imaging. Substances having higher atomic numbers look brighter (see FIG. 4(b), FIG. 5(a), FIG. 6(a), FIG. 7(b), FIG. 8(b), FIG. 9(a), FIG. 10(a), FIG. 11(a), and FIG. 12(a)). In the HAADF-STEM (high-angle annular dark-field scanning transmission electron microscopy), the image is obtained by applying an electron beam thinly narrowed to the sample while scanning it and detecting the transmitted electrons scattered at a high angle among the transmitted electrons by using an annular detector. A heavier element is dark in the STEM image and brighter in the HAADF-STEM image since a material having a large $Z^2\rho$ is scattered at a higher angle. It is also called a Z contrast image since contrast proportional to the atomic weight (Z) is obtained. In addition, in the STEM-EDX quantitative mapping, information on the composition distribution of the sample can be obtained by introducing the characteristic X-rays generated from the respective points into the EDS (energy-dispersive-spectroscopy) detector while thinly narrowing the electron beam and scanning the sample with the thinly narrowed electron beam. In the transmission electron microscope (TEM) measurement, the measurement can be performed at nanometer spatial resolution since there is almost no electron beam diffusion as observed in the scanning electron microscope (SEM) measurement.

From the mapping data obtained by superimposing Sn, Si, and Ti one on another in FIG. 5(e) on the upper right, it is confirmed that a plurality of gray portions (to be relatively large with respect to the silicide and Si phases in the eutectic structure) corresponding to a silicide (proeutectic $TiSi_2$) independently exist at the enclosed portion on the right side in the microstructure of the sample and in the vicinity thereof. More specifically, it is confirmed that the independent silicide (proeutectic $TiSi_2$) phase exists by being finely dispersed in the microstructure (for example, the enclosed portion on the right side) as can be seen from the mechanism of action described above as well. In addition, from the mapping data obtained by superimposing Al, Si, and Ti one on another in FIG. 6(e) on the upper right as well, it is confirmed that a plurality of gray portions (to be relatively large with respect to the silicide and Si phases in the eutectic structure) corresponding to a silicide (proeutectic $TiSi_2$) independently exist at the enclosed portion on the right side in the microstructure of the sample and in the vicinity thereof. More specifically, it is confirmed that the independent silicide (proeutectic $TiSi_2$) phase exists by being finely dispersed in the microstructure (for example, the enclosed portion on the right side) as can be seen from the mechanism of action described above as well. These are silicides because it is confirmed that the gray portion (to be relatively large with respect to the silicide and Si phases in the eutectic structure) at the enclosed portion on the right side and in the vicinity thereof is pink in which blue of Si is mixed with red of Ti in the case of performing colorization. In addition, when viewed in black and white images as well, from the mapping data of Ti in FIG. 5(d) and FIG. 6(d), it is confirmed that a plurality of gray portions (to be relatively large with respect to the silicide and Si phases in the eutectic structure) indicating the presence of Ti independently exist at the enclosed portion on the right side in the microstructure of the sample and in the vicinity thereof. Furthermore, from the mapping data of Si in FIG. 5(c) and FIG. 6(c), a gray portion indicating the presence of Si is confirmed at the portion corresponding to the enclosed portion on the right side of FIG. 5(e) and FIG. 6(e) in the microstructure of the sample and in the vicinity thereof. In addition, from the mapping data of Sn in FIG. 5(b), it is confirmed that a gray portion indicating the presence of Sn hardly exists at the portion corresponding to the gray portion corresponding to silicide (proeutectic $TiSi_2$) at the enclosed portion on the right side of FIG. 6(e) in the microstructure of the sample and in the vicinity thereof. Rather, from the mapping data of Sn in FIG. 5(b), it is confirmed that a gray portion indicating the presence of Sn exists in the vicinity of the periphery (boundary) of the portion corresponding to the gray portion corresponding to silicide (proeutectic $TiSi_2$) at the enclosed portion on the right side of FIG. 5(e) in the microstructure of the sample and in the vicinity thereof. Furthermore, from the mapping data of Al in FIG. 6(b), it is confirmed that a gray portion indicating the presence of Al hardly exists at the portion corresponding to the gray portion corresponding to silicide (proeutectic $TiSi_2$) at the enclosed portion on the right side of FIG. 6(e) in the microstructure of the sample and in the vicinity thereof. Rather, from the mapping data of Al in FIG. 6(b), it is confirmed that a gray portion indicating the presence of Al exists in the vicinity of the periphery (boundary) of the portion corresponding to the gray portion corresponding to silicide (proeutectic $TiSi_2$) at the enclosed portion on the right side of FIG. 6(e) in the microstructure of the sample and in the vicinity thereof. From FIGS. 5(b) to 5(d) and FIGS. 6(b) to 6(d) of these black and white images as well, it is confirmed that a plurality of (relatively large) gray portions in which both Si and Ti are present independently exist at the enclosed portion on the right side in the microstructure of FIG. 5(e) and FIG. 6(e) and in the vicinity thereof. More specifically, it is confirmed that the independent silicide (proeutectic $TiSi_2$) phase exists by being finely dispersed in the microstructure (for example, the enclosed portion on the right side) as can be seen from the mechanism of action described above as well. From these facts, it is confirmed that the microstructure of the silicon-containing alloy (particle) of the present embodiment has (1) the silicide phase (first phase) containing a silicide (silicide) of a transition metal as a main component and (3) a part of the microstructure is composed of a plurality of independent silicide phases (first phases). Incidentally, the white portion at the lower center in the drawings of FIG. 4(b) and FIG. 5(a) is $ZrO_2$ which was mixed at the time of pulverization of the rapidly quenched ribbon.

Next, from the mapping data obtained by superimposing Sn, Si, and Ti one on another in FIG. 5(e) on the upper right, it is confirmed that the silicide phase (first phase) and the Si phase (second phase) containing Sn form a eutectic structure (a structure in which the first phase and the second phase, which are (solid solution) crystals having component ratios different from each other or amorphous or low crystalline phases, are mixed together) at the enclosed portion on the left side in the microstructure of the sample and in the vicinity thereof. In the same manner, from the mapping data obtained by superimposing Al, Si, and Ti one on another in FIG. 6(e) on the upper right, it is confirmed that the silicide phase (first phase) and the Si phase (second phase) containing Al form a eutectic structure (a structure in which the first phase and the second phase, which are (solid solution) crystals having component ratios different from each other or amorphous or low crystalline phases, are mixed together) at the enclosed portion on the left side in the microstructure of the sample and in the vicinity thereof.

More specifically, it is confirmed that a dark gray portion (Si+Sn portion) (to be relatively small with respect to independent silicide) corresponding to the Si phase (second phase) containing Sn in part and a gray portion (to be relatively small with respect to independent silicide) corresponding to the silicide phase (first phase) are mixed together at the enclosed portion on the left side of FIG. 5(e) and in the vicinity thereof. In other words, a dark gray portion (Si+Sn portion) corresponding to the Si phase (second phase) and a gray portion corresponding to the silicide phase (first phase) at the enclosed portion on the left side and in the vicinity thereof are in the form of being adjacent to each other. From this fact, it can be seen that the fine Si phase and the fine silicide phase are eutecticized with each other (form a eutectic structure). The fact that the fine Si phase and the fine silicide phase form a eutectic structure is confirmed by the following in the case of performing colorization. That is, the (relatively small) dark gray portion (second phase) at the enclosed portion on the left side and in the vicinity thereof mainly becomes blue green in which blue of Si (containing a small amount of Sn) or blue of Si is mixed with green of Sn and the other gray portion (first phase) becomes pink in which blue of Si is mixed with red of Ti. Moreover, it is confirmed that this (relatively small) blue or blue-green portion corresponding to the Si phase (second phase) containing Sn and the (relatively small) pink portion corresponding to the silicide phase (first phase) form a eutectic structure from the fact that these are mixed together.

In addition, it is confirmed that a dark gray portion (Si+Al portion) (to be relatively small with respect to independent silicide) corresponding to the Si phase (second phase) containing Al in part and a gray portion (to be relatively small with respect to independent silicide) corresponding to the silicide phase (first phase) are mixed together at the enclosed portion on the left side of FIG. 6(e) and in the vicinity thereof. In other words, a dark gray portion (Si+Al portion) corresponding to the Si phase (second phase) and a gray portion corresponding to the silicide phase (first phase) at the enclosed portion on the left side and in the vicinity thereof are in the form of being adjacent to each other. From this fact, it can be seen that the fine Si phase and the fine silicide phase are eutecticized with each other (form a eutectic structure). The fact that the fine Si phase and the fine silicide phase form a eutectic structure is confirmed by the following in the case of performing colorization. In other words, the (relatively small) dark gray portion (second phase) at the enclosed portion on the left side and in the vicinity thereof mainly becomes blue green in which blue of Si (containing a small amount of Al) or blue of Si is mixed with green of Al and the other gray portion (first phase) becomes pink in which blue of Si is mixed with red of Ti. Moreover, it is confirmed that this (relatively small) blue or blue-green portion corresponding to the Si phase (second phase) containing Al and the (relatively small) pink portion corresponding to the silicide phase (first phase) form a eutectic structure from the fact that these are mixed together as well.

In addition, when viewed in black and white images as well, from the mapping data of Ti in FIG. 5(d), it is confirmed that a large number of (relatively small) gray portions indicating the presence of Ti exist by being dotted at the enclosed portion on the left side in the microstructure of the sample and in the vicinity thereof. Furthermore, from the mapping data of Si in FIG. 5(c), a gray portion indicating the presence of Si is confirmed at the entire portion corresponding to the enclosed portion on the left side of FIG. 5(d) in the microstructure of the sample and in the vicinity thereof. In addition, from the comparison between the mapping data of Sn in FIG. 5(b) and the mapping data of Ti in FIG. 5(d), it is confirmed that a gray portion indicating the presence of Sn in FIG. 5(b) does not almost exist at the portion at which Ti is dotted of the enclosed portion on the left side of FIG. 5(d) in the microstructure and the vicinity thereof. In other words, from FIGS. 5(b), 5(c), and 5(d), it is confirmed that a large number of (relatively small) gray portions at which both Si and Ti are present are dotted at the enclosed portion on the left side in the microstructure of FIG. 5(d) and in the vicinity thereof. Furthermore, from FIGS. 5(b) and 5(c), it is confirmed that a large number of Si (containing a small amount of Sn) and Sn+Si portions are mainly dotted at the portion at which gray (silicide) is not dotted of the enclosed portion on the left side in the microstructure of FIG. 5(d) and the vicinity thereof (a portion at which a large number of relatively small black portions are dotted). From these facts as well, it is confirmed that the silicide phase (first phase) and the Si phase (second phase) containing Sn in part form a eutectic structure at the enclosed portion on the left side of FIG. 5(d) and in the vicinity thereof. In the same manner, from the mapping data of Ti in FIG. 6(d), it is confirmed that a large number of (relatively small) gray portions indicating the presence of Ti exist by being dotted at the enclosed portion on the left side in the microstructure of the sample and in the vicinity thereof. Furthermore, from the mapping data of Si in FIG. 6(c), a gray portion indicating the presence of Si is confirmed at the entire portion corresponding to the enclosed portion on the left side of FIG. 6(d) in the microstructure of the sample and in the vicinity thereof. In addition, from the comparison between the mapping data of Al in FIG. 6(b) and the mapping data of Ti in FIG. 6(d), it is confirmed that a gray portion indicating the presence of Al in FIG. 6(b) does not almost exist at the portion at which Ti is dotted of the enclosed portion on the left side of FIG. 6(d) in the microstructure and the vicinity thereof. In other words, from FIGS. 6(b), 6(c), and 6(d), it is confirmed that a large number of (relatively small) gray portions at which both Si and Ti are present are dotted at the enclosed portion on the left side in the microstructure of FIG. 6(d) and in the vicinity thereof. Furthermore, from FIGS. 6(b) and 6(c), it is confirmed that a large number of Si (containing a small amount of Al) and Al+Si portions are mainly dotted at the portion at which gray (silicide) is not dotted of the enclosed portion on the left side in the microstructure of FIG. 6(d) and the vicinity thereof (a portion at which a large number of relatively small black portions are dotted). From these facts as well, it is confirmed that the silicide phase (first phase) and the Si phase (second phase) containing Al in part form a eutectic structure at the enclosed portion on the left side of FIG. 6(d) and in the vicinity thereof.

From these facts, the microstructure of the silicon-containing alloy (particle) of the present embodiment has (1) the silicide phase (first phase) containing a silicide (silicide) of a transition metal as a main component and (2) the second phase (Si phase, preferably amorphous Si phase (a-Si phase)) containing Sn and Al in part and amorphous or low crystalline Si (specifically, obtained as Sn and Al are dispersed in Si and form a solid solution (dispersed in a solid solution state) or Sn and Al are dispersed in Si in the form of being incorporated therein) as a main component and (4) a part of the microstructure has a eutectic structure composed of the first phase and the second phase.

Figure 7A:
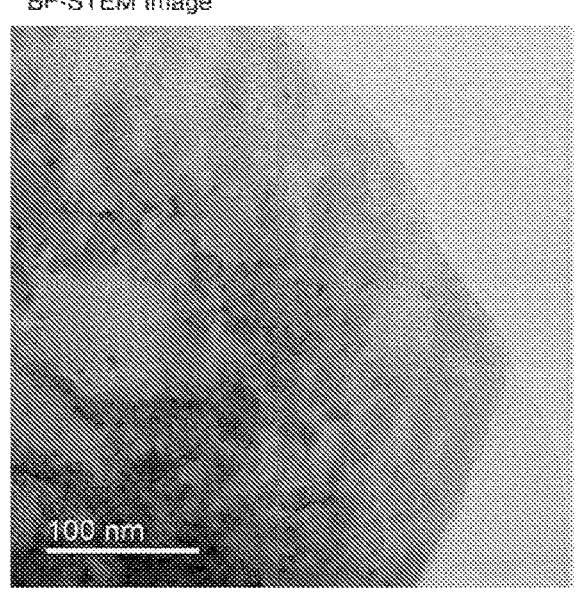
FIG. 7(a) is an image (middle magnification) of an enlarged eutectic structure (eutectic structure in FIG. 3) portion of particles of a negative electrode active material (Si-containing alloy) having an alloy composition $Si_{60.0}Sn_{8.1}Ti_{30.1}Al_{1.8}$ (mass ratio) of Example 1 observed by BF-STEM (bright field-scanning transmission electron microscopic imaging).
Figure 7B:
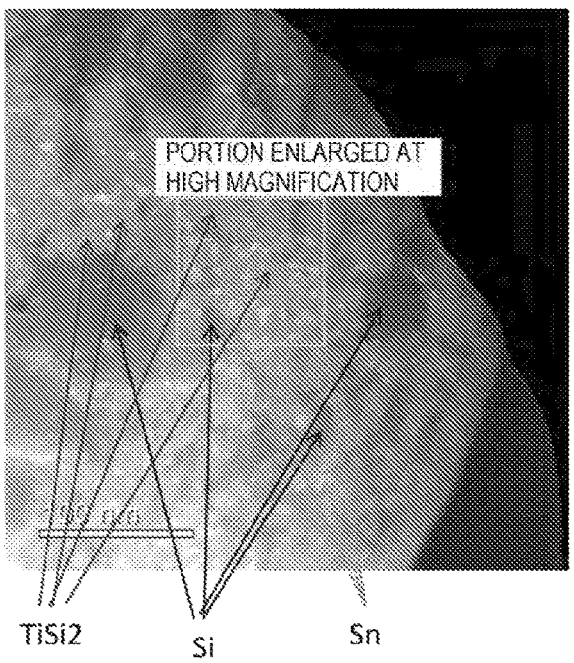
FIG. 7(b) is an image (middle magnification) of the active material particles in the same visual field as in FIG. 7(a) observed by HAADF-STEM (high-angle annular dark-field scanning transmission electron microscopic imaging)

Next, FIG. 7(a) is a diagram (middle magnification) illustrating a BF-STEM image (bright field-scanning transmission electron microscope image) of an enlarged eutectic structure of the Si-containing alloy (particle) of the present embodiment. FIG. 7(b) is a diagram illustrating a HAADF-STEM image (high-angle annular dark-field scanning transmission electron microscope image) of the active material particles in the same visual field as in FIG. 7(a). With regard to the object to be measured, the particle size of the negative electrode active material obtained by pulverizing a rapidly quenched ribbon alloy having the alloy composition of the present embodiment was D50=6.7 µm (D90=20.6 µm) as an average particle diameter and the cross section of the particles of the negative electrode active material fabricated by coating the surface of the silicon-containing alloy (particle) with alumina at 2% by mass was used as the object to be observed. As the rapidly quenched ribbon alloy, one having an alloy composition $Si_{60}Sn_{8.1}Ti_{30.1}Al_{1.8}$ of Example 1 was used. The gray portion in FIG. 7(b) is the silicide ($TiSi_2$) phase (first phase) in the eutectic structure, the dark gray (or black) portion is the a-Si phase (second phase) containing Sn and Al in part in the eutectic structure, and the whitish portion is the Sn phase containing Sn (crystallized because of an excess amount to be dispersed in the second phase and to form a solid solution) as a main component (or a phase containing Sn and Al; a small amount of Si and Ti may be contained; see FIGS. 9(a)-9(e) and FIG. 10 for details). Some of these are indicated by arrows in FIG. 7(b) so as to show which one is $TiSi_2$ (silicide phase), Si (a-Si phase containing Sn and Al) or Sn (Sn phase).

FIG. 8(a) is a diagram (high magnification) illustrating a BF-STEM image (bright field-scanning transmission electron microscope image) of a further enlarged part of the eutectic structure of the Si-containing alloy (particle) of the present embodiment. FIG. 8(b) is a diagram illustrating a HAADF-STEM image (high-angle annular dark-field scanning transmission electron microscope image) of the active material particles in the same visual field as in FIG. 8(a). With regard to the object to be measured, the particle size of the negative electrode active material obtained by pulverizing a rapidly quenched ribbon alloy having the alloy composition of the present embodiment was D50=6.7 µm (D90=20.6 µm) as an average particle diameter and the cross section of the particles of the negative electrode active material fabricated by coating the surface of the silicon-containing alloy (particle) with alumina at 2% by mass was used as the object to be observed. More specifically, the portion obtained by further enlarging the portion surrounded with a square frame as a portion enlarged at a high magnification, which is an enlarged view of the eutectic structure described above, in FIG. 7(b) was used as the object to be observed. As the rapidly quenched ribbon alloy, one having an alloy composition $Si_{60}Sn_{8.1}Ti_{30.1}Al_{1.8}$ of Example 1 was used. The gray portion in FIG. 8(b) is the silicide ($TiSi_2$) phase (first phase) in the eutectic structure, the dark gray (or black) portion is the a-Si phase (second phase) containing Sn and Al in the eutectic structure, and the whitish portion is the Sn phase containing Sn (crystallized because of an excess amount to be dispersed in the second phase and to form a solid solution) as a main component (or a phase containing Sn and Al; a small amount of Si and Ti may be contained; see FIG. 9 and FIG. 10 for details).

FIGS. 9(a)-9(e) are diagrams (high magnification) illustrating the quantitative mapping data by STEM-EDX (scanning transmission electron microscope-energy dispersive X-ray spectroscopy). FIG. 9(a) is the same HAADF-STEM image as that in FIG. 8(b). FIG. 9(b) is a diagram illustrating the mapping data of Sn (on lower left) measured in the same visual field as HAADF-STEM (FIG. 9(a) on upper left). FIG. 9(c) is a diagram illustrating the mapping data of Si (on lower center) measured in the same visual field as HAADF-STEM (FIG. 9(a) on upper left). FIG. 9(d) is a diagram illustrating the mapping data of Ti (on lower right) measured in the same visual field as HAADF-STEM (FIG. 9(a) on upper left). FIG. 9(e) is a diagram (on upper right) obtained by superimposing the mapping data in FIGS. 9(b) to 9(d) (Sn, Si, and Ti) measured in the same visual field as HAADF-STEM (FIG. 9(a) on upper left) one on another. Incidentally, the mapping in FIGS. 9(b) to 9(e) can be actually colorized (colored), and thus silicide ($TiSi_2$) can be distinguished at first glance since it becomes pink in which blue of Si is mixed with red of Ti, for example, when Sn is colored to green, Si to blue, and Ti to red, but it is required to submit the application drawing as a black and white image, and thus the analysis information clarified by such colorization is included in FIG. 9(d) and the following description. This is because those skilled in the art can easily acquire the same analysis information from the quantitative mapping data by STEM-EDX (scanning transmission electron microscope-energy dispersive x-ray spectroscopy) in the same manner as in FIGS. 9(a)-9(e) by the same image analysis as the present application.

FIGS. 10(a)-10(e) are diagrams (high magnification) illustrating the quantitative mapping data by STEM-EDX (scanning transmission electron microscope-energy dispersive X-ray spectroscopy). FIG. 10(a) is the same HAADF-STEM image as that in FIG. 8(b). FIG. 10(b) is a diagram illustrating the mapping data of Al (on lower left) measured in the same visual field as HAADF-STEM (FIG. 10(a) on upper left). FIG. 10(c) is a diagram illustrating the mapping data of Si (on lower center) measured in the same visual field as HAADF-STEM (FIG. 10(a) on upper left). FIG. 10(d) is a diagram illustrating the mapping data of Ti (on lower right) measured in the same visual field as HAADF-STEM (FIG. 10(a) on upper left). FIG. 10(e) is a diagram (upper right) obtained by superimposing the mapping data in FIGS. 10(b) to 10(d) (Al, Si, and Ti) measured in the same visual field as HAADF-STEM (FIG. 10(a) on upper left) one on another. Incidentally, the mapping in FIGS. 10(b) to 10(e) can be actually colorized (colored), and thus silicide ($TiSi_2$) can be distinguished at first glance since it becomes pink in which blue of Si is mixed with red of Ti, for example, when Al is colored to green, Si to blue, and Ti to red, but it is required to submit the application drawing as a black and white image, and thus the analysis information clarified by such colorization is included in FIG. 10(d) and the following description. This is because those skilled in the art can easily acquire the same analysis information from the quantitative mapping data by STEM-EDX (scanning transmission electron microscope-energy dispersive x-ray spectroscopy) in the same manner as in FIGS. 10(a)-10(e) by the same image analysis as the present application.

Meanwhile, in FIGS. 9(b) to 9(d), the portions at which Sn, Si, and Ti each do not exist are represented in black and the portions at which these elements exist are represented in gray or white. This makes it possible to confirm the presence and distribution state of Si, Sn, and Ti which are elements constituting the active material alloy $Si_{60.0}Sn_{8.1}Ti_{30.1}Al_{1.8}$ (the negative electrode active material of Example 1) of an object to be measured. In addition, in FIGS. 10(b) to 10(d), the portions at which Al, Si, and Ti each do not exist are represented in black and the portions at which these elements exist are represented in gray or white. This makes it possible to confirm the presence and distribution state of Si, Al, and Ti which are elements constituting the active material alloy $Si_{60}Sn_{8.1}Ti_{30.1}Al_{1.8}$ (the negative electrode active material of Example 1) of an object to be measured.

By comparing FIG. 9(a) on the upper left with the mapping data obtained by superimposing Sn, Si, and Ti one on another in FIG. 9(e) on the upper right, it is confirmed that the silicide phase (first phase) and the Si phase (second phase) containing Sn in part form a eutectic structure (a structure in which the first phase and the second phase, which are (solid solution) crystals having component ratios different from each other or amorphous or low crystalline phases, are mixed together). In addition, by comparing FIG. 10(a) on the upper left with the mapping data obtained by superimposing Al, Si, and Ti one on another in FIG. 10(e) on the upper right, it is confirmed that the silicide phase (first phase) and the Si phase (second phase) containing Al form a eutectic structure (a structure in which the first phase and the second phase, which are (solid solution) crystals having component ratios different from each other or amorphous or low crystalline phases, are mixed together).

More specifically, it is confirmed that black in FIG. 9(a) and the dark gray portion (Si+Sn Portion) in FIG. 9(e), which correspond to the Si phase (second phase) containing Sn in part, and the gray portion corresponding to the silicide phase (first phase) are mixed together in FIGS. 9(a) and 9(e). From this fact, it can be seen that the fine Si phase and the fine silicide phase are eutecticized with each other (form a eutectic structure). The fact that the fine Si phase and the fine silicide phase form a eutectic structure is confirmed by the following in the case of performing colorization. In other words, the dark gray portions (second phases) of the upper left, left center, lower left, upper center, lower center, upper left, and lower left portions and the like in FIG. 9(e) mainly become blue green in which blue of Si (containing a small amount of Sn) or blue of Si is mixed with green of Sn. The other gray portions (first phases) of the upper left, left center, upper center, center, lower center, upper right, right center, and lower right portions and the like in FIG. 9(e) become pink in which blue of Si is mixed with red of Ti. Moreover, it is confirmed that this blue or blue-green portion corresponding to the Si phase (second phase) containing Sn in part and the pink portion corresponding to the silicide phase (first phase) form a eutectic structure from the fact that these are mixed together. In addition, it is confirmed that black in FIG. 10(a) and the dark gray portion (Si+Al Portion) in FIG. 10(e), which correspond to the Si phase (second phase) containing Al in part, and the gray portion corresponding to the silicide phase (first phase) are mixed together in FIGS. 10(a) and 10(e). From this fact, it can be seen that the fine Si phase and the fine silicide phase are eutecticized with each other (form a eutectic structure). The fact that the fine Si phase and the fine silicide phase form a eutectic structure is confirmed by the following in the case of performing colorization. In other words, the dark gray portions (second phases) of the upper left, left center, lower left, upper center, lower center, upper left, and lower left portions and the like in FIG. 10(e) mainly become blue green in which blue of Si (containing a small amount of Al) or blue of Si is mixed with green of Al. The other gray portions (first phases) of the upper left, left center, upper center, center, lower center, upper right, right center, and lower right portions and the like in FIG. 10(e) become pink in which blue of Si is mixed with red of Ti. Moreover, it is confirmed that this blue or blue-green portion corresponding to the Si phase (second phase) containing Al in part and the pink portion corresponding to the silicide phase (first phase) form a eutectic structure from the fact that these are mixed together.

In addition, when viewed in black and white images as well, from the mapping data of Ti in FIG. 9(d), a gray portion indicating the presence of Ti (Ti-rich place=eutectic $TiSi_2$ phase) is confirmed at the upper left, left center, upper center, center, lower center, upper right, right center, and lower right portions and the like. Furthermore, from the mapping data of Si in FIG. 9(c), a gray portion indicating the presence of Si is confirmed in a wide range (approximately the whole area) including the upper left, left center, upper center, center, lower center, upper right, right center, and lower right portions and the like. In addition, from the mapping data of Sn in FIG. 9(b), a gray portion indicating the presence of Sn is extremely finely dispersed (scattered) or does not almost exist at the upper left, left center, upper center, center, lower center, upper right, right center, and lower right portions and the like (silicide portions). From FIGS. 9(b), 9(c) and 9(d) of these black and white images as well, it is confirmed that both Si and Ti are dotted at the upper left, left center, upper center, center, lower center, upper right, right center, and lower right portions and the like in FIGS. 9(a) and 9(e). From these facts, it is confirmed that (4) the silicide phase is dotted in the eutectic structure. Furthermore, it is confirmed that black in FIG. 9(a) and the dark gray portion in FIG. 9(e), which correspond to the Si phase (second phase) containing Sn in part, are dotted at the upper left, left center, lower left, upper center, lower center, upper left, and lower left portions and the like in FIG. 9(e). On the other hand, from FIGS. 9(b) and 9(c), it is confirmed that the Si (containing a small amount of Sn) and Sn+Si portions are mainly dotted at the portion at which gray (silicide) does not exist (dotted) (black portion; the place at which Ti is not present=eutectic Si phase) at the upper left, left center, lower left, upper center, lower center, upper left, and lower left portions and the like in FIG. 9(d). From FIGS. 9(b), 9(c) and 9(d) of these black and white images as well, it is confirmed that both Si and Sn are dotted at the upper left, left center, lower left, upper center, lower center, upper left, and lower left portions and the like in FIGS. 9(a) and 9(e). In the same manner, when viewed in black and white images as well, from the mapping data of Ti in FIG. 10(d), a gray portion indicating the presence of Ti (Ti-rich place=eutectic $TiSi_2$ phase) is confirmed at the upper left, left center, upper center, center, lower center, upper right, right center, and lower right portions and the like. Furthermore, from the mapping data of Si in FIG. 10(c), a gray portion indicating the presence of Si is confirmed in a wide range (approximately the whole area) including the upper left, left center, upper center, center, lower center, upper right, right center, and lower right portions and the like. In addition, from the mapping data of Al in FIG. 10(b), a gray portion indicating the presence of Al is extremely finely dispersed (scattered) or does not almost exist at the upper left, left center, upper center, center, lower center, upper right, right center, and lower right portions and the like (silicide portions). From FIGS. 10(b), 10(c) and 10(d) of these black and white images as well, it is confirmed that both Si and Ti are dotted at the upper left, left center, upper center, center, lower center, upper right, right center, and lower right portions and the like in FIGS. 10(a) and 10(e). From these facts, it is confirmed that (4) the silicide phase is dotted in the eutectic structure. Furthermore, it is confirmed that black in FIG. 10(a) and the dark gray portion in FIG. 10(e), which correspond to the Si phase (second phase) containing Al in part, are dotted at the upper left, left center, lower left, upper center, lower center, upper left, and lower left portions and the like in FIG. 10(e). On the other hand, from FIGS. 10(b) and 10(c), it is confirmed that the Si (containing a small amount of Al) and Al+Si portions are mainly dotted at the portion at which gray (silicide) does not exist (dotted) (black portion; the place at which Ti is not present=eutectic Si phase) at the upper left, left center, lower left, upper center, lower center, upper left, and lower left portions and the like in FIG. 10(d). From FIGS. 10(b), 10(c) and 10(d) of these black and white images as well, it is confirmed that both Si and Al are dotted at the upper left, left center, lower left, upper center, lower center, upper left, and lower left portions and the like in FIGS. 10(a) and 10(e).

From the facts described above as well, it is confirmed that the silicide phase (first phase) and the Si phase (second phase) containing Sn in part form a eutectic structure in the microstructures of FIGS. 9(a) to 9(e). In the same manner, it is confirmed that the silicide phase (first phase) and the Si phase (second phase) containing Sn and Al in part form a eutectic structure in the microstructures of FIGS. 10(a) to 10(e). From these facts, it is confirmed that the eutectic structure of the silicon-containing alloy (particle) of the present embodiment has (1) the silicide phase (first phase) containing a silicide (silicide) of a transition metal as a main component and (2) the a-Si phase (second phase) containing Sn and Al in part and amorphous or low crystalline Si (specifically, obtained as Sn and Al are dispersed (form a solid solution) inside the crystal structure of Si) as a main component and (4) a part of the eutectic structure has a eutectic structure composed of the first phase and the second phase.

The fact that the first phase and the second phase form a eutectic structure is confirmed by the following in the case of performing colorization. In other words, there are pink, blue and green portions in FIGS. 9(e) and 10(e). Referring to FIGS. 9(d) and 10(d), it can be seen that Ti is not present or is not almost present at the blue portions in FIGS. 9(e) and 10(e). In other words, it is confirmed that the blue portions in FIGS. 9(e) and 10(e) are the Si phase. On the other hand, the pink portion is a portion in which blue (the portion at which Si is present) in FIGS. 9(c) and 10(c) is mixed with red (the portion at which Ti is present) in FIGS. 9(d) and 10(d). In other words, it is confirmed that the pink portion in FIGS. 9(e) and 10(e) is a silicide phase (TiSi$_2$). In addition, it is confirmed that the green portion (the portion at which Si or Al is present) is included in the blue portion in FIGS. 9(e) and 10(e). This indicates that a part of Sn and Al is dispersed in Si and forms a solid solution. In addition, it is also confirmed that Al other than this is finely (finely) dispersed in the Si phase and the TiSi$_2$ phase.

3: Analysis by HAADF-STEM Image (High-Angle Annular Dark-Field Scanning Transmission Electron Microscope Image) and Elemental Analysis Method FIG. 11 and FIG. 12 are the same HAADF-STEM images as those in FIG. 8(b), FIG. 9(a), and FIG. 10(a) and diagrams in which the regions (two places surrounded with a square frame) for observing the presence of elements in the silicide phase (first phase) and elements in the Si phase (second phase) by elemental analysis are distinguished by numerals 1 and 2 in the image.

FIG. 11(a) is the same HAADF-STEM image as those in FIG. 8(b), FIG. 9(a), and FIG. 10(a) and a diagram in which a square frame of the portion (the portion of circled numeral 1 in the image) to be an object for the observation of element distribution is indicated by a bold line. FIG. 11(b) is a diagram obtained by elemental analysis of the portion to be an object for the observation of element distribution in FIG. 11(a). From FIG. 11(b), a large peak attributed to the Si element is observed at the portion (the portion of the a-Si phase (second phase) containing Sn and Al in part in the eutectic structure) of numeral 1 in FIG. 11(a) which is the portion to be an object for the observation of element distribution. In addition, small peaks attributed to the Sn element and Al element are observed, and it can be seen that small amounts of Sn and Al are contained in the portion. From this fact, it is confirmed that the black portion including the portion of numeral 1 is the Si phase (second phase) containing Sn and Al in part.

FIG. 12(a) is the same HAADF-STEM image as those in FIG. 8(b), FIG. 9(a), and FIG. 10(a) and a diagram in which a square frame of the portion (the portion of numeral 2 in the image) to be an object for the observation of element distribution is indicated by a bold line. FIG. 12(b) is a diagram obtained by elemental analysis of the portion to be an object for the observation of element distribution in FIG. 12(a). From FIG. 12(b), a peak attributed to the Si element and a large peak attributed to the Ti element is observed at the portion (the portion of the silicide phase (first phase) in the eutectic structure) of numeral 2 in FIG. 12(a) which is the portion to be an object for the observation of element distribution. In addition, peaks attributed to the Sn element and Al element are not almost observed. In addition, from FIG. 12(b), it has been confirmed that Si and Ti are present at an atomic ratio of approximately 2:1. From this fact as well, it is confirmed that the gray portion including the portion of numeral 2 is silicide (TiSi$_2$ phase).

4: Analysis by Electron Diffraction Pattern

FIG. 13(a) is a diagram illustrating a BF-STEM image (bright field-scanning transmission electron microscope image) of the enlarged eutectic structure of a Si-containing alloy of Example 1. In FIG. 13(a), the surrounded portion (FFT 1) on the lower left represents the silicide phase in the eutectic structure and the surrounded portion (FFT 2) on the right side represents the Si phase (a-Si phase) in the eutectic structure. FIG. 13(b) is a diffraction pattern obtained by subjecting the region of the silicide phase in the eutectic structure to fast Fourier transform processing by electron diffraction measurement. FIG. 13(c) is a diffraction pattern obtained by subjecting the region of the Si phase (a-Si phase) in the eutectic structure to fast Fourier transform processing by electron diffraction measurement. The object to be observed in FIG. 13 is the Si-containing alloy having an alloy composition Si$_{60}$Sn$_{8.1}$Ti$_{30.1}$Al$_{1.8}$ of Example 1 as described above.

In the diffraction pattern acquired by the fast Fourier transform processing by electron diffraction measurement, a net pattern (lattice-like spot) in two-dimensional point arrangement is obtained for a single crystal phase, a Debye-Scherrer ring (diffraction ring) is obtained for a polycrystalline phase, and a halo pattern is obtained for an amorphous phase. Furthermore, the crystal structure of the net pattern (silicide phase) in two-dimensional point arrangement can also be specified.

From the diffraction pattern illustrated in FIG. 13(b), a net pattern in two-dimensional point arrangement (Laue pattern; the spacing between the respective bright spots corresponds to the lattice spacing and the position between the bright spots corresponds to the crystal orientation) is obtained. Hence, it is confirmed that the silicide phase (TiSi$_2$ phase) in the eutectic structure is a single crystal phase.

In addition, from the diffraction pattern illustrated in FIG. 13(c), the Debye-Scherrer ring (diffraction ring) and the diffraction ring of halo pattern (hollow ring-like pattern as a whole) are obtained. Hence, it is confirmed that the Si phase (second phase) in the eutectic structure is a polycrystalline phase and is an amorphous phase containing amorphous or low crystalline Si (a-Si). Incidentally, the same results as those in FIGS. 3 to 13 are obtained for other Examples as well.

From the above, it is confirmed that the silicide phase (first phase) and the Si phase (second phase) containing Sn and Al in part form a eutectic structure in the microstructure of the Si-containing alloy of Example 1. From FIGS. 7 to 10 as well, it is confirmed that the microstructure of the Si-containing alloy of Example 1 has a silicide phase (first phase) containing a silicide (silicide) of a transition metal as a main component and an a-Si phase (second phase) containing Sn and Al in part and amorphous or low crystalline Si as a main component and a part of the microstructure is composed of a plurality of independent first phases and a part of the microstructure has a eutectic structure composed of the first phase and the second phase.

(Analysis on Precipitate Size)

Precipitation Calculation

The precipitation calculation was performed using the precipitation growth prediction software: TC-PRISMA Ver2015a (and Thermo-Calc ver. 2015a) developed by Thermo-Calc software AB Sweden (Japan Agency: Itochu Techno-Solutions Corporation), SSOL5 (SGTE* Solution Database, ver. 5.0) as a thermodynamic database, and MOB2 (TCS Alloy Mobility Database Ver. 2.5) developed by the same company as a dynamic database under the conditions of Examples 1 to 8 and Comparative Examples 1 and 2. This precipitation growth prediction software TC-PRISMA performs precipitation calculation based on the theories of Langer-Schwartz and Kampmann-Wagner [Q. Chen, H. J. Jou, and G. Sterner., TC-PRISMA User's Guide, http://www.thermocalc.com/, 2011] and [Q. Chen, J. Jeppsson, and J. Agren., Acta Materialia, Vol. 56, pp, 1890-1896, 2008].

The precipitation calculation is performed under the conditions of Examples 1 to 8 and Comparative Examples 1 and 2. The calculation conditions and temperature profile (FIG. 37) to be presented below are used.

Calculation Condition

Figure 37:
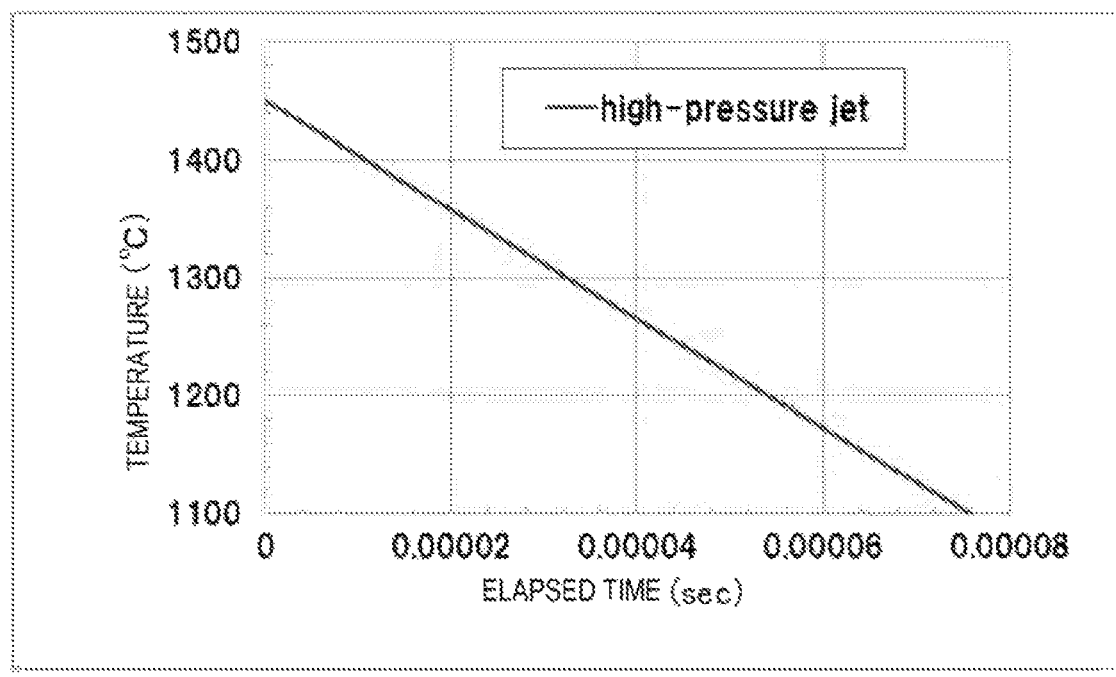
FIG. 37 is a graph illustrating the relation between the cooling time (elapsed time from immediately after spraying) and (cooling) temperature of a rapidly quenched ribbon alloy from the number of revolutions of a roll and the (cooling) temperature of the rapidly quenched ribbon alloy (from 1450° C. to 1100° C.)
Figure 36B:
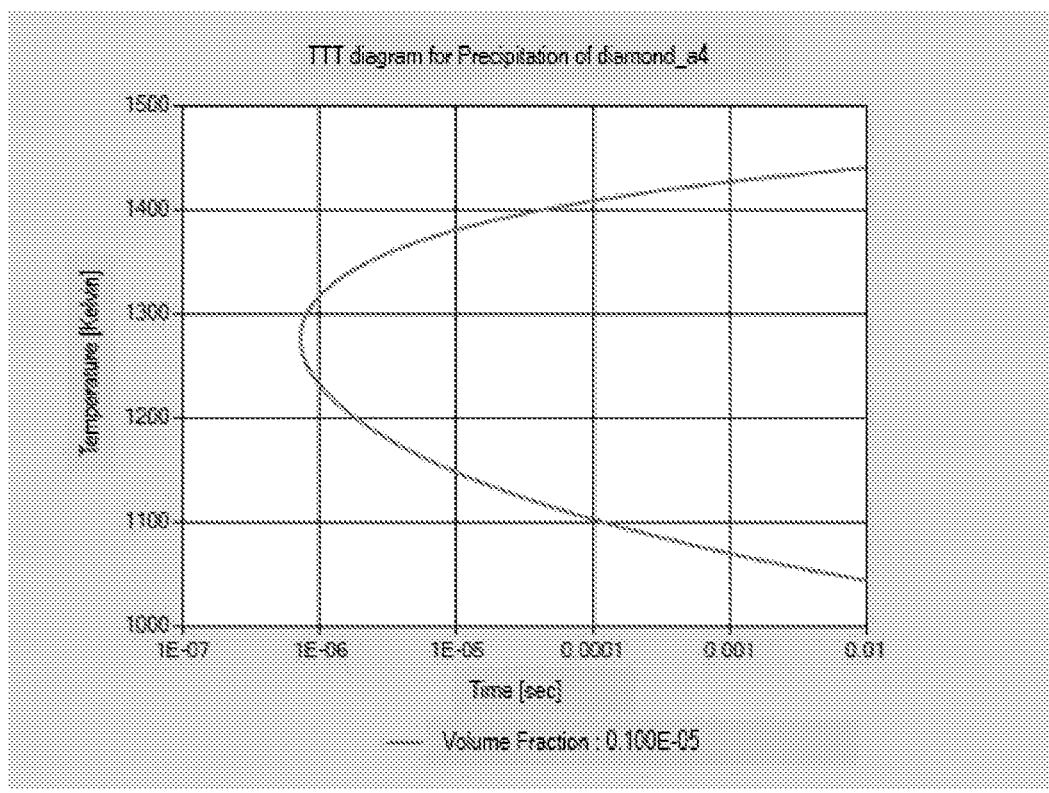
FIG. 36(b) is a TTT diagram for precipitation of Si in the liquid phase composition (Si$_{63.8}$Sn$_{16.3}$Ti$_{19.9}$) at the start of eutectic formation in the alloy composition (alloy seed) of Comparative Example 2.

Temperature profile: FIG. 37 (Examples 1 to 8 and Comparative Examples 1 and 2) (The same temperature profile as that in FIG. 37 can also be obtained under other implementation conditions with reference to FIG. 38 and FIG. 39.

Alloy composition (% by mass): $Si_{60.0}Sn_{8.1}Ti_{30.1}Al_{1.8}$ (Example 1)

$Si_{64.7}Sn_{5.0}Ti_{29.9}Al_{0.4}$ (Example 2)
$Si_{64.0}Sn_{4.9}Ti_{30.0}Al_{1.1}$ (Example 3)
$Si_{64.6}Sn_{5.0}Ti_{29.8}Al_{0.6}$ (Example 4)
$Si_{59.3}Sn_{9.9}Ti_{29.7}Al_{1.1}$ (Example 5)
$Si_{65.5}Sn_{3.0}Ti_{30.0}Al_{1.1}$ (Example 6)
$Si_{63.2}Sn_{5.0}Ti_{30.0}Al_{1.8}$ (Example 7)
$Si_{66.5}Sn_{2.0}Ti_{30.0}Al_{1.8}$ (Example 8)
$Si_{65.0}Sn_{5.0}Ti_{30.0}$ (Comparative Example 1)
$Si_{60.0}Sn_{10.0}Ti_{30.0}$ (Comparative Example 2)

Mother phase/precipitated phase: liquid/$TiSi_2$, Si (crystallized in liquid phase)

Nucleation model: homogeneous nucleation

Nucleation site: bulk

Interfacial energy: estimated value (calculated for every temperature)

Mother phase/precipitated phase volume: 1E-4 ($1 \times 10^{-4}$) $m^3$.

Here, the temperature profile used for the precipitation simulation in FIG. 37 was determined by the following.

FIG. 38 is a diagram illustrating a look (thermal image) when the temperature of a rapidly quenched ribbon alloy obtained by using an apparatus used for a liquid quenching solidification method is observed by using an infrared thermograph. For temperature measurement, the measurement was performed by using a high resolution infrared thermograph CPA-SC 7500 (light receiving element: InSb) manufactured by FLIR Systems, Inc. (handled by CHINO Corporation) and a 50 mm lens for the apparatus. More specifically, the temperature of a ribbon-like alloy to be formed continuously and horizontally on the roll by spraying a mother alloy from a quartz nozzle containing the mother alloy molten at 1450° C. onto a Cu roll having a number of revolutions of 4000 rpm (peripheral velocity: 41.9 μm/sec) was observed. A comparatively white portion (the portion which glows yellowish white in the case of being viewed in a color image) in the black and white image is the quartz nozzle which is heated and contains the mother alloy, and the temperature of the alloy ribbon placed on the roll by spraying the molten alloy stored in the quartz nozzle onto the surface of the quenching roll was continuously measured with a thermal image of 320×256 pixels at a frame rate of 350 Hz. With regard to the temperature of the ribbon-like alloy (the observation position is indicated by numerals 1 to 8) at the positions (distances) every 2.25 mm from the roll portion (distance from the nozzle: zero) immediately below the nozzle, the average value of temperatures during the spraying of molten metal was measured, respectively.

Figure 39A:
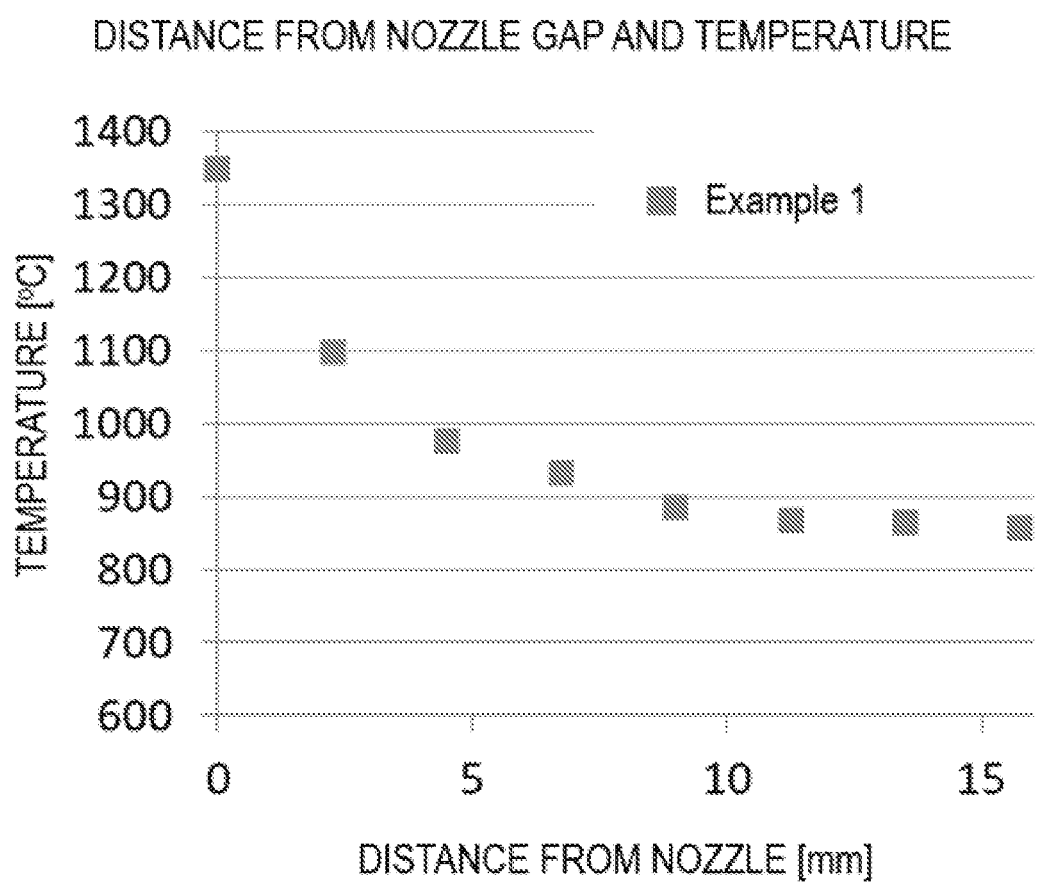
FIG. 39(a) is a graph obtained by plotting the temperature of a rapidly quenched ribbon alloy at the positions (distances) every 2.25 mm from the nozzle in Example 1.

FIG. 39(a) is a graph obtained by plotting the temperature of a rapidly quenched ribbon alloy at the positions (distances) every 2.25 mm from the nozzle. FIG. 39(b) is a graph illustrating the relation between the cooling time (elapsed time) and the measured temperature calculated from the peripheral velocity of the roll based on FIG. 39(a). FIG. 39(c) is a graph illustrating the cooling velocity (rapid quenching velocity) at the positions (distances) every 2.25 mm from the nozzle calculated by the temperature difference between the respective temperature measurement points/the movement time between the respective temperature measurement points. In Example 1, the cooling time from 1350° C. to 1100° C. is $5.37 \times 10^{-5}$ seconds from FIG. 39(b) and thus the cooling temperature can be calculated as $4.67 \times 10^{6 \circ}$ C./sec.

The temperature profile used for the precipitation simulation in FIG. 37 can be calculated by linear approximation based on the graph illustrating the relation between the cooling time and measured temperature in FIG. 39(b).

By the precipitation calculation described above, the modal radius and radius distribution of the precipitate can be determined. Hereinafter, an example in which a Si-containing alloy (negative electrode active material) which has an alloy composition $Si_{60}Sn_{8.1}Ti_{30.1}Al_{1.8}$ and is fabricated in Example 1 is used will be described. Incidentally, the analysis was performed by the same method for Examples 2 to 8 and Comparative Examples 1 and 2 as well (see FIGS. 14, 18, 21, 23, 25, 27, 29, 31, 33, and 35).

Figure 14A:
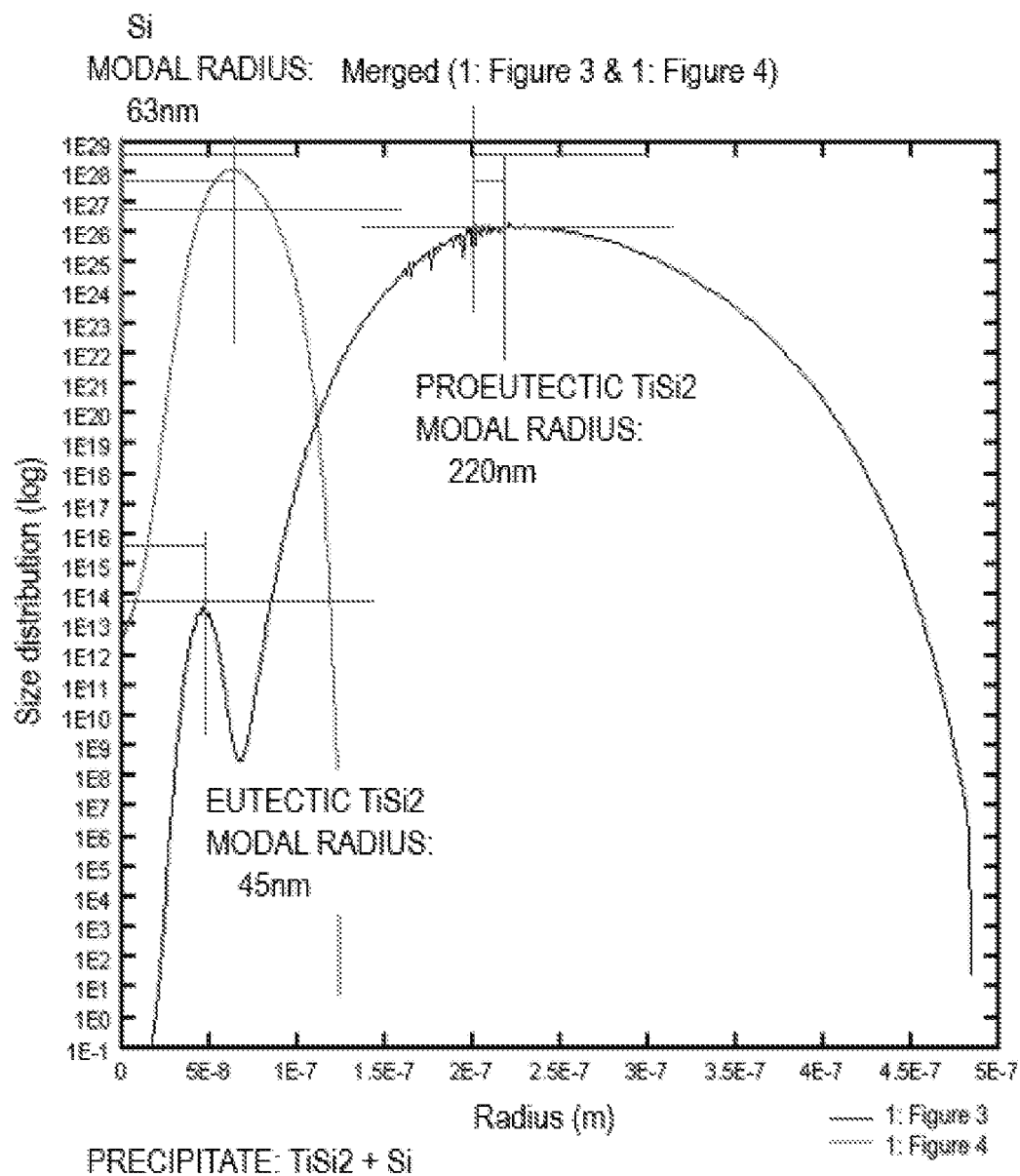
FIG. 14(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{60.0}Sn_{8.1}Ti_{30.1}Al_{1.8}$ (mass ratio) of Example 1 to precipitation simulation, and illustrating the modal radii thereof.

FIG. 14(a) is a graph illustrating the modal radii of the independent first phases (silicide phases; $TiSi_2$ phases) and the first phases (silicide phases; $TiSi_2$ phases) and second phases (a-Si phases) in the eutectic structure. In FIG. 14(a), the first phase (silicide phase; $TiSi_2$ phase) is illustrated as a bimodal graph. It can be seen that the peak having a small modal radius appears at almost the same position as the modal radius of the second phase (a-Si phase) among these and the peak having a large modal radius is the independent first phase (silicide phase; $TiSi_2$ phase) and the peak having a small modal radius is the first phase (silicide phase; $TiSi_2$ phase) in the eutectic structure by the analysis illustrated in FIGS. 3 to 13. The same can be said in FIGS. 18(*a*), 21(*a*), 23(*a*), 25(*a*), 27(*a*), 29(*a*), 31(*a*), 33(*a*), and 35(*a*).

From FIG. 14(*a*), the modal radius A of the independent first phases (silicide phases; $TiSi_2$ phases) is 220 nm. In the eutectic structure, the modal radius B of the first phases (silicide phases; $TiSi_2$ phases) is 63 nm and the modal radius C of the second phases (a-Si phases) is 45 nm. The modal radii A to C are obtained in the same manner from FIGS. 18(*a*), 21(*a*), 23(*a*), 25(*a*), 27(*a*), 29(*a*), 31(*a*), 33(*a*), and 35(*a*) as well. These are described in the respective drawings and Table 1.

FIG. 14(*b*) is a graph obtained by enlarging the graph in FIG. 14(*a*) and a graph illustrating the radius distribution of the independent first phases (silicide phases; $TiSi_2$ phases) and the second phases (a-Si phases) in the eutectic structure. The radius distribution is read at the place at which the height becomes 5% with respect to the peak height. The same applies to FIGS. 18(*b*), 21(*b*), 23(*b*), 25(*b*), 27(*b*), 29(*b*), 31(*b*), 33(*b*), and 35(*b*).

The radius distribution of the independent first phases (silicide phases; $TiSi_2$ phases) is from 160 to 300 nm. In the eutectic structure, the radius distribution of the second phases (a-Si phases) is from 40 to 100 nm. The respective radius distributions are obtained in the same manner from FIGS. 18(*b*), 21(*b*), 23(*b*), 25(*b*), 27(*b*), 29(*b*), 31(*b*), 33(*b*), and 35(*b*) as well. These are described in the respective drawings and Table 1.

FIG. 3 is a diagram illustrating a cross-sectional SEM (scanning electron microscope) image of the rapidly quenched ribbon alloy having an alloy composition $Si_{60}Sn_{8.1}Ti_{30.1}Al_{1.8}$ (mass ratio) of Example 1.

As explained in 1. analysis method to 3. analysis by electron diffraction pattern on the analysis of the microstructural constitution of the Si-containing alloy, a relatively thin gray portion represents the independent first phase (silicide phase) in FIG. 3. In addition, a black portion (or a relatively dark gray portion; see FIGS. 17 and 20 of Examples 2 and 3) represents the eutectic structure composed of the first phase and the second phase (a-Si phase). The white portion represents the portion of the Sn phase.

An intermediate circle (diameter: 440 nm) having the modal diameter based on the modal radius (220 nm) of the independent first phases determined by the precipitation calculation described above is applied to some of the independent first phases and illustrated in FIG. 3. As a result, it has been confirmed that these intermediate circles (diameter: 440 nm) having the modal diameter approximately coincides with the equivalent circular diameter (average value) of the intermediate size of the actual independent first phases.

In the same manner, the largest circle (diameter: 600 nm) and the smallest circle (diameter: 320 nm) based on the radius distribution (160 to 300 nm) of the independent first phases determined by the precipitation calculation described above are applied to some of the independent first phases and illustrated in FIG. 3. As a result, it has been confirmed that these largest circle (diameter: 600 nm) and smallest circle (diameter: 320 nm) approximately coincide with the equivalent circular diameters (diameter distribution) of the large size and small size of the actual independent first phases as well.

In addition, the intermediate circle having the modal diameter based on the modal radius of the Si phase (second phase) in the eutectic structure determined by the precipitation calculation described above and the largest circle and smallest circle based on the radius distribution can be applied to an electron micrograph such as a HAADF-STEM image and illustrated. As a result, it is confirmed that the intermediate circle having the modal diameter based on the modal radius of these Si phases (second phases) in the eutectic structure and the largest circle and smallest circle based on the radius distribution approximately coincide with the equivalent circular diameter (average value and diameter distribution) of the actual Si phases (second phases) as well.

An intermediate circle (diameter: 500 nm) having the modal diameter based on the modal radius (250 nm) of the independent first phases determined by the precipitation calculation described above is applied to some of the independent first phases and illustrated in FIG. 17. As a result, it has been confirmed that these intermediate circles (diameter: 500 nm) having the modal diameter approximately coincide with the equivalent circular diameter (average value) of the intermediate size of the actual independent first phases.

In the same manner, the largest circle (diameter: 680 nm) and the smallest circle (diameter: 380 nm) based on the radius distribution (190 to 340 nm) of the independent first phases determined by the precipitation calculation described above are applied to some of the independent first phases and illustrated in FIG. 17. As a result, it has been confirmed that these largest circle (diameter: 680 nm) and smallest circle (diameter: 380 nm) approximately coincide with the equivalent circular diameters (diameter distribution) of the large size and small size of the actual independent first phases as well.

In addition, the intermediate circle having the modal diameter based on the modal radius of the Si phase (second phase) in the eutectic structure determined by the precipitation calculation described above and the largest circle and smallest circle based on the radius distribution can be applied to an electron micrograph such as a HAADF-STEM image and illustrated. As a result, it is confirmed that the intermediate circle having the modal diameter based on the modal radius of these Si phases (second phases) in the eutectic structure and the largest circle and smallest circle based on the radius distribution approximately coincide with the equivalent circular diameter (average value and diameter distribution) of the actual Si phases (second phases) as well.

An intermediate circle (diameter: 500 nm) having the modal diameter based on the modal radius (250 nm) of the independent first phases determined by the precipitation calculation described above is applied to some of the independent first phases and illustrated in FIG. 17. As a result, it has been confirmed that these intermediate circles (diameter: 500 nm) having the modal diameter approximately coincide with the equivalent circular diameter (average value) of the intermediate size of the actual independent first phases.

In the same manner, the largest circle (diameter: 680 nm) and the smallest circle (diameter: 380 nm) based on the radius distribution (190 to 340 nm) of the independent first phases determined by the precipitation calculation described above are applied to some of the independent first phases and illustrated in FIG. 17. As a result, it has been confirmed that these largest circle (diameter: 680 nm) and smallest circle (diameter: 380 nm) approximately coincide with the equivalent circular diameters (diameter distribution) of the large size and small size of the actual independent first phases as well.

In addition, the intermediate circle having the modal diameter based on the modal radius of the Si phase (second phase) in the eutectic structure determined by the precipitation calculation described above and the largest circle and smallest circle based on the radius distribution can be applied to an electron micrograph such as a HAADF-STEM image and illustrated. As a result, it is confirmed that the intermediate circle having the modal diameter based on the modal radius of these Si phases (second phases) in the eutectic structure and the largest circle and smallest circle based on the radius distribution approximately coincide with the equivalent circular diameter (average value and diameter distribution) of the actual Si phases (second phases) as well.

Figure 20:
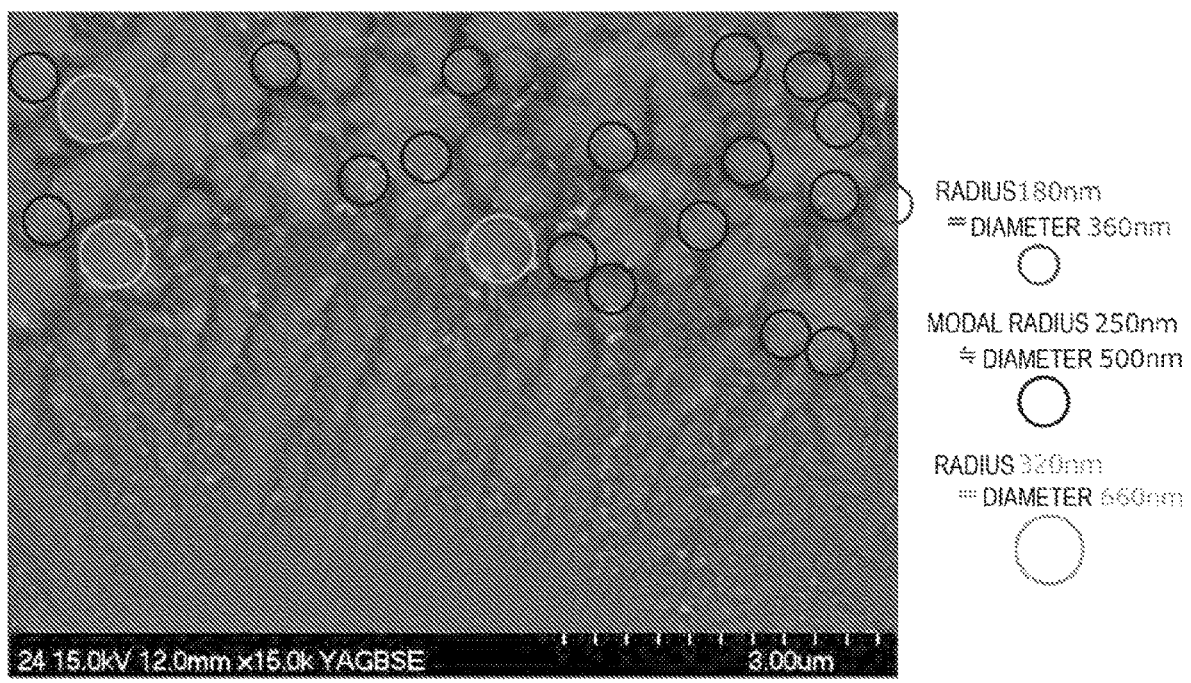
FIG. 20 is a diagram illustrating a cross-sectional SEM (scanning electron microscope) image of a rapidly quenched ribbon alloy having an alloy composition $Si_{64.0}Sn_{4.9}Ti_{30.0}Al_{1.1}$ (mass ratio) of Example 3.
Figure 21A:
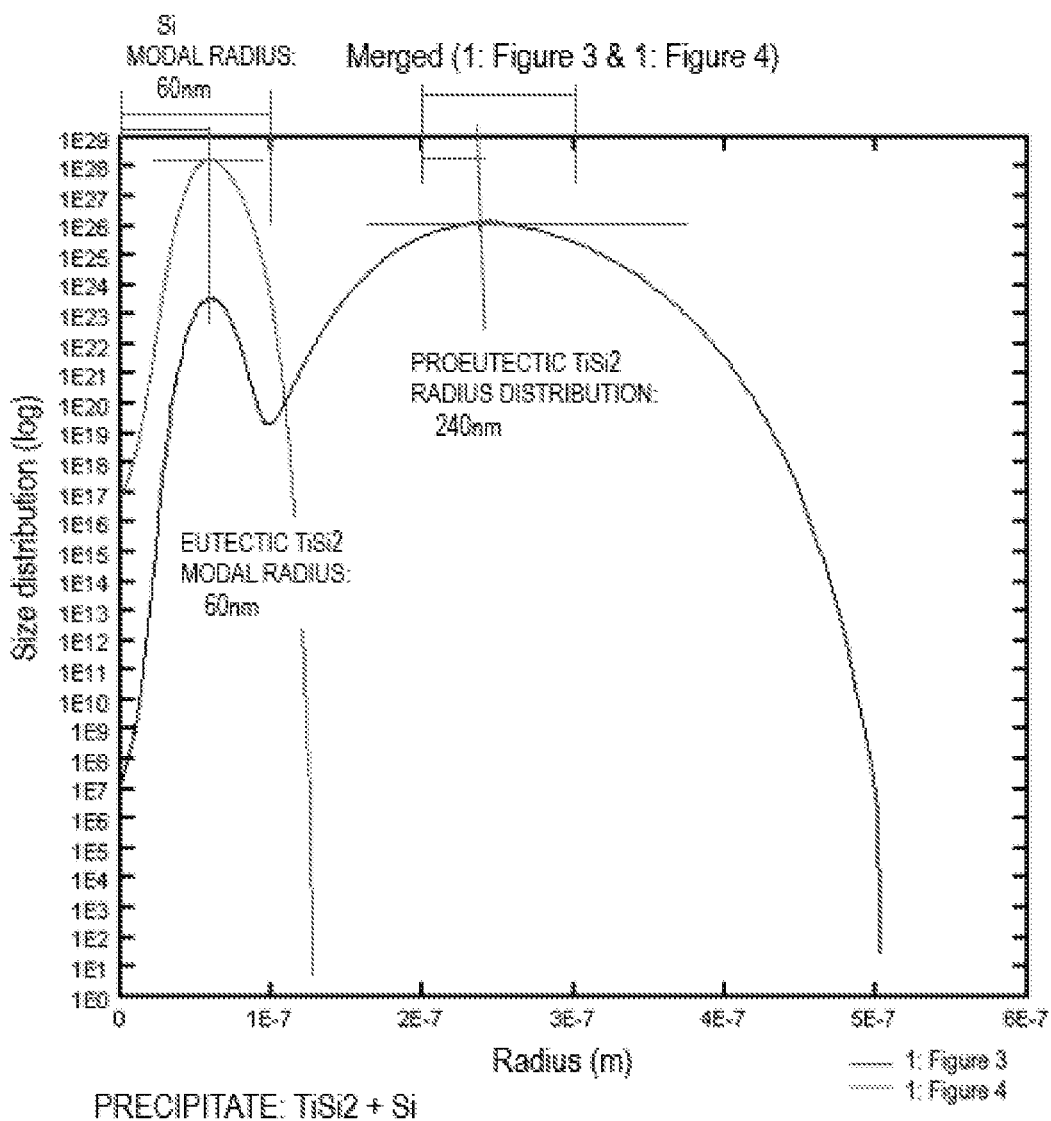
FIG. 21(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{64.0}Sn_{4.9}Ti_{30.0}Al_{1.1}$ (mass ratio) of Example 3 to precipitation simulation, and illustrates the modal radii thereof.
Figure 21B:
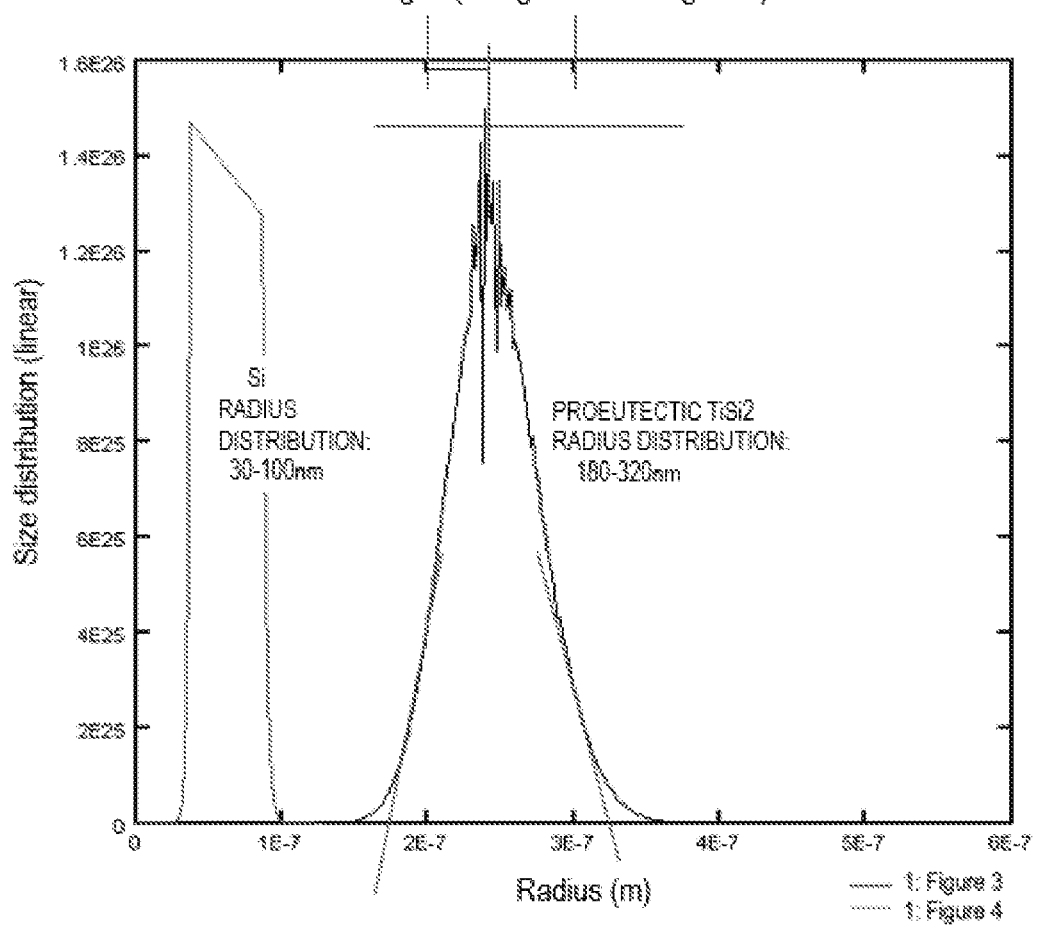
FIG. 21(b) is a graph obtained by linearly illustrating and enlarging the vertical axis (frequency distribution) of the graph in FIG. 21(a) and illustrates the radius distribution of the independent first phases and the second phases in the eutectic structure.
Figure 22A:
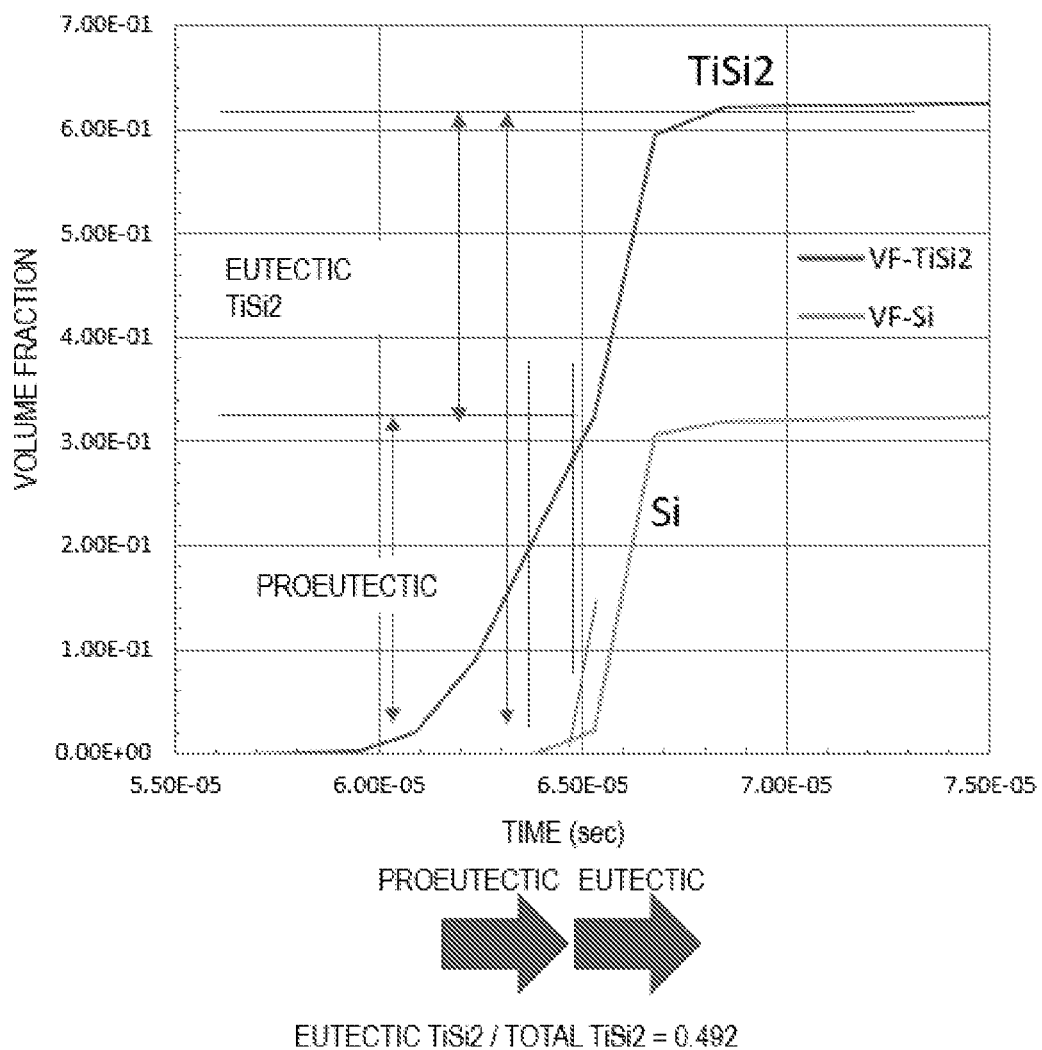
FIG. 22(a) is a diagram illustrating the time courses of the volume fractions of $TiSi_2$ and Si obtained by subjecting an alloy composition (alloy seed) $Si_{64.0}Sn_{4.9}Ti_{30.0}Al_{1.1}$ (mass ratio) of Example 3 to precipitation simulation.
Figure 22B:
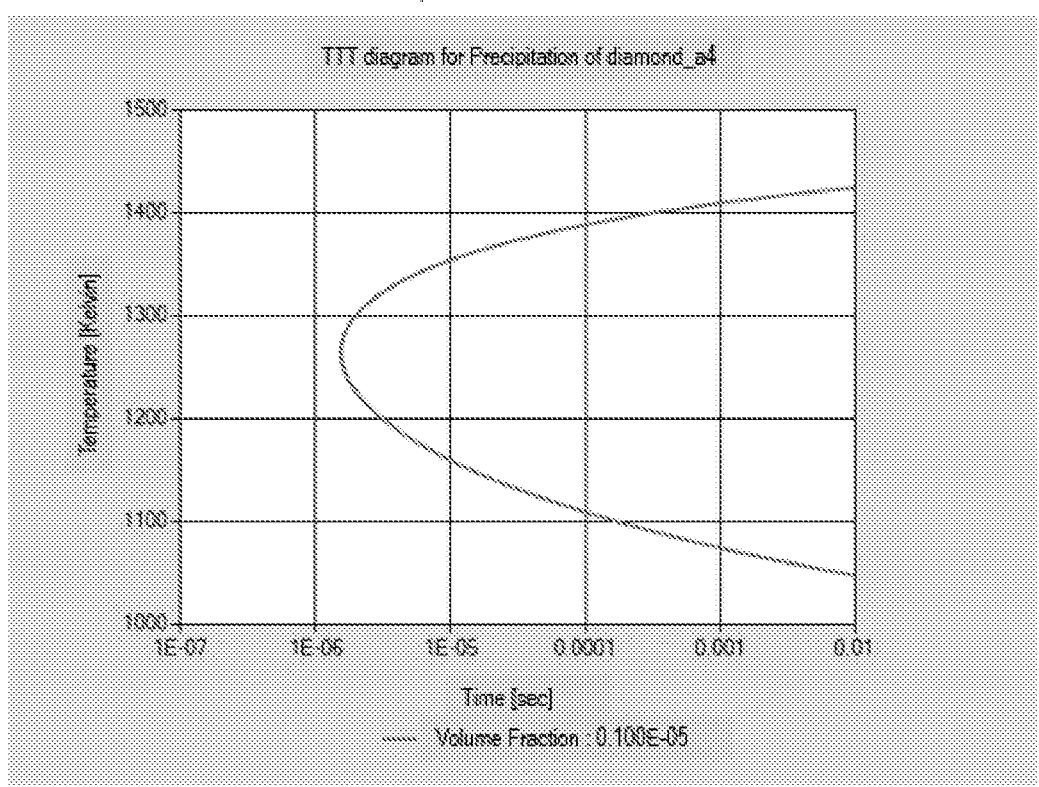
FIG. 22(b) is a TTT diagram for precipitation of Si in the liquid phase composition ($Si_{70.3}Sn_{8.1}Ti_{19.8}Al_{1.8}$) at the start of eutectic formation in the alloy composition (alloy seed) of Example 3.
Figure 23A:
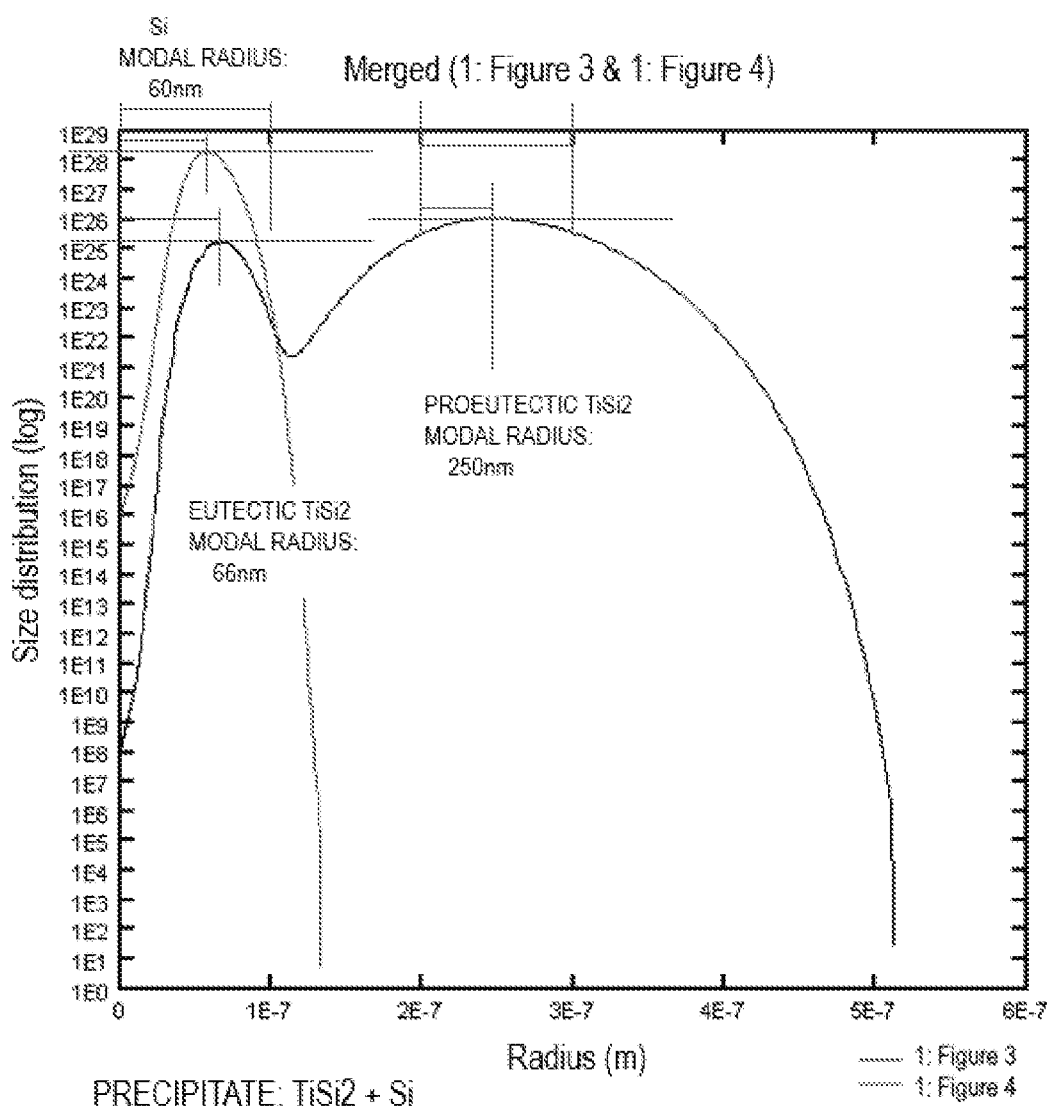
FIG. 23(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{64.6}Sn_{5.0}Ti_{29.8}Al_{0.6}$ (mass ratio) of Example 4 to precipitation simulation, and illustrates the modal radii thereof.
Figure 23B:
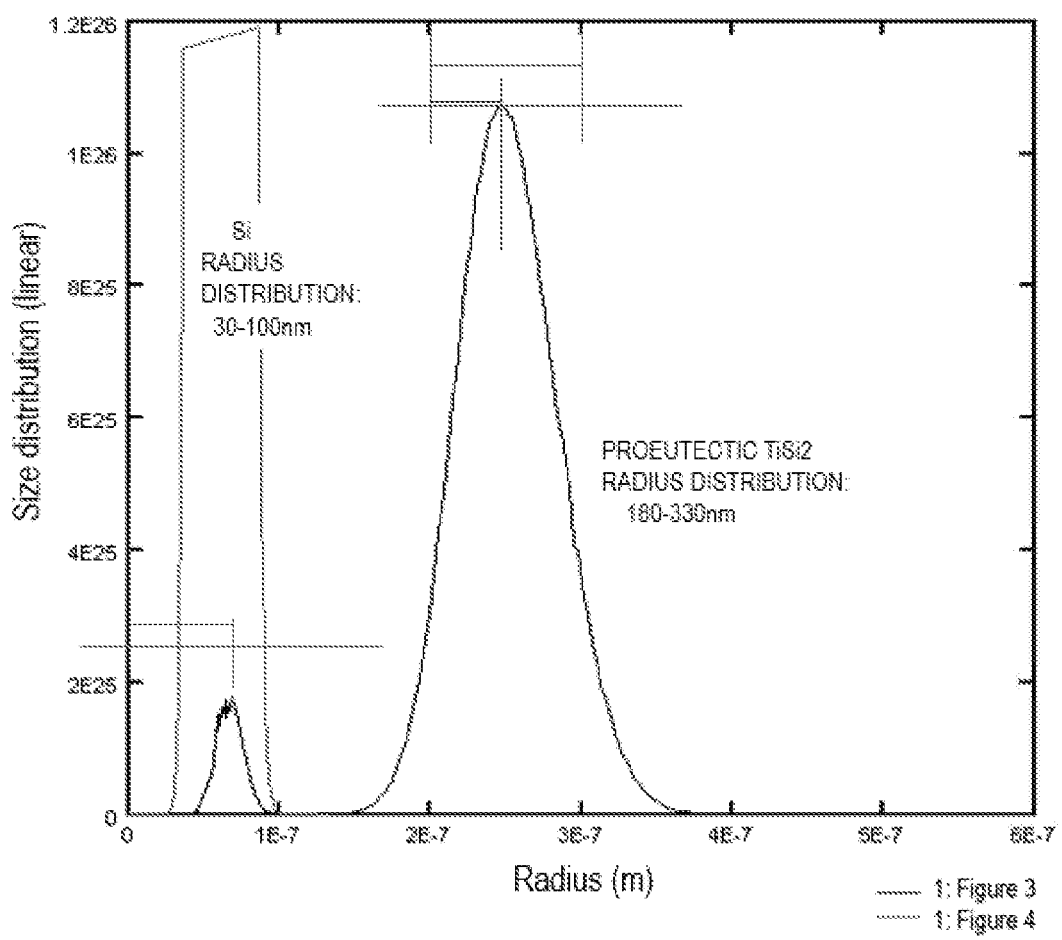
FIG. 23(b) is a graph obtained by linearly illustrating and enlarging the vertical axis (frequency distribution) of the graph in FIG. 23(a) and illustrates the radius distribution of the independent first phases and the second phases in the eutectic structure.
Figure 24A:
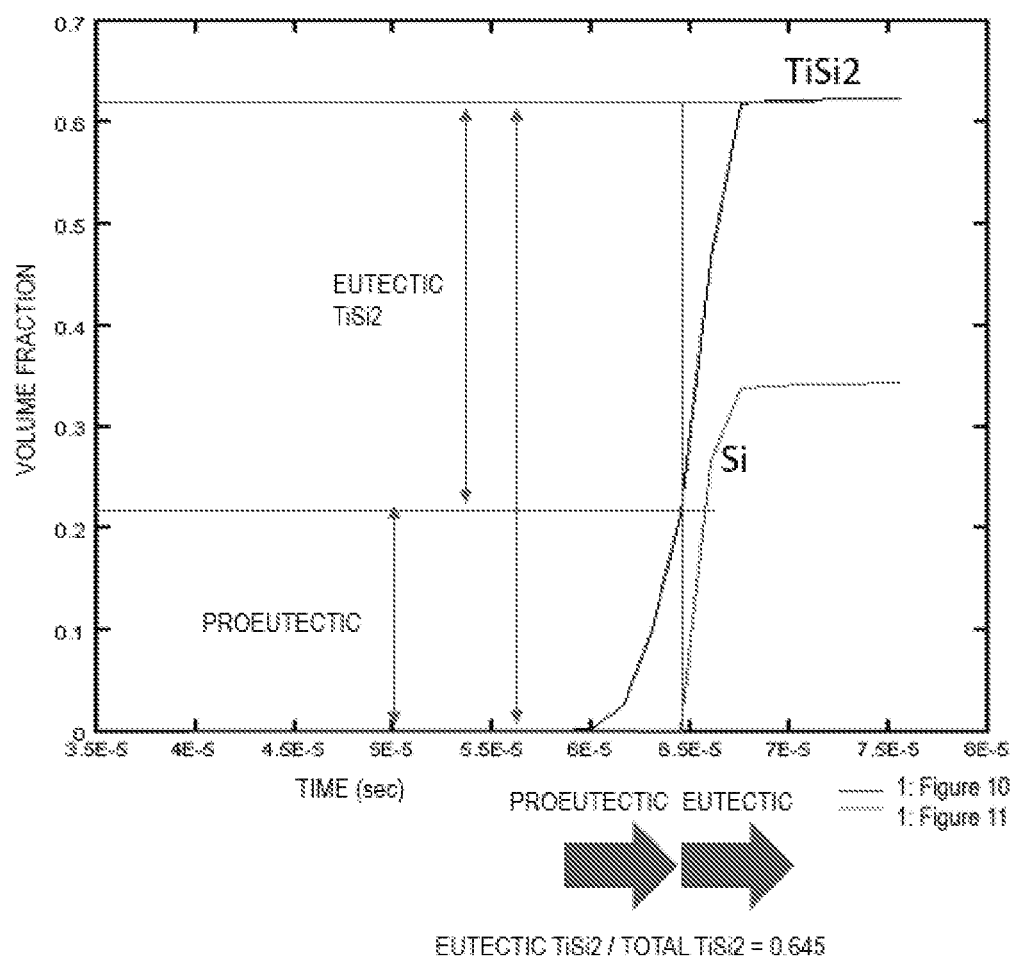
FIG. 24(a) is a diagram illustrating the time courses of the volume fractions of $TiSi_2$ and Si obtained by subjecting an alloy composition (alloy seed) $Si_{64.6}Sn_{5.0}Ti_{29.8}Al_{0.6}$ (mass ratio) of Example 4 to precipitation simulation.
Figure 24B:
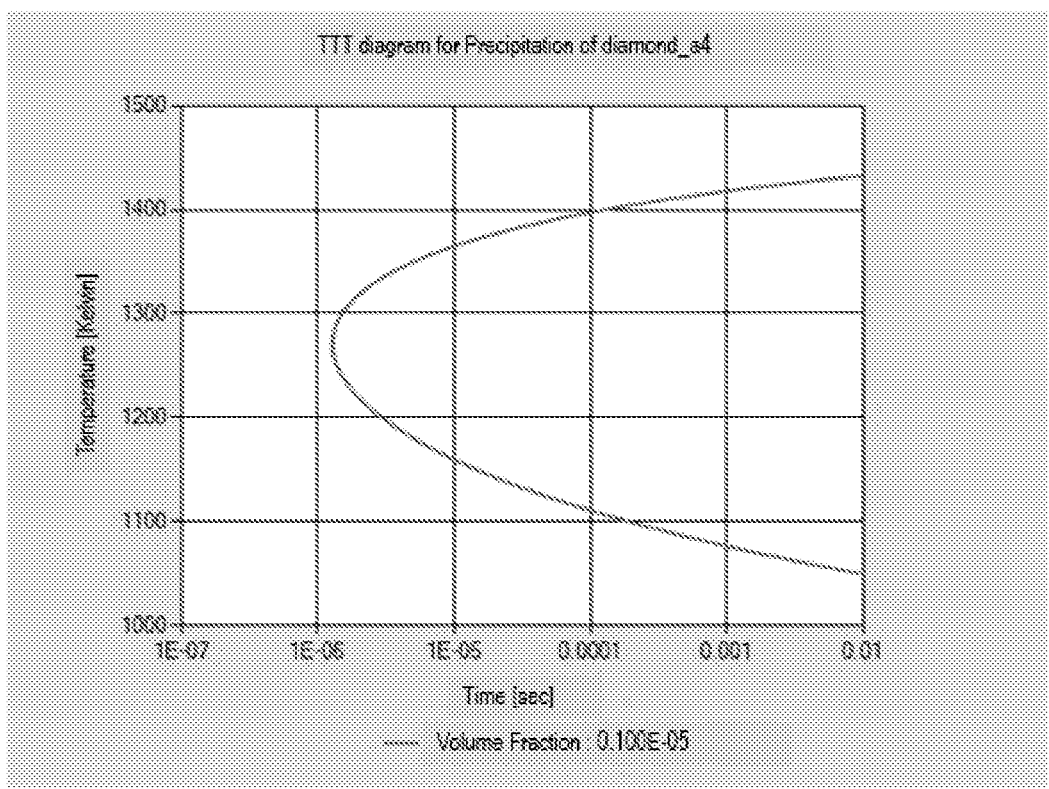
FIG. 24(b) is a TTT diagram for precipitation of Si in the liquid phase composition ($Si_{70.7}Sn_{70.9}Ti_{20.4}Al_{0.95}$) at the start of eutectic formation in the alloy composition (alloy seed) of Example 4.
Figure 26B:
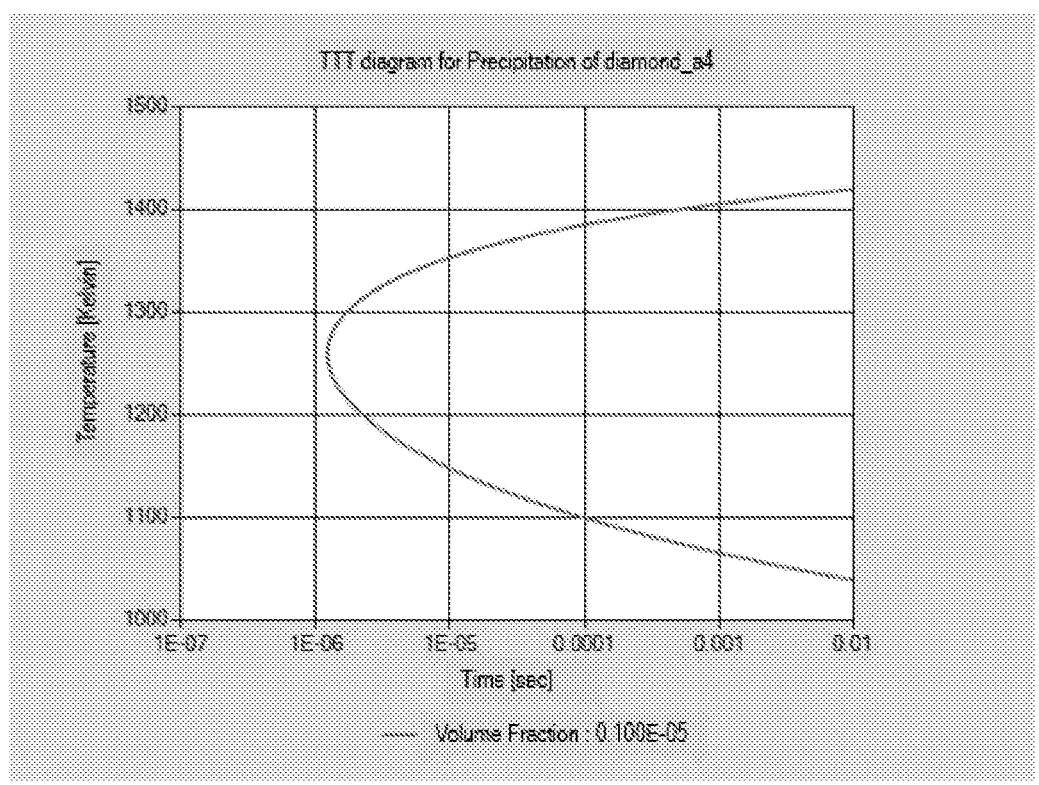
FIG. 26(b) is a TTT diagram for precipitation of Si in the liquid phase composition ($Si_{63.07}Sn_{16.6}Ti_{18.4}Al_{1.9}$) at the start of eutectic formation in the alloy composition (alloy seed) of Example 5.
Figure 27A:
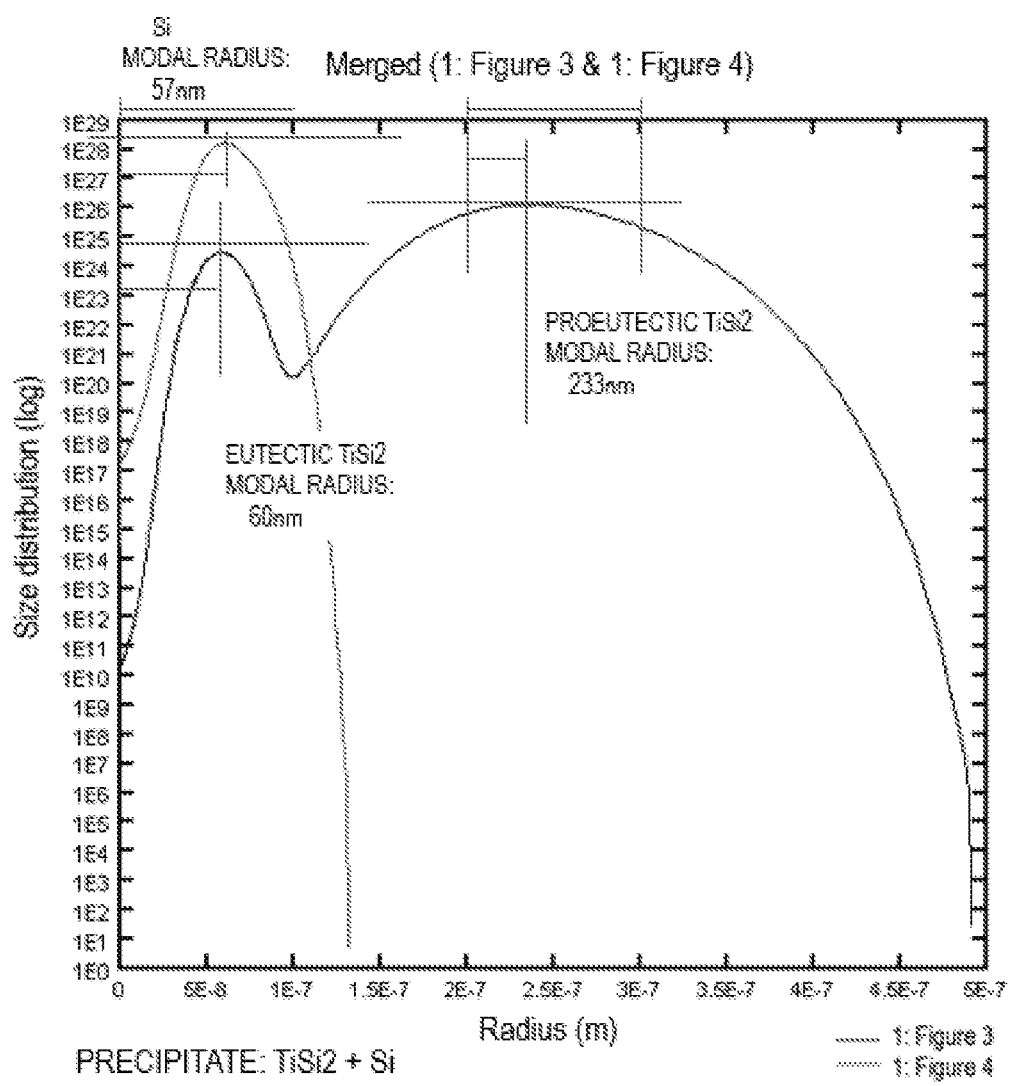
FIG. 27(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{65.5}Sn_{3.0}Ti_{30.0}Al_{1.5}$ (mass ratio) of Example 6 to precipitation simulation, and illustrates the modal radii thereof.
Figure 27B:
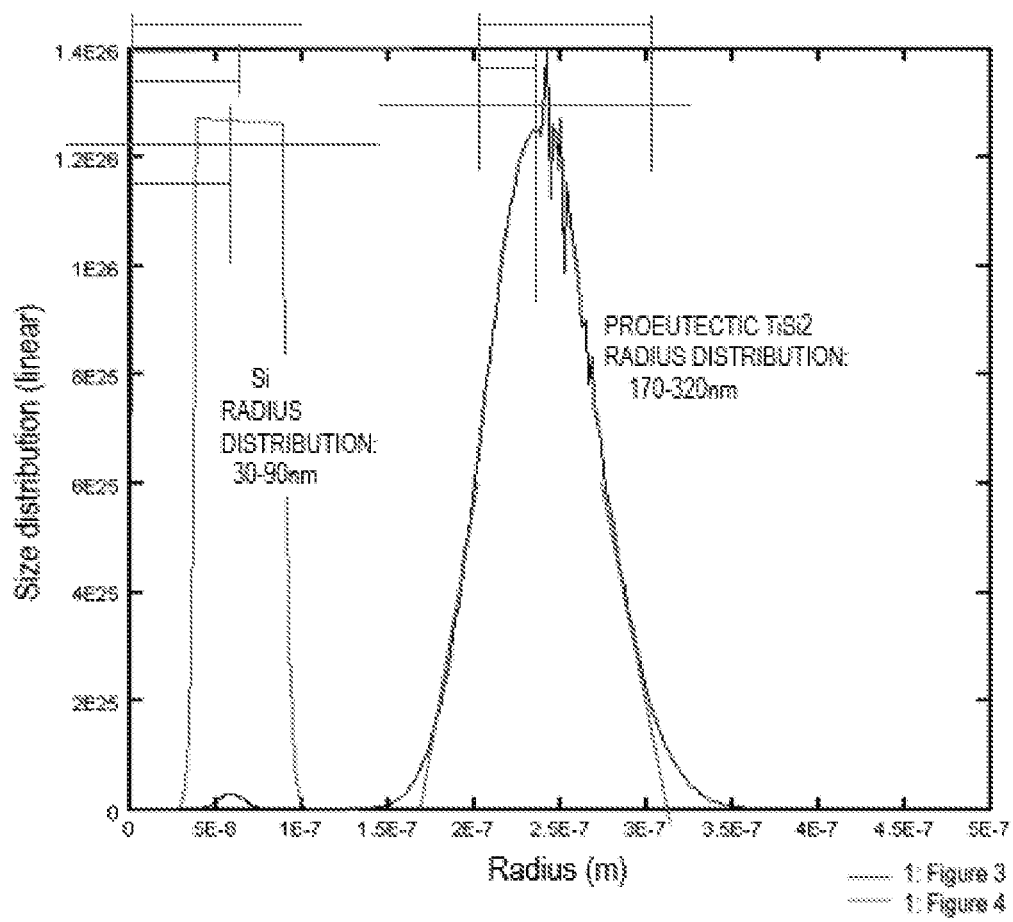
FIG. 27(b) is a graph obtained by linearly illustrating and enlarging the vertical axis (frequency distribution) of the graph in FIG. 27(a) and a graph illustrating the radius distribution of the independent first phases and the second phases in the eutectic structure.
Figure 28A:
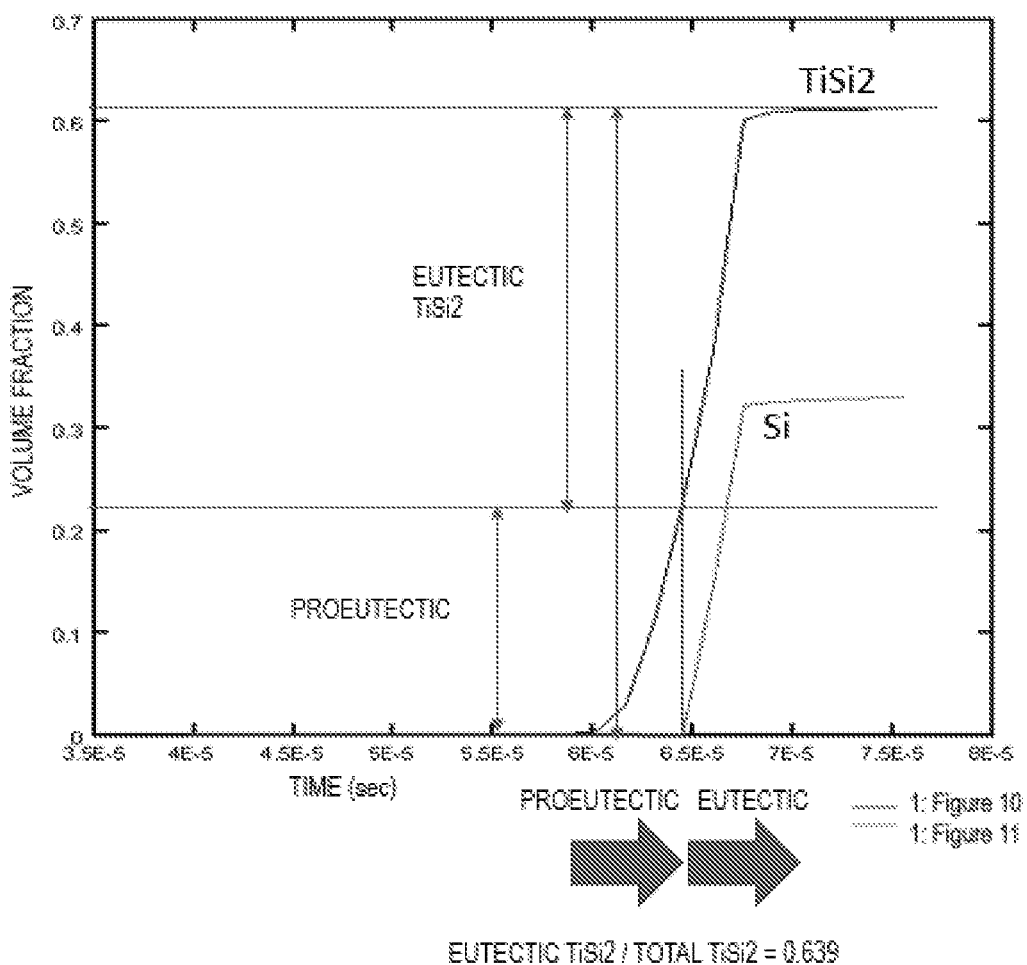
FIG. 28(a) is a diagram illustrating the time courses of the volume fractions of $TiSi_2$ and Si obtained by subjecting an alloy composition (alloy seed) $Si_{65.5}Sn_{3.0}Ti_{30.0}Al_{1.5}$ (mass ratio) of Example 6 to precipitation simulation.
Figure 28B:
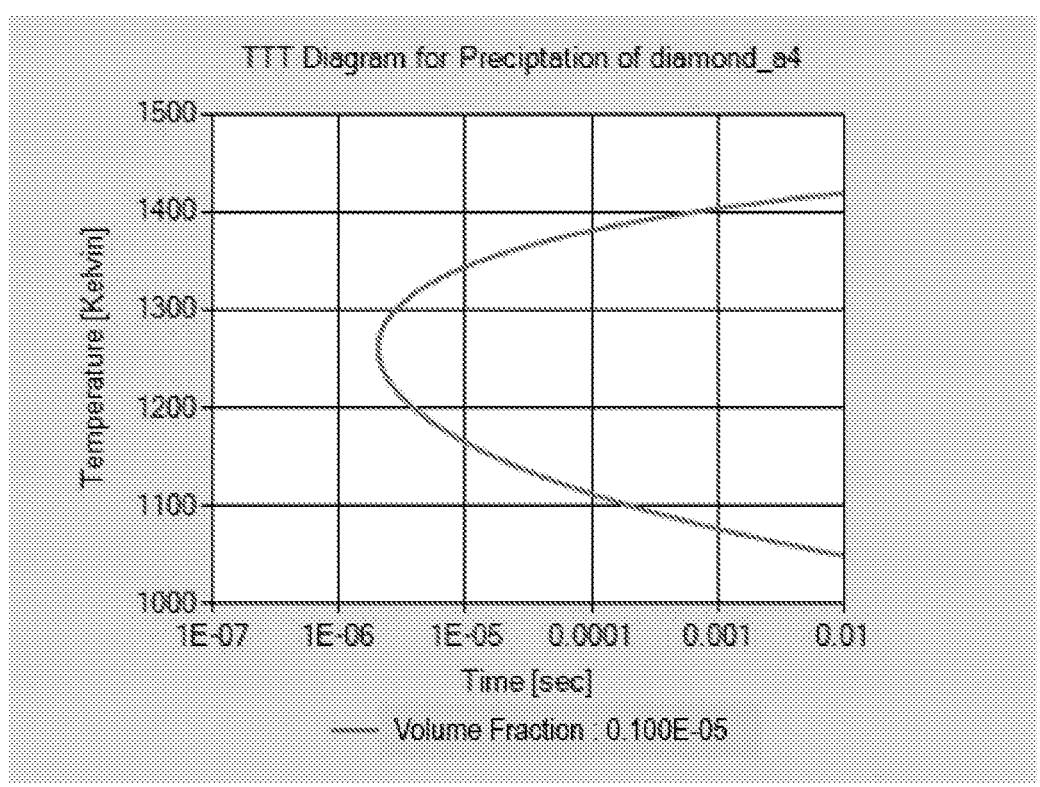
FIG. 28(b) is a TTT diagram for precipitation of Si in the liquid phase composition ($Si_{69.9}Sn_{8.4}Ti_{19.3}Al_{2.5}$) at the start of eutectic formation in the alloy composition (alloy seed) of Example 6.
Figure 30B:
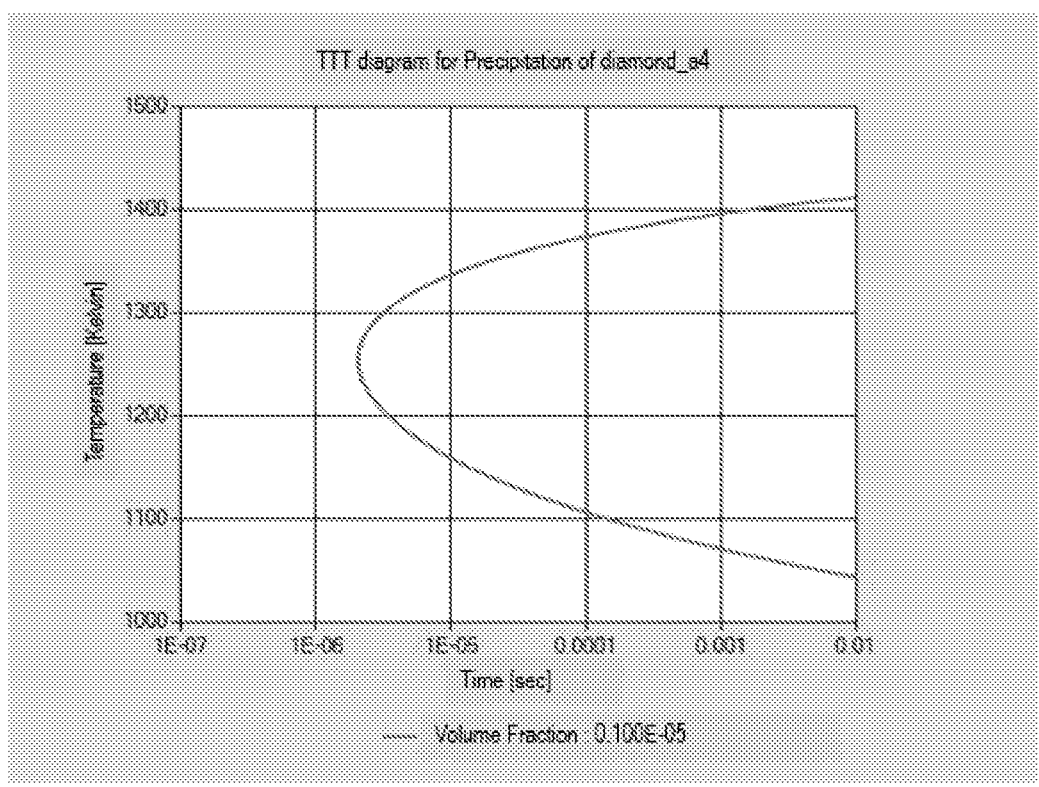
FIG. 30(b) is a TTT diagram for precipitation of Si in the liquid phase composition ($Si_{69.6}Sn_{8.5}Ti_{18.8}Al_{3.1}$) at the start of eutectic formation in the alloy composition (alloy seed) of Example 7.
Figure 31A:
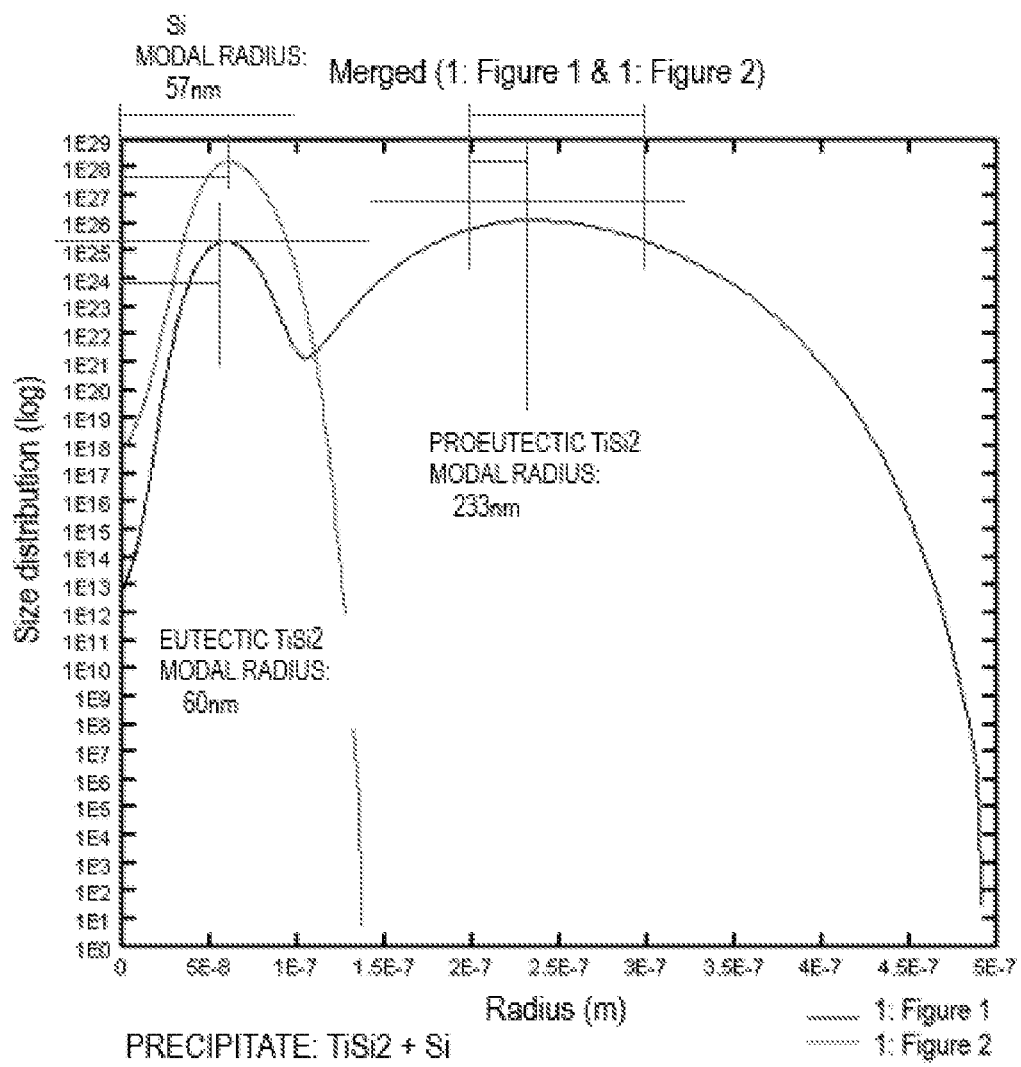
FIG. 31(a) is a graph logarithmically illustrating the frequency distribution of the radii of the independent first phases ($TiSi_2$ phases) and the first phases and second phases (Si phases) in the eutectic structure obtained by subjecting a Si-containing alloy having an alloy composition $Si_{66.5}Sn_{2.0}Ti_{30.0}Al_{1.5}$ (mass ratio) of Example 8 to precipitation simulation, and illustrates the modal radii thereof.
Figure 32A:
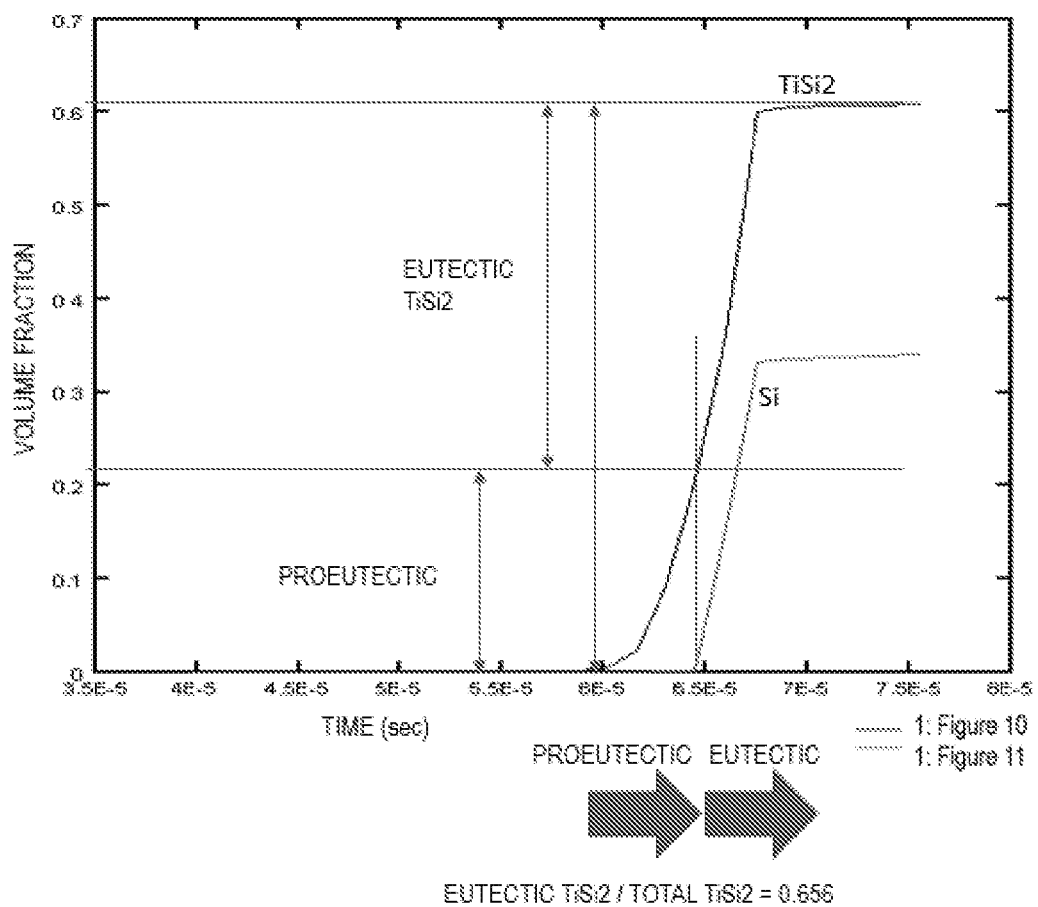
FIG. 32(a) is a diagram illustrating the time courses of the volume fractions of $TiSi_2$ and Si obtained by subjecting an alloy composition (alloy seed) $Si_{66.5}Sn_{2.0}Ti_{30.0}Al_{1.5}$ (mass ratio) of Example 8 to precipitation simulation.
Figure 32B:
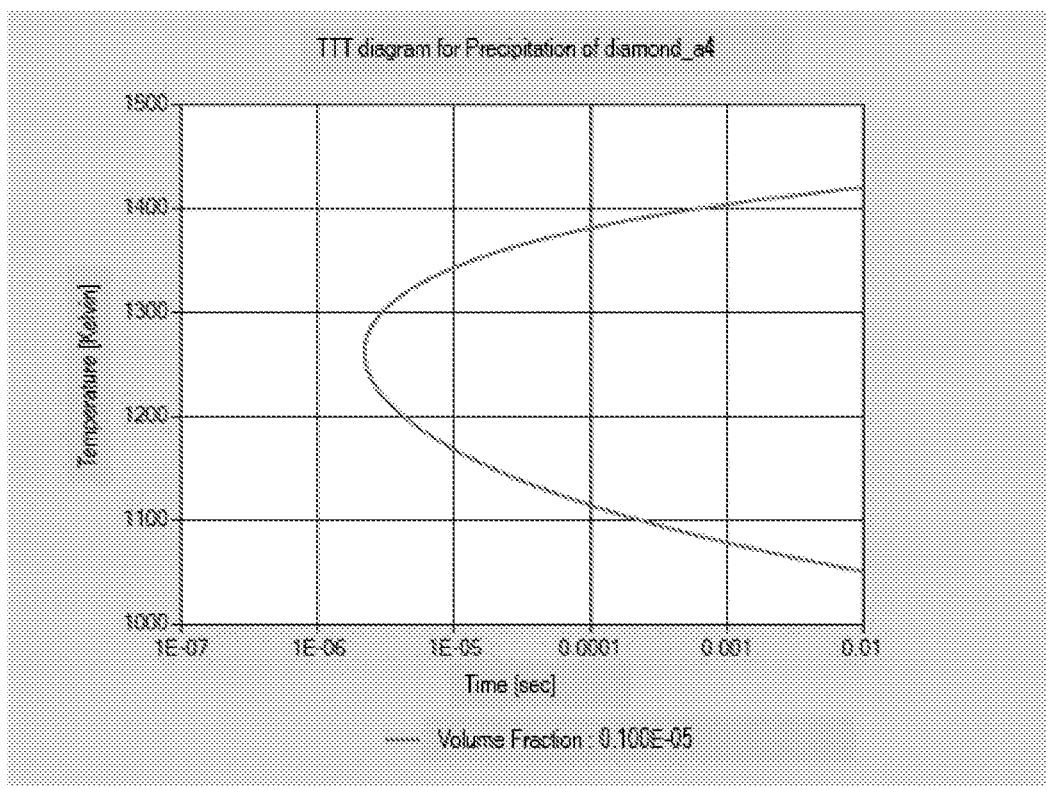
FIG. 32(b) is a TTT diagram for precipitation of Si in the liquid phase composition ($Si_{74.34}Sn_{3.27}Ti_{19.96}Al_{2.43}$) at the start of eutectic formation in the alloy composition (alloy seed) of Example 8.
Figure 34A:
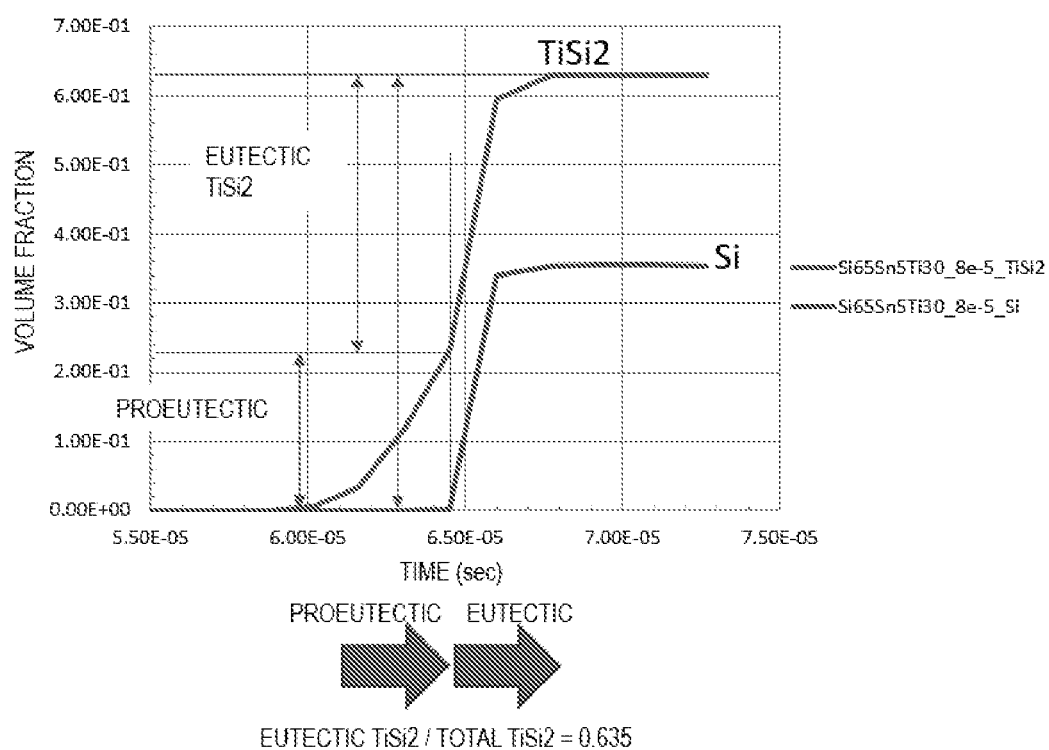
FIG. 34(a) is a diagram illustrating the time courses of the volume fractions of TiSi$_2$ and Si obtained by subjecting an alloy composition (alloy seed) Si$_{65.0}$Sn$_{5.0}$Ti$_{30.0}$ (mass ratio) of Comparative Example 1 to precipitation simulation.
Figure 34B:
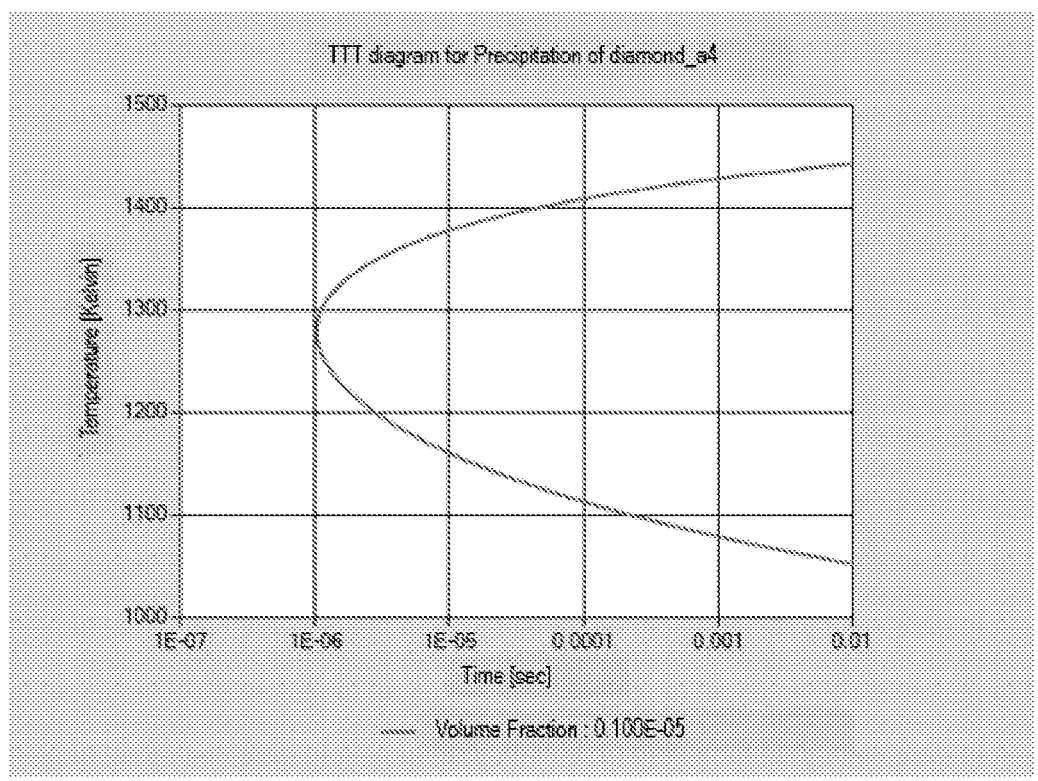
FIG. 34(b) is a TTT diagram for precipitation of Si in the liquid phase composition (Si$_{71.12}$Sn$_{7.78}$Ti$_{21.1}$) at the start of eutectic formation in the alloy composition (alloy seed) of Comparative Example 1.
Figure 35A:
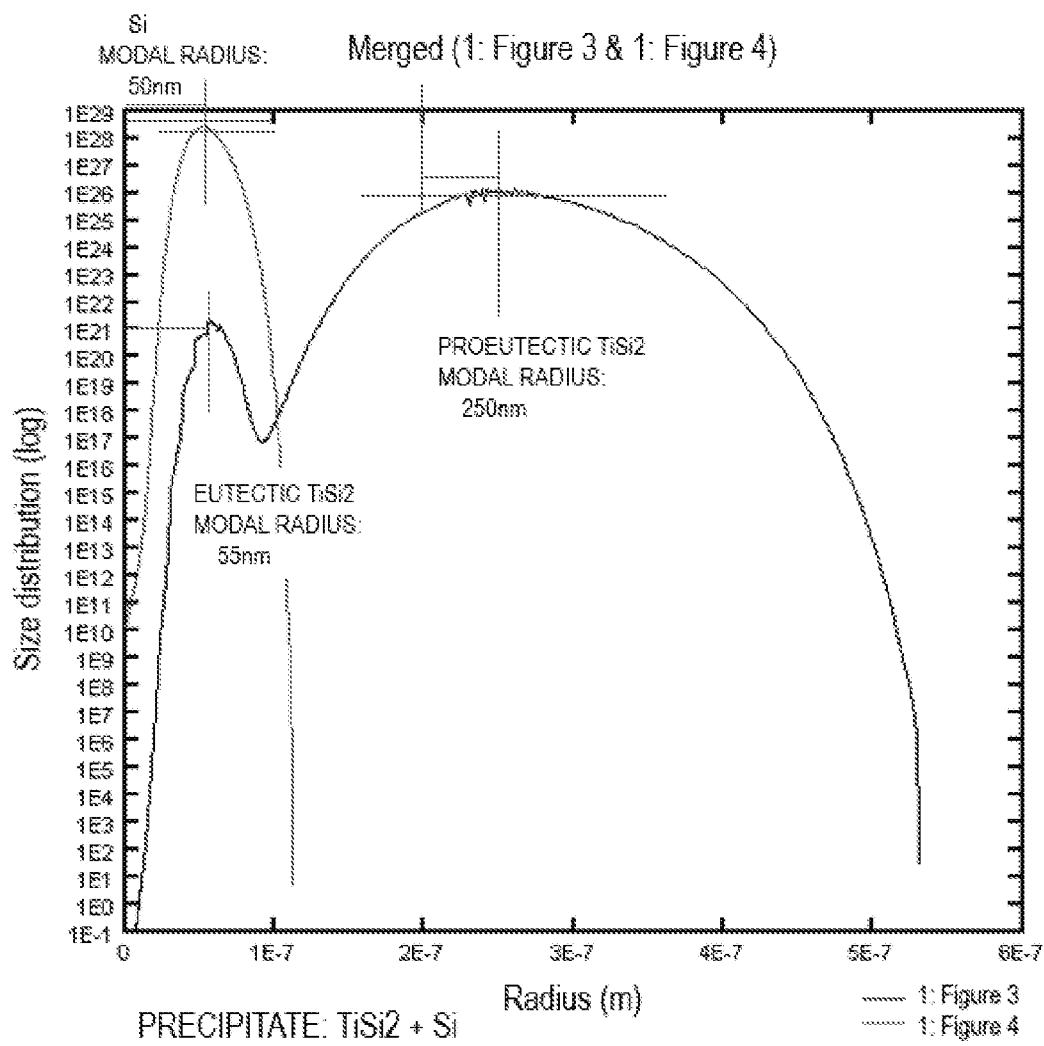
FIG. 35(a) is a graph logarithmically illustrating the frequency distribution of the radii of the independent first phases (TiSi$_2$ phases) and the first phases and second phases (Si phases) in the eutectic structure obtained by subjecting a Si-containing alloy having an alloy composition Si$_{60.0}$Sn$_{10.0}$Ti$_{30.0}$ (mass ratio) of Comparative Example 2 to precipitation simulation, and illustrates the modal radii thereof.
Figure 35B:
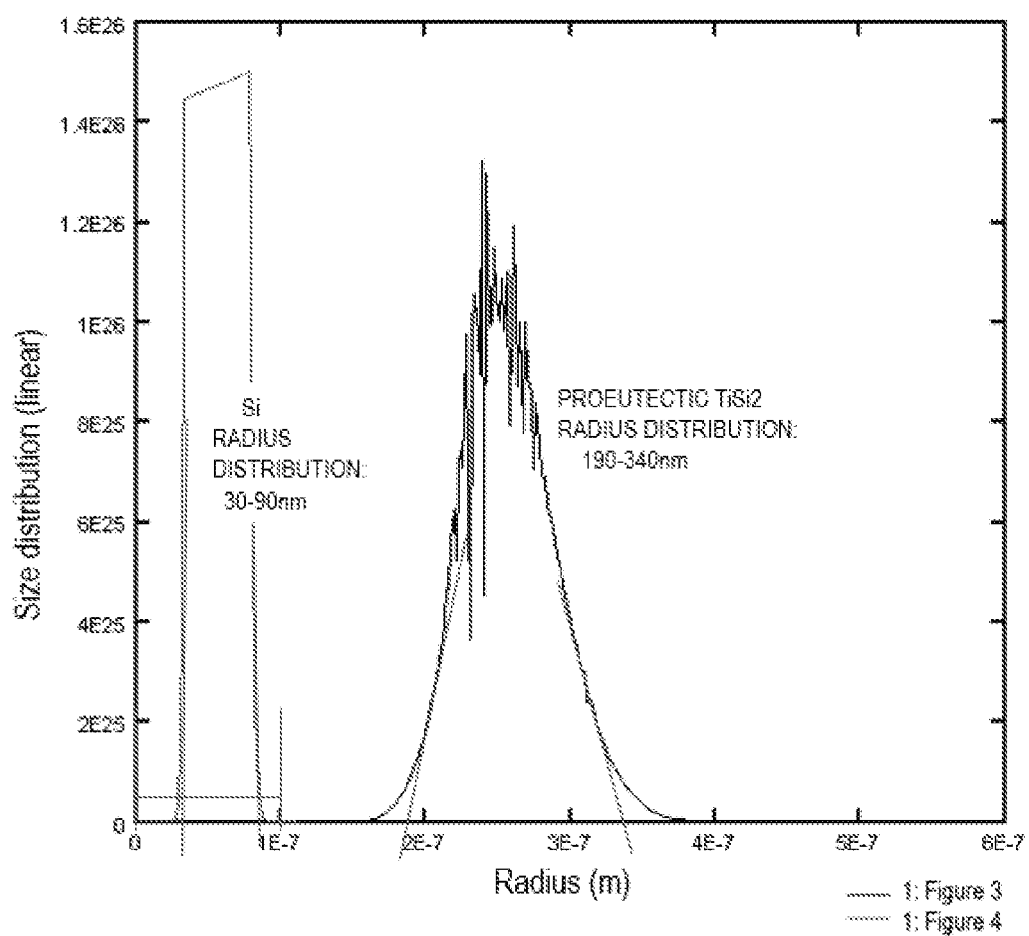
FIG. 35(b) is a graph obtained by linearly illustrating and enlarging the vertical axis (frequency distribution) of the graph in FIG. 35(a) and illustrates the radius distribution of the independent first phases and the second phases in the eutectic structure.
Figure 36A:
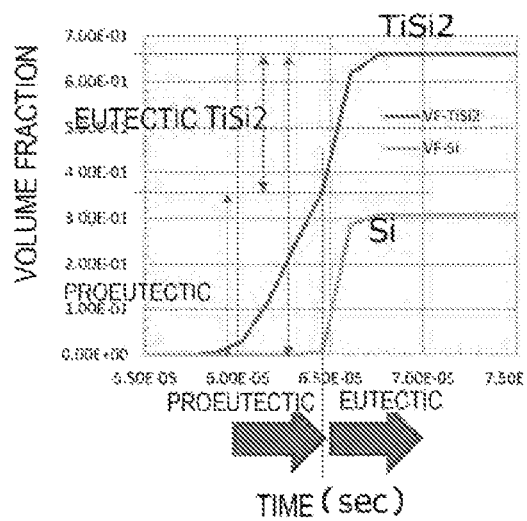
FIG. 36(a) is a diagram illustrating the time courses of the volume fractions of TiSi$_2$ and Si obtained by subjecting an alloy composition (alloy seed) Si$_{60.0}$Sn$_{10.0}$Ti$_{30.0}$ (mass ratio) of Comparative Example 2 to precipitation simulation.

An intermediate circle (diameter: 500 nm) having the modal diameter based on the modal radius (250 nm) of the independent first phases determined by the precipitation calculation described above is applied to some of the independent first phases and illustrated in FIG. 20. As a result, it has been confirmed that these intermediate circles (diameter: 500 nm) having the modal diameter approximately coincide with the equivalent circular diameter (average value) of the intermediate size of the actual independent first phases.

In the same manner, the largest circle (diameter: 640 nm) and the smallest circle (diameter: 360 nm) based on the radius distribution (180 to 320 nm) of the independent first phases determined by the precipitation calculation described above are applied to some of the independent first phases and illustrated in FIG. 20. As a result, it has been confirmed that these largest circle (diameter: 640 nm) and smallest circle (diameter: 360 nm) approximately coincide with the equivalent circular diameters (diameter distribution) of the large size and small size of the actual independent first phases as well.

In addition, the intermediate circle having the modal diameter based on the modal radius of the Si phase (second phase) in the eutectic structure determined by the precipitation calculation described above and the largest circle and smallest circle based on the radius distribution can be applied to an electron micrograph such as a HAADF-STEM image and illustrated. As a result, it is confirmed that the intermediate circle having the modal diameter based on the modal radius of these Si phases (second phases) in the eutectic structure and the largest circle and smallest circle based on the radius distribution approximately coincide with the equivalent circular diameter (average value and diameter distribution) of the actual Si phases (second phases) as well.

An intermediate circle (diameter: 500 nm) having the modal diameter based on the modal radius (250 nm) of the independent first phases determined by the precipitation calculation described above is applied to some of the independent first phases and illustrated in FIG. 20. As a result, it has been confirmed that these intermediate circles (diameter: 500 nm) having the modal diameter approximately coincide with the equivalent circular diameter (average value) of the intermediate size of the actual independent first phases.

In the same manner, the largest circle (diameter: 640 nm) and the smallest circle (diameter: 360 nm) based on the radius distribution (180 to 320 nm) of the independent first phases determined by the precipitation calculation described above are applied to some of the independent first phases and illustrated in FIG. 20. As a result, it has been confirmed that these largest circle (diameter: 640 nm) and smallest circle (diameter: 360 nm) approximately coincide with the equivalent circular diameters (diameter distribution) of the large size and small size of the actual independent first phases as well.

In addition, the intermediate circle having the modal diameter based on the modal radius of the Si phase (second phase) in the eutectic structure determined by the precipitation calculation described above and the largest circle and smallest circle based on the radius distribution can be applied to an electron micrograph such as a HAADF-STEM image and illustrated. As a result, it is confirmed that the intermediate circle having the modal diameter based on the modal radius of these Si phases (second phases) in the eutectic structure and the largest circle and smallest circle based on the radius distribution approximately coincide with the equivalent circular diameter (average value and diameter distribution) of the actual Si phases (second phases) as well.

(Equivalent Circular Radius)

For the microstructure of the Si-containing alloy of the present embodiment, it is possible to determine from 10 to 100, preferably from 30 to 100, and more preferably from 50 to 100 equivalent circular radii (average values) on the number basis using an electron micrograph and the like as illustrated in FIGS. 3 to 13.

The equivalent circular radius (average value) of the independent first phase (silicide phase) is 280 nm or less, preferably 260 nm or less, more preferably 252 nm or less, still more preferably 250 nm or less, and particularly preferably 235 nm or less. The lower limit of the equivalent circular radius (average value) of the independent first phase (silicide phase) is not particularly limited, but it is preferably 160 nm or more, more preferably 170 nm or more, still more preferably 180 nm or more, and particularly preferably 190 nm or more. The effect described above can be more effectively exerted as the equivalent circular radius is in such a range.

The equivalent circular radius (average value) of the first phase (silicide phase) in the eutectic structure is preferably 70 nm or less, more preferably 67 nm or less, particularly preferably 58 nm or less, and particularly preferably 53 nm or less. The lower limit of the equivalent circular radius (average value) of the first phase (silicide phase) in the eutectic structure is not particularly limited, but it is 25 nm or more, still more preferably 30 nm or more, and particularly preferably 35 nm or more, and 40 nm or more is preferable among these. The effect described above can be more effectively exerted as the equivalent circular radius is in such a range.

The equivalent circular radius (average value) of the second phase (Si phase) in the eutectic structure is preferably 80 nm or less, more preferably 75 nm or less, and still more preferably 70 nm or less. The lower limit of the equivalent circular radius (average value) of the second phase (Si phase) in the eutectic structure is not particularly limited, but it is preferably 40 nm or more, more preferably 45 nm or more, still more preferably 50 nm or more, and particularly preferably 57 nm or more, and 61 nm or more is preferable among these. The effect described above can be more effectively exerted as the equivalent circular radius is in such a range.

The ratio of the equivalent circular radius (average value) of the independent first phase to the equivalent circular radius (average value) of the second phase of the eutectic structure in the microstructure (equivalent circular radius (average value) of independent first phase/equivalent circular radius (average value) of second phase of eutectic structure) is preferably 4.5 or less. The ratio is more preferably 4.3 or less, still more preferably 4.0 or less, particularly preferably 3.8 or less, and 3.6 or less is preferable among these. In addition, the lower limit of the ratio of the equivalent circular radius (average value) of the independent first phase to the equivalent circular radius (average value) of the second phase of the eutectic structure in the microstructure is not particularly limited, but for example, it is 2.0 or more and preferably 3.0 or more. In other words, the independent first phase (proeutectic $TiSi_2$) is not too large with respect to the second phase (Si phase) of the eutectic structure which directly contributes to charge and discharge as the ratio of the equivalent circular radius (average value) of the independent first phase to the equivalent circular radius (average value) of the second phase of the eutectic structure is set to 4.5 or less, and thus the expansion of Si can be effectively repressed.

The ratio (equivalent circular radius (average value) of first phase of eutectic structure/equivalent circular radius (average value) of second phase of eutectic structure) of the equivalent circular radius (average value) of the first phase to the equivalent circular radius (average value) of the second phase in the eutectic structure is preferably 1 or less. The ratio is more preferably 0.95 or less and still more preferably 0.90 or less. In addition, the lower limit of the ratio of the equivalent circular radius (average value) of the first phase to the equivalent circular radius (average value) of the second phase in the eutectic structure is not particularly limited, but it is, for example, 0.40 or more and preferably 0.50 or more. In other words, the expansion of Si can be effectively repressed even if the ratio of the equivalent circular radius (average value) of the first phase to the equivalent circular radius (average value) of the second phase in the eutectic structure is set to 1 or less, that is, the equivalent circular radius (average value) of the first phase ($TiSi_2$ phase) in the eutectic structure is set to be relatively small with respect to the equivalent circular radius (average value) of the second phase (Si phase).

From the above, it can be said that the modal radii of the independent first phase and the second phase in the eutectic structure determined by the precipitation calculation described above approximately coincide with the modal radii of the actual independent first phases and the actual second phases in the eutectic structure. It has been found that the modal radii approximately coincide with the from 10 to 100, preferably from 30 to 100, and more preferably from 50 to 100 equivalent circular radii (average value) on the number basis to be measured from an electron micrograph and the like and thus the modal radius and radius distribution described above can be applied as a new index instead of these equivalent circular radii without problems.

<Method for Producing Negative Electrode Active Material>

The method for producing the negative electrode active material for an electrical device according to the present embodiment is not particularly limited, and conventionally known knowledge can be appropriately referred to. As described above, in the present embodiment, it is preferable that the microstructure of the Si-containing alloy has a first phase and a second phase and further has a structure of which a part is composed of a plurality of independent first phases and a part has a eutectic structure composed of the first phase and the second phase. As an example of the method for producing a negative electrode active material composed of such a Si-containing alloy, there is provided a method in which a rapidly quenched ribbon alloy is fabricated by a liquid quenching roll solidification method (also referred to simply as a "liquid quenching solidification method" in the present specification) as follows. In other words, according to another embodiment of the present invention, there is also provided a method for producing a negative electrode active material for an electrical device composed of a Si-containing alloy having a composition to be represented by the Chemical Formula (1) above, which includes obtaining a negative electrode active material for an electrical device composed of the Si-containing alloy by fabricating a rapidly quenched ribbon alloy using a mother alloy having the same composition as that of the Si-containing alloy by a liquid quenching solidification method. It is possible to produce an alloy having the microstructural constitution described above by producing the negative electrode active material (Si-containing alloy) by performing the liquid quenching solidification method in this manner. In addition, in the Si-containing alloy to be obtained, it is possible to decrease the modal radius of the second phase in the eutectic structure described above, the modal radius of the independent first phase, and the like. By this, there is provided a production method that can effectively contribute to the improvement in cycle durability while the Si-containing alloy active material has a high capacity.

Figure 41:
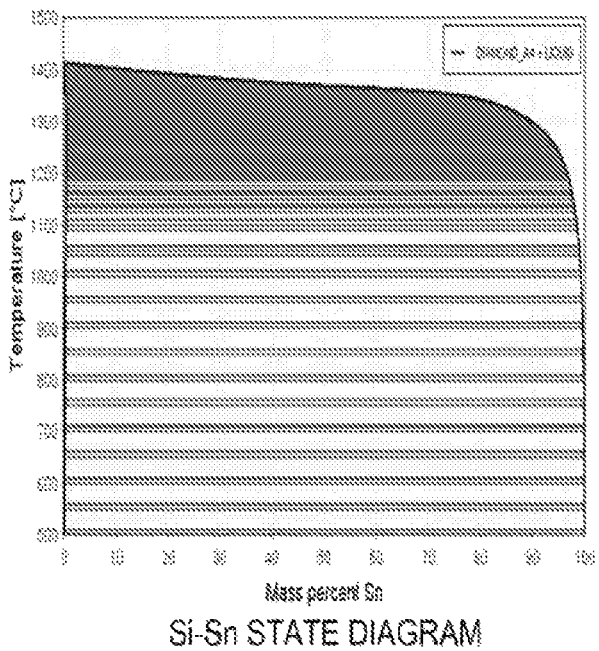
FIG. 41 is a state diagram of a Si—Sn binary system.
Figure 42:
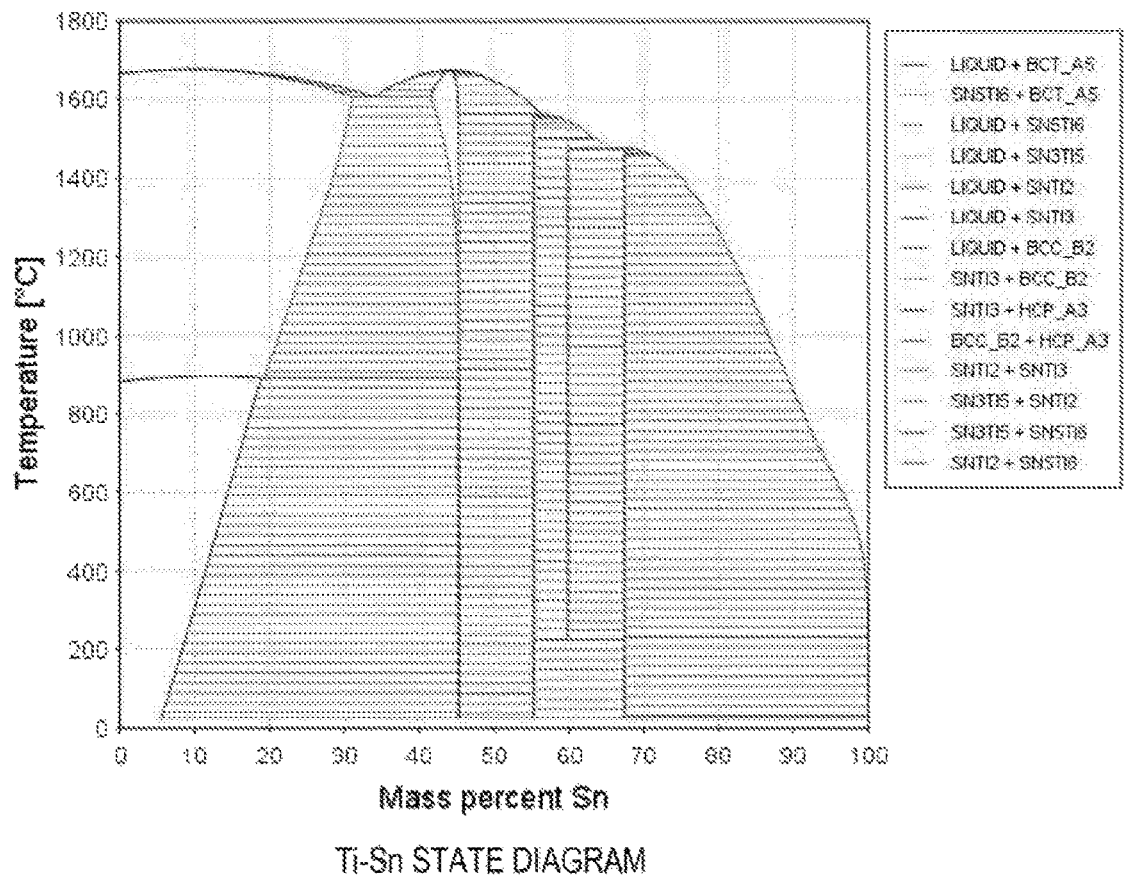
FIG. 42 is a state diagram of a Ti—Sn binary system.
Figure 43:
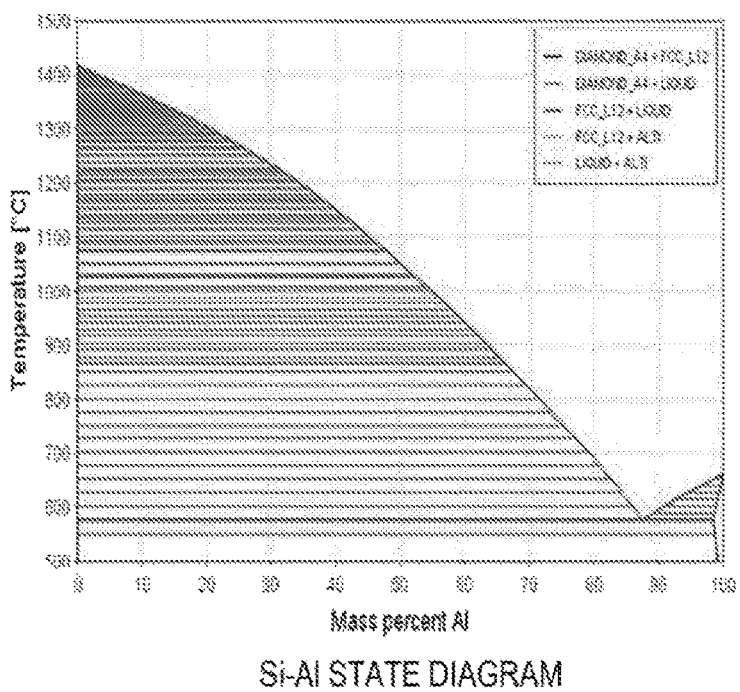
FIG. 43 is a state diagram of a Si—Al binary system.
Figure 44:
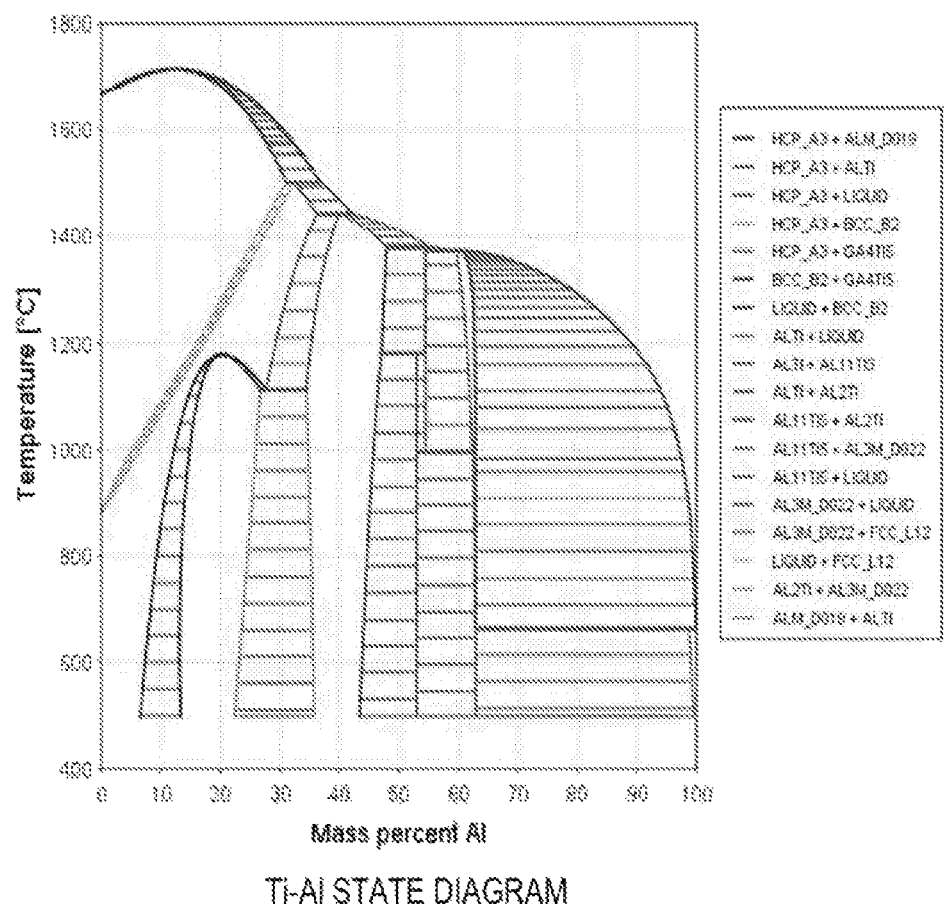
FIG. 44 is a state diagram of a Ti—Al binary system.

As described above, in a case in which Ti is used as a transition metal element, in a Si—Sn—Ti—Al quaternary alloy, according to the chemical thermodynamics (CALPHAD method=computational phase diagram method), it can be seen that Si and Ti extremely strongly bond with each other since Ti and Si form a compound having an extremely high melting point (Si—Ti is more stable than Ti—Ti and Si—Si) (FIG. 40) in a case in which the relationship among Si—Sn—Ti is examined. In addition, it can be seen that Si and Sn repel (phase separation) each other (Si—Si and Sn—Sn are stable) (FIG. 41). In addition, it can be seen that Ti and Sn bond with each other (are in a stable state) since Sn and Ti form a large number of compounds (FIG. 42). In addition, in a case in which the relationship among Si—Ti—Al is examined, it can be seen that Si and Ti extremely strongly bond with each other since Ti and Si form a compound having an extremely high melting point (Si—Ti is more stable than Ti—Ti and Si—Si) (FIG. 40). In addition, it can be seen that Si and Al are attracted to each other in the liquid state but repel (phase separation) each other in the solid phase (Si—Si and Al—Al are stable) (FIG. 43). In addition, it can be seen that Ti and Al bond with each other (are in a stable state) since Al and Ti form a large number of compounds (FIG. 44).

The Si-containing alloy (negative electrode active material) according to the present invention contains Al in a smaller amount as compared with that of Ti (transition metal element). For example, in the case of producing the Si-containing alloy (negative electrode active material) by the liquid quenching solidification method, Al is attracted to Ti and Si (remains) in the liquid phase and can suppress (hinder) the crystallization of $TiSi_2$. In other words, proeutectic $TiSi_2$ can be refined, and an independent (proeutectic) $TiSi_2$ phase (first phase) is finely dispersed in the alloy structure, and thus the expansion and shrinkage of Si associated with charge and discharge can be effectively suppressed. Furthermore, the stability of the Si-containing alloy in the liquid state is relatively high and the melting point decreases by eutecticization of Si with Al when Al is added to a Si—Sn—Ti alloy since Si and Al are attracted to each other in the liquid state but repel each other in the solid phase. By this, forming ability of the amorphous phase of the Si-containing alloy can be enhanced and the degree of amorphousness can be increased. For this reason, the chemical structure of the a-Si phase (second phase) is hardly changed even at the time of intercalation and deintercalation of Li associated with charge and discharge, and it is possible to exhibit still higher durability. Consequently, it is possible to improve the cycle durability of an electrical device such as a lithium ion secondary battery in which the negative electrode active material (Si-containing alloy) of the present invention is used.

Furthermore, as the cooling proceeds, crystallization of proeutectic $TiSi_2$ is completed and the stage in which $TiSi_2$ and Si are eutecticized with each other is started. At this stage as well, the added Al remains in the liquid phase and suppresses the crystallization of $TiSi_2$, and thus $TiSi_2$ in the eutectic structure decreases in size (is refined) as the Al content (in the liquid phase) increases. As a result, $TiSi_2$ becomes relatively small with respect to Si in the eutectic structure and the Si phase and $TiSi_2$ phase in the eutectic structure are in the form of being adjacent to each other as a structure, and thus the proportion of Si in the eutectic structure becomes relatively large.

For this reason, the expansion of the Si phase (a-Si phase) in the eutectic structure in the charge and discharge process can be suppressed by so-called two step repression that the expansion is repressed by the eutecticized $TiSi_2$ phase and further by a plurality of independent (proeutectic) $TiSi_2$ phases.

Hereinafter, a production method according to the present embodiment will be described.

(Liquid Quenching Roll Solidification Method (Liquid Quenching Solidification Method))

First, a liquid quenching roll solidification method (liquid quenching solidification method) is carried out using a mother alloy having the same composition as that of the desired Si-containing alloy. A rapidly quenched ribbon (ribbon) alloy is fabricated by this.

Here, in order to obtain the mother alloy, high purity raw materials (ingots, wires, plates, and the like of simple substances) for each of silicon (Si), tin (Sn), aluminum (Al), and transition metal (for example, titanium (Ti)) are prepared. Subsequently, a mother alloy in the form of an ingot or the like is fabricated by a known method such as an arc melting method in consideration of the composition of the Si-containing alloy (negative electrode active material) to be finally produced.

Thereafter, the liquid quenching roll solidification method is carried out using the mother alloy obtained above. This step is a step of quenching and solidifying the molten material obtained by melting the mother alloy obtained above, and for example, it can be carried out by a high frequency induction melting-liquid quenching roll solidification method (twin roll or single roll quenching method). A rapidly quenched ribbon (ribbon) alloy is obtained by this. Incidentally, the liquid quenching roll solidification method is often used as a method for fabricating an amorphous alloy, and there are a great number of findings on the method itself. Incidentally, the liquid quenching roll solidification method can be carried out by using a commercially available liquid quenching solidification apparatus (for example, a liquid quenching solidification apparatus Model NEV-A05 manufactured by NISSIN GIKEN Corporation).

More specifically, the mother alloy is placed in a melting apparatus (for example, a quartz nozzle) which equipped with a spray nozzle and installed in a chamber which is purged with Ar and has a reduced and adjusted gauge pressure, melted in a predetermined temperature region by proper melting means (for example, high frequency induction heating), and sprayed onto a metal or ceramic roll (particular, a Cu roll exhibiting excellent thermal conductivity) rotating at a predetermined number of revolutions at a predetermined spraying pressure by using a liquid quenching solidification apparatus Model NEV-A05 manufactured by NISSIN GIKEN Corporation, whereby a ribbon-like alloy (rapidly quenched ribbon (ribbon) alloy) to be continuously and horizontally formed on the roll can be fabricated.

At this time, it is desirable to purge the atmosphere in the chamber with an inert gas (He gas, Ne gas, Ar gas, $N_2$ gas, or the like). After the atmosphere is purged with an inert gas, it is desirable to adjust the gauge pressure in the chamber to a range of from −0.03 to −0.07 MPa (0.03 to 0.07 MPa as the absolute pressure).

The melting temperature of the mother alloy in the melting apparatus (for example, a quartz nozzle) equipped with a spray nozzle may be equal to or higher than the melting point of the alloy. In addition, conventionally known melting means such as high frequency induction heating can be used as the melting means.

It is desirable to adjust the spraying pressure of the mother alloy from the nozzle of the melting apparatus (for example, a quartz nozzle) equipped with a spray nozzle to a range of from 0.03 to 0.09 MPa as the gauge pressure. The spraying pressure can be adjusted by a conventionally known method. In addition, it is desirable to adjust the differential pressure between the internal pressure of the chamber and the spraying pressure to a range of from 0.06 to 0.16 MPa.

It is desirable to adjust the number of revolutions and peripheral velocity of the roll when spraying the mother alloy to a range of from 4000 to 6000 rpm (peripheral velocity: from 40 to 65 m/sec).

The cooling velocity of the ribbon-like alloy (rapidly quenched ribbon (ribbon) alloy) is preferably 1,600,000° C./sec or more, more preferably 2,000,000° C./sec or more, still more preferably 3,000,000° C./sec or more, and particularly preferably 4,000,000° C./sec or more. The method for determining the cooling velocity is as described in FIGS. 37 to 39. By adjusting the cooling velocity to be in the above range, it is possible to fabricate a Si-containing alloy having the microstructure according to an embodiment of the present invention described above.

(Step of pulverizing rapidly quenched ribbon (ribbon) alloy) Subsequently, a pulverization treatment of the ribbon-like alloy (rapidly quenched ribbon (ribbon) alloy) obtained above is performed. For example, proper pulverizing balls (for example, zirconia pulverizing balls) and the rapidly quenched ribbon (ribbon) alloy are introduced into a proper pulverizing pot (for example, a zirconia pulverizing pot) and the pulverization treatment is performed at a predetermined number of revolutions for a predetermined time by using a proper pulverizing apparatus (for example, a planetary ball milling apparatus P-6 manufactured by Fritsch GmbH). The rapidly quenched ribbon (ribbon) alloy may be previously coarsely pulverized by using a proper pulverizer to a size in which the alloy is easily introduced into the pulverizing apparatus.

As the conditions for pulverization treatment, the number of revolutions of the pulverizer (milling apparatus) may be, for example, in a range in which the microstructure of alloy formed by the liquid quenching roll solidification method is not impaired, and it is in a range of less than 500 rpm, preferably from 100 to 480 rpm, and more preferably from 300 to 450 rpm. The pulverization time may be, for example, in a range in which the microstructure of alloy formed by the liquid quenching roll solidification method is not impaired, and it is in a range of less than 12 hours, preferably from 0.5 to 10 hours, and more preferably from 0.5 to 3 hours.

The pulverization treatment is usually performed in a dry atmosphere, but the particle size distribution after the pulverization treatment may greatly vary. For this reason, the pulverization treatment and classification treatment for adjusting the particle size may be performed one or more times in combination.

(Mechanical Alloying Treatment)

Subsequently to the step of fabricating the rapidly quenched ribbon (ribbon) alloy, the ribbon-like alloy (rapidly quenched ribbon (ribbon) alloy) thus obtained may be subjected to a mechanical alloying treatment if necessary. At this time, a step of pulverizing the rapidly quenched ribbon (ribbon) alloy may be carried out, and the pulverized material thus obtained may be subjected to a mechanical alloying treatment if necessary.

The mechanical alloying treatment can be performed by a conventionally known method. For example, alloying can be achieved by introducing the pulverizing balls and the raw material powders of alloy into the pulverizing pot and increasing the number of revolutions to apply high energy to the materials by using a ball milling apparatus (for example, a planetary ball milling apparatus). The number of revolutions of the ball milling apparatus is, for example, 500 rpm or more and preferably 600 rpm or more. In addition, the time for the mechanical alloying treatment is, for example, 12 hours or more, preferably 24 hours or more, more preferably 30 hours or more, still more preferably 36 hours or more, particularly preferably 42 hours or more, and most preferably 48 hours or more. Incidentally, the upper limit value of the time for the alloying treatment is not particularly set, but it may be usually 72 hours or less.

The mechanical alloying treatment by the method described above is usually performed in a dry atmosphere, but the particle size distribution after the mechanical alloying treatment may significantly greatly vary in some cases. Hence, it is preferable to perform the pulverization treatment and/or classification treatment for adjusting the particle size.

The predetermined alloy to be essentially contained in the negative electrode active material layer has been described above, but the negative electrode active material layer may contain other negative electrode active materials. Examples of the negative electrode active material other than the predetermined alloy may include carbon such as natural graphite, artificial graphite, carbon black, activated carbon, carbon fiber, coke, soft carbon, or hard carbon, a pure metal such as Si or Sn, or an alloy-based active material having a composition ratio which deviates from the predetermined composition ratio described above, or a metal oxide such as $TiO$, $Ti_2O_3$, or $TiO_2$ or $SiO_2$, $SiO$, or $SnO_2$, a complex oxide of lithium and a transition metal such as $Li_{4/3}Ti_{5/3}O_4$ or $Li_7MnN$, Li—Pb alloy, Li—Al alloy, or Li. However, from the viewpoint of sufficiently exerting the action and effect to be exerted by using the predetermined alloy as a negative electrode active material, the content of the predetermined alloy in 100% by mass of the total amount of the negative electrode active material is preferably from 50 to 100% by mass, more preferably from 80 to 100% by mass, still more preferably from 90 to 100% by mass, particularly preferably from 95 to 100% by mass, and most preferably 100% by mass.

(Amorphous Phase Forming Ability)

In the present embodiment, the microstructure of the Si-containing alloy preferably has a first phase containing a silicide of a transition metal as a main component and a second phase containing Sn and Al in part and amorphous or low crystalline Si as a main component and further has a structure of which a part is composed of a plurality of independent first phases and a part has a eutectic structure composed of the first phase and the second phase as described above. In order to efficiently exert the effect of the present invention, it is preferable that the Si phase (second phase) in the eutectic structure is sufficiently amorphized.

The critical cooling velocity, the liquidus temperature, the $T_0$ curve, the glass transition temperature, the crystallization temperature and the like are used as a specific index of amorphous phase forming ability. Among these, amorphous phase forming ability can be compared by the critical cooling velocity even in a case in which the alloy systems are different from one another.

The critical cooling velocity is the lowest cooling velocity at which an atom or a molecule forms an amorphous phase. It is possible to produce an alloy having an amorphous phase by setting the cooling velocity in the production of the alloy to be equal to or higher than the critical cooling velocity. In other words, an alloy composition having a slow critical cooling velocity is considered to have high amorphous phase forming ability since it can be amorphized even when being slowly cooled.

In a preferred embodiment of the production method of the present invention, the critical cooling velocity F of the liquid phase composition at the start of eutectic formation in the mother alloy composition is $3.2 \times 10^8$ K/sec or less, preferably $3.0 \times 10^8$ K/sec or less from the viewpoint of sufficiently amorphizing the second phase in the eutectic structure. The critical cooling velocity F is more preferably $2.8 \times 10^8$ K/sec or less, still more preferably $2.7 \times 10^8$ K/sec or less, and particularly preferably $2.6 \times 10^8$ K/sec or less. In addition, the lower limit of the critical cooling velocity F is not particularly limited, and it is, for example, $4.0 \times 10^7$ K/sec or more.

Hereinafter, calculation of the critical cooling velocity of the liquid phase composition at the start of eutectic formation in the alloy composition will be described by taking the alloy composition used in Example 1 as an example. For the alloy compositions of Examples 2 to 8 and Comparative Examples 1 and 2 as well, the critical cooling velocity of the liquid phase composition at the start of eutectic formation can be determined by the same method.

[Calculation of Liquid Phase Composition at Start of Eutectic Formation by Thermo-Calc's Scheil Solidification Simulator]

The Scheil solidification simulation of the Si—Al—Ti ternary alloy of Example 1 was performed using the Scheil model, the integrated thermodynamic calculation system: Thermo-Calc Ver2015a developed by Thermo-Calc software AB Sweden (Japan Agency: Itochu Techno-Solutions Corporation) and solid solution general purpose database: SSOL5 (SGTE* Solution Database, ver. 5.0) as a thermodynamic database. The Scheil model and the Scheil solidification simulation are performed in conformity to Metal vol. 77, No. 8 (p. 898 to p. 904). Incidentally, in the Scheil model conditions, it is assumed that the atomic diffusion in the solid phase can be neglected, the substances are completed mixed in the liquid phase, the solid-liquid interface is smooth, local equilibrium is established at the solid-liquid interface, the solidification direction is one direction, the solidification starts at liquidus temperature, and the latent heat of solidification rapidly moves.

*SGTE: Scientific Group Thermodata Europe

The liquid phase composition at the start of eutectic formation in the alloy composition can be determined by the Scheil solidification simulation.

In the alloy composition of Example 1, as illustrated in FIG. 16(a), the structure is composed of a proeutectic silicide ($TiSi_2$) and a eutectic ($TiSi_2$+Si) and there are a small number of Si phases and Al single phases. In other words, the precipitated phase is a silicide ($TiSi_2$) phase and a Si phase. Here, the composition of the solid phase is considered to be constant regardless of the temperature, and it is thus considered that the actual state is well reproduced even when such Scheil model is used. In addition, as illustrated in FIGS. 16(a), 16(b), and 16(c), the liquid phase composition at the start of eutectic formation is $Si_{64.6}Sn_{14.1}Ti_{18.0}Al_{3.2}$ in the alloy composition of Example 1. Incidentally, the same results have been obtained in the alloy compositions of other Examples as well (not illustrated; the liquid phase compositions at the start of eutectic formation are illustrated in FIG. 15(b), FIG. 19(b), FIG. 22(b), FIG. 25(b), FIG. 26(b), FIG. 28(b), FIG. 30(b), FIG. 32(b), FIG. 34(b), and FIG. 36(b)).

[Calculation of Amorphous Phase Formation Ability]

The amorphous phase forming ability is evaluated at the critical cooling velocity at which crystals are crystallized from the liquid phase. A TTT diagram (isothermal transformation diagram) which represents the time required for the crystal to grow until the volume fraction X is obtained when the liquid phase is rapidly cooled from the liquid phase single phase region to a temperature T to be equal to or lower than the liquidus temperature and kept isothermally, and the critical cooling velocity is calculated from this. The thermodynamic quantity required is determined using the thermodynamic calculation software Thermo-Calc Ver2015a and thermodynamic database: SSOL5, and the TTT diagram is calculated.

Hereinafter, a method for calculating the TTT diagram will be described. For a method for calculating the critical cooling velocity, for example, Metal Vol. 77 (2007) No. 10 (p. 1148 to p. 1153) can be referred to.

The following Equation (1) (volume fraction of crystals generated at the retention time: t: X, nucleation frequency: I, and nucleation rate: U) of Johnson-Mehl-Avrami's kinetic handling based on the homogeneous nucleation and growth theory is derived as the following Equation (2) by Davies and Uhlmann.

[Mathematical Formula 1]

$$X = 1 - \exp\left(-\frac{\pi}{3}IU^3 t^n\right) \quad (1)$$

[Mathematical Formula 2]

$$t = \frac{9.3\eta}{kT}\left\{\frac{a_0^9}{f^3 N_v}\frac{\exp(G^*/kT)}{[1-\exp(-G_m/RT)]^3}\right\}^{1/4} \quad (2)$$

Here, $G_m$ denotes the driving force for crystallizing a crystal from a liquid phase, $G^*$ denotes the free energy for generating a spherical crystal nucleus from a liquid phase, $\eta$ denotes the viscosity coefficient, and $N_v$ denotes the number of atoms per unit volume.

$G^*$ can be expressed as $\sigma_m$ (solid-liquid interface energy) by the following Equation (3). In addition, $G_m$ can be approximated by the following Equation (4). $\sigma_m$ is empirically expressed as the following Equation (5) and is indicated to be about 0.41 by Saunders and Miodownik.

[Mathematical Formula 3]

$$G^* = \frac{16\pi \sigma_m^3}{3N_v G_m^2} \quad (3)$$

[Mathematical Formula 4]

$$G_m \cong H_m^f\left(\frac{T_m - T}{T_m}\right) \quad (4)$$

$H_m^f$: Melting enthalpy
$T_m$: Liquidus temperature

[Mathematical Formula 5]

$$\sigma_m = \alpha H_m^f \quad (5)$$

f denotes the proportion of sites at which atoms can move at the solid-liquid interface and is expressed as the following Equation (6) according to Uhlmann.

[Mathematical Formula 6]

$$f = 0.2\left(\frac{T_m - T}{T_m}\right) \quad (6)$$

The viscosity coefficient $\eta$ of the liquid alloy can be approximated by the Doolittle equation (following Equation (7)). Here, A, B and C denote constants. $f_T$ denotes the relative free volume in the liquid, and $E_H$ denotes the void formation energy. According to Ramachandrarao, $E_H$ can be estimated from $T_g$ (glass transition temperature) as presented in the following Equation (8). Here, the constants A and C in the following Equation (7) were calculated on the assumption that $T_g=0.6T_m$, $f_T=0.03$, $\eta=10^{12}$ Pa·S, and B=1.

[Mathematical Formula 7]

$$\eta = A\exp(B/f_T)$$

$$f_T = C\exp(-E_H/RT) \quad (7)$$

[Mathematical Formula 8]

$$E_H = 57.8T_g - 5850 \quad (8)$$

Figure 45:
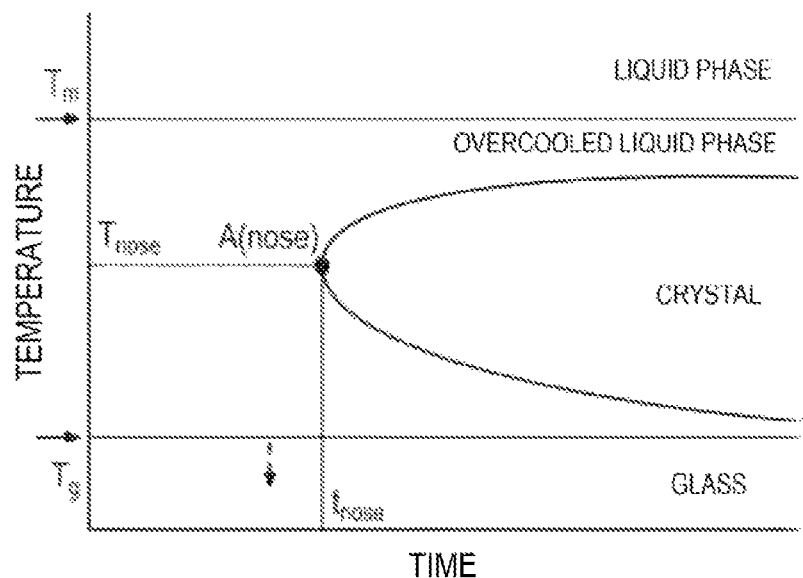
FIG. 45 is a schematic diagram of a TTT diagram.

For the alloy composition of Example 1, the composition at the start of eutectic formation was determined by the Scheil solidification simulation described above, then the glass transition temperature, the liquidus temperature and the melting enthalpy were determined, the TTT diagram (FIG. 45) was calculated by Equation (2) above, and the critical cooling velocity $R_c$ was calculated by the following Equation (9). The TTT diagram for the alloy composition of Example 1 is illustrated in FIG. 15(b).

[Mathematical Formula 9]

$$R_c \cong \frac{T_m - T_{nose}}{t_{nose}} \quad (9)$$

By the above, the critical cooling velocity is calculated to be 1.39E+08 K/sec in the alloy composition of Example 1.

In addition, in the production method of the present invention, the critical cooling velocity F of the liquid phase composition at the start of eutectic formation in the mother alloy composition of the Si-containing alloy and the ratio E of a silicide of a transition metal in the eutectic structure to silicides of all transition metals in the rapidly quenched ribbon of the Si-containing alloy satisfy preferably E/F>1.7× $10^{-9}$ sec/K, more preferably E/F>2.2×$10^{-9}$ sec/K, and still more preferably E/F>2.3×$10^{-9}$ sec/K. In addition, the upper limit of the E/F is not particularly limited as long as the range of the critical cooling velocity F described above and the range of the ratio F to be described below are satisfied.

As described above, it is preferable that the critical cooling velocity F of the liquid phase composition at the start of eutectic formation in the mother alloy composition of the Si-containing alloy is slow from the viewpoint of amorphous phase forming ability. On the other hand, it is preferable that a silicide of a transition metal (first phase) exists in the eutectic structure in a larger amount from the viewpoint of suppressing expansion of the a-Si phase (second phase) in the eutectic structure in the charge and discharge process.

Hence, the effect of the present invention can be more efficiently exerted as E/F is in the above range.

The ratio E of a silicide of a transition metal in the eutectic structure to silicides of all transition metals in the rapidly quenched ribbon of the Si-containing alloy can be calculated by the precipitation calculation described above.

Figure 15A:
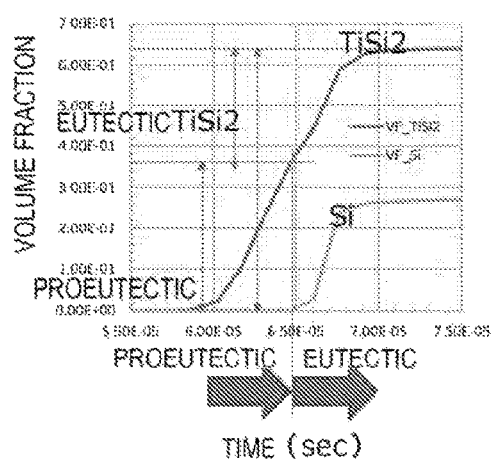
FIG. 15(a) is a diagram illustrating the time courses of the volume fractions of $TiSi_2$ and Si obtained by subjecting an alloy composition (alloy seed) $Si_{60.0}Sn_{8.1}Ti_{30.1}Al_{1.8}$ (mass ratio) of Example 1 to precipitation simulation.
Figure 15B:
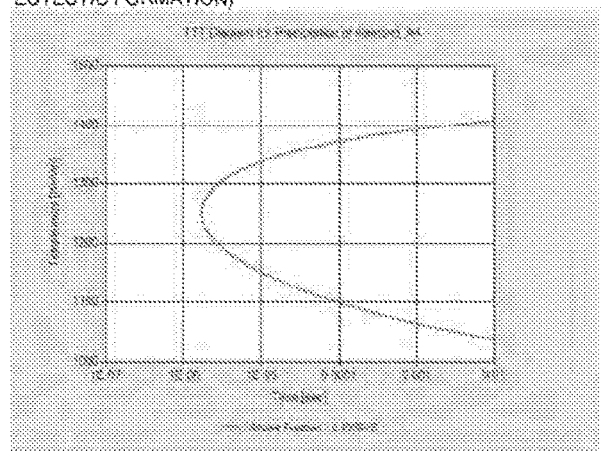
FIG. 15(b) is a TTT diagram for precipitation of Si in the liquid phase composition ($Si_{64.6}Sn_{14.2}Ti_{18.0}Al_{3.2}$) at the start of eutectic formation in the alloy composition (alloy seed) of Example 1.
Figure 19B:
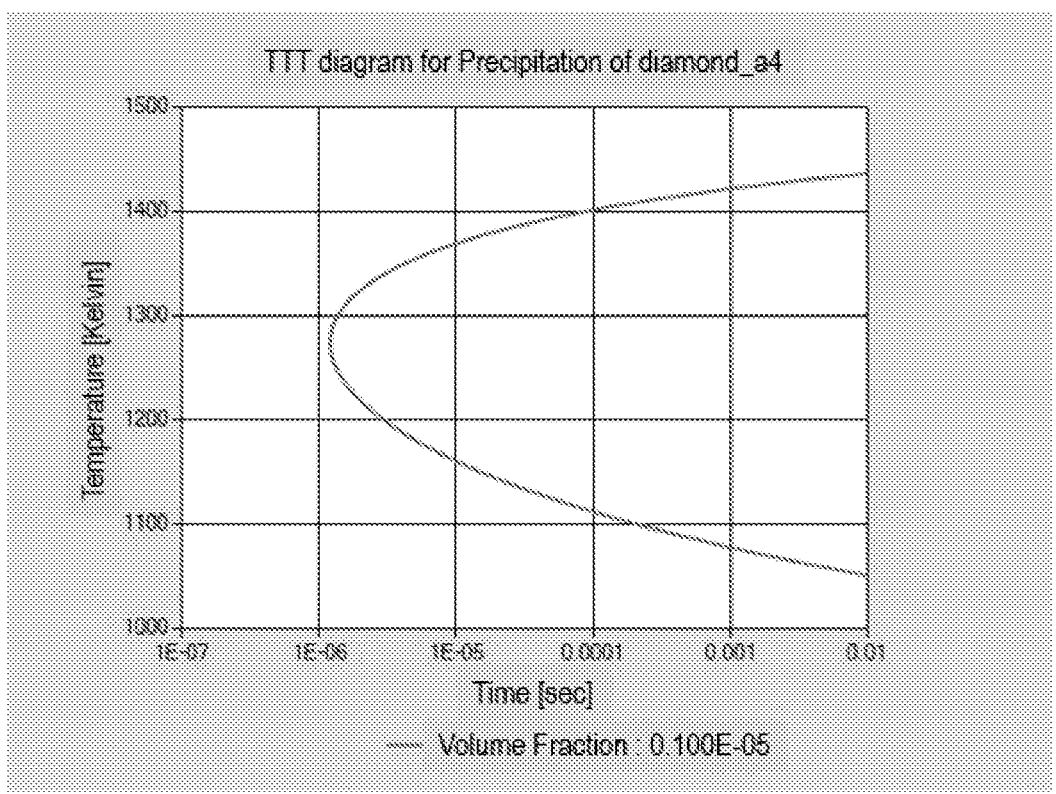
FIG. 19(b) is a TTT diagram for precipitation of Si in the liquid phase composition ($Si_{70.9}Sn_{70.8}Ti_{20.6}Al_{0.6}$) at the start of eutectic formation in the alloy composition (alloy seed) of Example 2.

FIG. 15(a) is a graph illustrating the results on the precipitation simulation of $TiSi_2$ and Si in Example 1. In FIG. 15(a), the vertical axis represents the volume fraction and the horizontal axis represents the time. FIG. 15(a) illustrates that silicide ($TiSi_2$) crystallizes as a proeutectic and then Si crystallizes. In other words, it can be seen that $TiSi_2$ crystallizes as a proeutectic until Si crystallizes and $TiSi_2$ and Si form a eutectic after Si is crystallized. By the above, the ratio E of a silicide of a transition metal in the eutectic structure to silicides of all transition metals in the rapidly quenched ribbon of the Si-containing alloy can be calculated. In other Examples as well, the same as the above can be said from FIGS. 19(a), 22(a), 24(a), 26(a), 28(a), 30(a), and 32(a), which illustrate the results on the same precipitation simulation, and the ratio E described above can be calculated (see the respective drawings and Table 1).

The ratio E of a silicide of a transition metal in the eutectic structure to silicides of all transition metals is preferably 0.3 or more, more preferably 0.35 or more, still more preferably 0.4 or more, and yet more preferably 0.43 or more from the viewpoint of suppressing expansion of the a-Si phase (second phase) in the eutectic structure in the charge and discharge process. The upper limit of the ratio E is not particularly limited, but it is, for example, 0.8 or less and preferably 0.7 or less.

Subsequently, the negative electrode active material layer 13 contains a binder.

(Binder)

A binder is added for the purpose of binding the active materials with each other or the active material with the current collector and thus maintaining the electrode structure. The kind of binder to be used in the negative electrode active material layer is also not particularly limited, and those described above as the binder to be used in the positive electrode active material layer can be used in the same manner. Hence, the detailed description thereon will be omitted here.

Incidentally, the amount of the binder to be contained in the negative electrode active material layer is not particularly limited as long as it is an amount in which the active material can be bound, but it is preferably from 0.5% to 20% by mass and more preferably from 1% to 15% by mass with respect to the negative electrode active material layer.

(Requirements Common to Positive Electrode and Negative Electrode Active Material Layers 15 and 13)

Hereinafter, the requirements common to the positive electrode and negative electrode active material layers 15 and 13 will be described.

The positive electrode active material layer 15 and the negative electrode active material layer 13 contain a conductive auxiliary, an electrolyte salt (lithium salt), an ion conductive polymer, and the like if necessary. In particular, the negative electrode active material layer 13 essentially contains a conductive auxiliary as well.

(Conductive Auxiliary)

The conductive auxiliary refers to an additive to be compounded for improving the electrical conductivity of the positive electrode active material layer or the negative electrode active material layer. Examples of the conductive auxiliary may include carbon materials such as carbon black such as acetylene black, graphite, and a vapor-grown carbon fiber. The electronic network inside the active material layer is effectively formed when the active material layer contains a conductive auxiliary, and this can contribute to the improvement in output characteristics of the battery.

The content of the conductive auxiliary to be mixed in the active material layer is in a range of 1% by mass or more, more preferably 3% by mass or more, and still more preferably 5% by mass or more with respect to the total amount of the active material layer. In addition, the content of the conductive auxiliary to be mixed in the active material layer is in a range of preferably 15% by mass or less, more preferably 10% by mass or less, still more preferably 7% by mass or less with respect to the total amount of the active material layer. The electron conductivity of the active material itself is low, the electrode resistance can be decreased depending on the amount of the conductive auxiliary, and the following effects are exerted by regulating the compounding ratio (content) of the conductive auxiliary in the active material layer to be in the above range. In other words, it is possible to sufficiently ensure the electron conductivity without hindering the electrode reaction, to suppress a decrease in energy density due to a decrease in electrode density, and thus to attain the improvement in energy density due to the improvement in electrode density.

In addition, a conductive binder having the functions of both a conductive auxiliary and a binder may be used instead of these conductive auxiliary and binder or may be concurrently used with one or both of these conductive auxiliary and binder. As the conductive binder, commercially available TAB-2 (manufactured by Hohsen Corp.) can be used.

(Electrolyte Salt (Lithium Salt))

Examples of the electrolyte salt (lithium salt) may include $Li(C_2F_5SO_2)_2N$, $LiPF_6$, $LiBF_4$, $LiClO_4$, $LiAsF_6$, and $LiCF_3SO_3$.

(Ion Conductive Polymer)

Examples of the ion conductive polymer may include a polyethylene oxide-based (PEO) polymer and a polypropylene oxide-based (PPO) polymer.

The compounding ratio of the components to be contained in the positive electrode active material layer and the negative electrode active material layer is not particularly limited. The compounding ratio can be adjusted by appropriately referring to known knowledge on nonaqueous solvent secondary batteries.

The thickness of each active material layer (the active material layer on one side of the current collector) is also not particularly limited, and conventionally known knowledge on batteries can be appropriately referred to. As an example, the thickness of each active material layer is usually about from 1 to 500 μm and preferably from 2 to 100 μm in consideration of the intended use (output-oriented, energy-oriented or the like) of the battery and ion conductivity.

<Current Collector>

The current collectors 11 and 12 are composed of a conductive material. The size of the current collector is determined depending on the intended use of the battery. For example, a current collector having a large area is used when being used in a large-sized battery required to have a high energy density.

The thickness of the current collector is also not particularly limited. The thickness of the current collector is usually about from 1 to 100 μm.

The shape of the current collector is also not particularly limited. In the stacked type battery 10 illustrated in FIG. 1, a mesh shape (expanded grid or the like) or the like can be used in addition to the current collecting foil.

Incidentally, it is desirable to use a current collecting foil in the case of directly forming a thin film alloy of the negative electrode active material on the negative electrode current collector 11 by a sputtering method or the like.

The material constituting the current collector is not particularly limited. For example, a metal or a resin in which a conductive filler is added to a conductive polymer material or a nonconductive polymer material can be adopted.

Specifically, examples of the metal may include aluminum, nickel, iron, stainless steel, titanium, and copper. In addition to these, a clad material of nickel with aluminum, a clad material of copper with aluminum, a plated material of a combination of these metals, or the like can be preferably used. In addition, it may be a foil fabricated by covering aluminum on a metal surface. Among these, aluminum, stainless steel, copper, and nickel are preferable from the viewpoints of electron conductivity, action potential of battery, adhesive property of the negative electrode active material to the current collector by sputtering, and the like.

In addition, examples of the conductive polymer material may include polyaniline, polypyrrole, polythiophene, polyacetylene, polyparaphenylene, polyphenylenevinylene, polyacrylonitrile, and polyoxadiazole. Such a conductive polymer material exhibits sufficient electrical conductivity even without adding a conductive filler thereto and the conductive polymer material is thus advantageous from the viewpoint of facilitating the manufacturing process or saving the weight of the current collector.

Examples of the nonconductive polymer material may include polyethylene (PE; high density polyethylene (HDPE), low density polyethylene (LDPE), and the like), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), or polystyrene (PS). Such a nonconductive polymer material can exhibit excellent electric potential resistance or solvent resistance.

A conductive filler can be added to the conductive polymer material or nonconductive polymer material described above if necessary. A conductive filler is necessarily essential in order to impart electrical conductivity to the resin particularly in a case in which the resin to be the base material of the current collector is composed only of a nonconductive polymer.

The conductive filler can be used without being particularly limited as long as it is a substance exhibiting electrical conductivity. Examples of a material exhibiting excellent electrical conductivity, electric potential resistance, or lithium ion shielding property may include a metal and conductive carbon. The metal is not particularly limited, but it is preferable to contain at least one kind of metal selected from the group consisting of Ni, Ti, Al, Cu, Pt, Fe, Cr, Sn, Zn, In, Sb, and K or alloys or metal oxides containing these metals. In addition, the conductive carbon is not particularly limited. It is preferably one that contains at least one kind selected from the group consisting of acetylene black, vulcan, black pearl, carbon nanofiber, Ketjen black, carbon nanotube, carbon nanohorn, carbon nanoballoon, and fullerene.

The amount of the conductive filler added is not particularly limited as long as it is an amount in which sufficient electrical conductivity can be imparted to the current collector, and it is generally about from 5% to 35% by mass.

<Electrolyte Layer>

As the electrolyte constituting the electrolyte layer 17, a liquid electrolyte or a polymer electrolyte can be used.

The liquid electrolyte has a form in which a lithium salt (electrolyte salt) is dissolved in an organic solvent. Examples of the organic solvent may include carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC).

In addition, as the lithium salt, it is possible to adopt a compound that can be added to the active material layer of an electrode such as $Li(CF_3SO_2)_2N$, $Li(C_2F_5SO_2)_2N$, $LiPF_6$, $LiBF_4$, $LiAsF_6$, $LiTaF_6$, $LiClO_4$, or $LiCF_3SO_3$.

Meanwhile, the polymer electrolyte is classified into a gel electrolyte containing an electrolytic solution and an intrinsic polymer electrolyte which does not contain an electrolytic solution.

The gel electrolyte has a configuration in which the liquid electrolyte (electrolytic solution) is injected into a matrix polymer composed of an ion conductive polymer. It is excellent to use a gel polymer electrolyte as the electrolyte from the viewpoint of eliminating the fluidity of the electrolyte and easily shielding the ionic conduction between the respective layers.

Examples of the ion conductive polymer to be used as the matrix polymer may include polyethylene oxide (PEO), polypropylene oxide (PPO), and a copolymer thereof. Such a polyalkylene oxide-based polymer can readily dissolve an electrolyte salt such as a lithium salt.

The proportion of the liquid electrolyte (electrolytic solution) in the gel electrolyte is not particularly limited, but it is desirably set to about from several percent by mass to 98% by mass from the viewpoint of ionic conductance and the like. In the present embodiment, there is an effect particularly for a gel electrolyte containing a large amount of electrolytic solution, namely, having a proportion of the electrolytic solution of 70% by mass or more.

Incidentally, a separator may be used in the electrolyte layer in a case in which the electrolyte layer is composed of a liquid electrolyte, a gel electrolyte, or an intrinsic polymer electrolyte. Examples of the specific form of the separator (including a nonwoven fabric) may include a microporous membrane formed of a polyolefin such as polyethylene or polypropylene, a porous flat plate, and further a nonwoven fabric.

The intrinsic polymer electrolyte has a configuration in which a supporting salt (lithium salt) is dissolved in the matrix polymer described above, and it does not contain an organic solvent which is a plasticizer. Hence, liquid leakage from the battery is not concerned and the reliability of the battery can be improved in a case in which the electrolyte layer is composed of the intrinsic polymer electrolyte.

A matrix polymer of the gel electrolyte or the intrinsic polymer electrolyte can exert excellent mechanical strength by forming a crosslinked structure. In order to form a crosslinked structure, a polymerizable polymer (for example, PEO or PPO) for forming a polymer electrolyte may be subjected to a polymerization treatment such as heat polymerization, ultraviolet polymerization, radiation polymerization, or electron beam polymerization using a proper polymerization initiator.

<Current Collecting Plate and Lead>

A current collecting plate may be used for the purpose of taking out the electric current to the outside of the battery.

The current collecting plate is electrically connected to the current collector and the lead and taken out to the outside of the laminate sheet which is a battery exterior material.

The material constituting the current collecting plate is not particularly limited and a known highly conductive material, which have been conventionally used as a current collecting plate for lithium ion secondary battery, can be used. As the material constituting the current collecting plate, for example, metal materials such as aluminum, copper, titanium, nickel, stainless steel (SUS), and any alloy thereof are preferable, and aluminum, copper, and the like are more preferable from the viewpoint of light weight, corrosion resistance, and high electrical conductivity. Incidentally, the same material or different materials may be used in the positive electrode current collecting plate and the negative electrode current collecting plate.

A positive electrode terminal lead and a negative electrode terminal lead are used if necessary. As a material for the positive electrode terminal lead and the negative electrode terminal lead, a known terminal lead to be used in a lithium ion secondary battery can be used. Incidentally, it is preferable that the portion to be taken out from a battery exterior material 29 is covered with a heat-shrinkable tube which exhibits heat resistance and insulation property or the like so as not to come into contact with peripheral devices, wires, and the like, to cause a leak of electricity, and thus to affect the products (for example, automotive parts, particularly electronic devices, and the like)

<Battery Exterior Material>

As the battery exterior material 29, a known metal can case can be used and also a bag-like case which is formed of a laminate film containing aluminum and can cover the power generating element can be used. As the laminate film, for example, a laminate film having a three-layer structure formed by laminating PP, aluminum, and nylon in this order can be used, but it is not limited thereto at all. A laminate film is desirable from the viewpoint of exhibiting a high output and excellent cooling performance and being able to be suitably utilized in batteries for large-sized devices for EV and HEV.

Incidentally, the lithium ion secondary battery can be produced by a conventionally known production method.

<Configuration of Appearance of Lithium Ion Secondary Battery>

FIG. 2 is a perspective view illustrating the appearance of a stacked type flat lithium ion secondary battery.

As illustrated in FIG. 2, a stacked type flat lithium ion secondary battery 50 has a rectangular flat shape, and a positive electrode current collecting plate 59 and a negative electrode current collecting plate 58 for taking out the electric power are drawn out through both side portions of the battery. A power generating element 57 is wrapped with a battery exterior material 52 of the lithium ion secondary battery 50, the periphery of the battery exterior material 52 is heat-sealed, and the power generating element 57 is hermetically sealed in a state in which the positive electrode current collecting plate 59 and the negative electrode current collecting plate 58 are drawn out to the outside. Here, the power generating element 57 corresponds to the power generating element 21 of the lithium ion secondary battery (stacked type battery) 10 illustrated in FIG. 1. The power generating element 57 is formed by stacking a plurality of single cell layers (single cells) 19 composed of the positive electrode (positive electrode active material layer) 15, the electrolyte layer 17, and the negative electrode (negative electrode active material layer) 13.

Incidentally, the lithium ion secondary battery is not limited to a stacked type one having a flat shape (laminate cell). The lithium ion secondary battery may be one having a cylindrical shape (coin cell) or one having a prismatic shape (square cell) as a wound type lithium ion battery, one obtained by deforming the one having a cylindrical shape to have a rectangular flat shape, and further a cylindrical cell, and it is not particularly limited. In one having a cylindrical or prismatic shape, a laminate film or a conventional cylindrical can (metal can) may be used as the exterior material thereof, and the exterior material is not particularly limited. Preferably, the power generating element is cased with an aluminum laminate film. The weight saving can be achieved by this form.

In addition, taking out of the positive electrode current collecting plate 59 and the negative electrode current collecting plate 58 illustrated in FIG. 2 is also not particularly limited. The positive electrode current collecting plate 59 and the negative electrode current collecting plate 58 may be drawn out through the same side or each of the positive electrode current collecting plate 59 and the negative electrode current collecting plate 58 may be divided into a plurality of pieces and taken out through the respective sides, and the taking out is not limited to that illustrated in FIG. 2. In addition, in a wound type lithium ion battery, a terminal may be formed by utilizing, for example, a cylindrical can (metal can) instead of a current collecting plate.

As described above, the negative electrode and the lithium ion secondary battery which are formed by using the negative electrode active material for lithium ion secondary battery of the present embodiment can be suitably utilized as a large capacity power source for electric vehicles, hybrid electric vehicles, fuel cell vehicles, hybrid fuel cell vehicles, and the like. In other words, these can be suitably utilized in a power source for driving a vehicle or an auxiliary power source to be demanded to have a high volumetric energy density and a high volumetric output density.

Incidentally, in the above embodiment, a lithium ion battery has been exemplified as an electrical device, but the electrical device is not limited thereto, and the negative electrode active material for a lithium ion secondary battery can also be applied to other types of secondary batteries and even primary batteries. In addition, it can be applied not only to batteries but also to capacitors.

EXAMPLES

The present invention will be described in more detail with reference to the following Examples. However, the technical scope of the present invention is not limited to only the following Examples.

Example 1

[Fabrication of Silicon-Containing Alloy]

An alloy seed was set to $Si_{60.0}Sn_{8.1}Ti_{30.1}Al_{1.8}$ (Si 60.0% by mass-Sn 8.1% by mass-Ti 30.1% by mass-Al 1.8% by mass) and fabricated by a liquid quenching solidification method. Details will be described below. Specifically, an ingot alloy of a silicon alloy (Si 60.0% by mass, Sn 8.1% by mass, Ti 30.1% by mass, and Al 1.8% by mass) was fabricated using a high purity metal Si ingot (5 N), a high purity Sn plate (3 N), a high purity Ti wire (3 N), and a high purity Al shot (3 N) by an arc melting method. The ingot alloy was coarsely pulverized to a diameter of about 2 mm so as to be easily introduced into a quartz nozzle.

Subsequently, a ribbon-like alloy=rapidly quenched ribbon (ribbon) alloy was fabricated as a Si-containing alloy using the coarsely pulverized powder of the ingot alloy as a mother alloy by a liquid quenching solidification method. Specifically, the mother alloy of $Si_{60.0}Sn_{8.1}Ti_{30.1}Al_{1.8}$ was placed in a quartz nozzle installed in a chamber, which was purged with Ar and had a reduced gauge pressure of −0.03 Mpa, and melted by high frequency induction heating by using a liquid quenching solidification apparatus Model NEV-A05 manufactured by NISSIN GIKEN Corporation. Thereafter, the molten mother alloy was sprayed onto a Cu roll rotating at a number of revolutions of 4000 rpm (peripheral velocity: 41.9 μm/sec) at a spraying pressure of 0.05 MPa, thereby fabricating a ribbon-like alloy. Incidentally, the cooling velocity of the alloy in the liquid quenching solidification method was $4.6 \times 10^{6\circ}$ C./sec. The thickness of the ribbon-like alloy (rapidly quenched ribbon alloy) obtained was 20 μm.

Thereafter, the ribbon-like alloy (rapidly quenched ribbon alloy) obtained was subjected to a pulverization treatment. Specifically, the ribbon-like alloy (rapidly quenched ribbon alloy) was coarsely pulverized to a diameter of about 2 mm so as to be easily introduced into a ball milling apparatus. Next, zirconia pulverizing balls and the coarsely pulverized powder of the ribbon-like alloy (rapidly quenched ribbon alloy) were introduced into a zirconia pulverizing pot and then subjected to a pulverization treatment at 400 rpm for 1 hour by using a planetary ball milling apparatus P-6 manufactured by Fritsch GmbH, thereby obtaining a Si-containing alloy (negative electrode active material) having the same alloy composition as that of the alloy seed. The average particle diameter D50 of the Si-containing alloy (negative electrode active material) powder thus obtained was 6.7 μm and D90 was 20.6 μm.

[Fabrication of Negative Electrode]

Mixed were 80 parts by mass of the silicon-containing alloy ($Si_{60.0}Sn_{8.1}Ti_{30.1}Al_{1.8}$) of the negative electrode active material thus produced, 5 parts by mass of acetylene black of a conductive auxiliary, and 15 parts by mass of polyamide-imide of a binder, and the mixture obtained was dispersed in N-methylpyrrolidone to obtain a negative electrode slurry. Subsequently, the negative electrode slurry thus obtained was uniformly applied on both sides of a negative electrode current collector formed of a copper foil so that the thickness of each negative electrode active material layer was 30 μm, and dried in a vacuum for 24 hours, thereby obtaining a negative electrode.

[Fabrication of Lithium Ion Secondary Battery (Coin Cell)]

The negative electrode thus fabricated and the counter electrode Li were allowed to face each other, and a separator (polyolefin, film thickness: 20 μm) was disposed therebetween. Subsequently, the stacked body of the negative electrode, the separator, and the counter electrode Li was disposed on the bottom side of a coin cell (CR 2032, material: stainless steel (SUS 316)). Furthermore, a gasket was fitted to the coin cell to maintain the insulation property between the positive electrode and the negative electrode, the following electrolytic solution was injected into the coin cell by using a syringe, a spring and a spacer were stacked thereon, the upper side of the coin cell was superimposed thereon, and caulking was performed to hermetically seal the coin cell, thereby obtaining a lithium ion secondary battery (coin cell).

Incidentally, a solution prepared by dissolving lithium hexafluorophosphate ($LiPF_6$) in an organic solvent in which ethylene carbonate (EC) and diethyl carbonate (DEC) were mixed at a proportion of EC:DEC=1:2 (volume ratio) so as to have a concentration of 1 mol/L was used as the electrolytic solution.

Example 2

A negative electrode active material, a negative electrode, and a lithium ion secondary battery (coin cell) were fabricated by the same method as in Example 1 described above except that the alloy seed was changed to $Si_{64.7}Sn_{5.0}Ti_29.9Al_{0.4}$ (Si 64.7% by mass-Sn 5.0% by mass-Ti 29.9% by mass-Al 0.4% by mass). The thickness of the ribbon-like alloy (rapidly quenched ribbon alloy) thus obtained was 21.5 μm. In addition, the average particle diameter D50 of the Si-containing alloy (negative electrode active material) powder thus obtained was 5.0 μm and D90 was 16.7 μm.

Example 3

A negative electrode active material, a negative electrode, and a lithium ion secondary battery (coin cell) were fabricated by the same method as in Example 1 described above except that the alloy seed was changed to $Si_{64.0}Sn_{4.9}Ti_{30.0}Al_{1.1}$ (Si 64.0% by mass-Sn 4.9% by mass-Ti 30.0% by mass-Al 1.1% by mass). The thickness of the ribbon-like alloy (rapidly quenched ribbon alloy) thus obtained was 19.5 μm. In addition, the average particle diameter D50 of the Si-containing alloy (negative electrode active material) powder thus obtained was 4.5 μm and D90 was 16.9 μm.

Example 4

A negative electrode active material, a negative electrode, and a lithium ion secondary battery (coin cell) were fabricated by the same method as in Example 1 described above except that the alloy seed was changed to $Si_{64.6}Sn_{5.0}Ti_{29.8}Al_{0.6}$ (Si 64.6% by mass-Sn 5.0% by mass-Ti 29.8% by mass-Al 0.6% by mass).

Example 5

A negative electrode active material, a negative electrode, and a lithium ion secondary battery (coin cell) were fabricated by the same method as in Example 1 described above except that the alloy seed was changed to $Si_{59.3}Sn_{9.9}Ti_{29.7}Al_{1.1}$ (Si 59.3% by mass-Sn 9.9% by mass-Ti 29.7% by mass-Al 1.1% by mass).

Example 6

A negative electrode active material, a negative electrode, and a lithium ion secondary battery (coin cell) were fabricated by the same method as in Example 1 described above except that the alloy seed was changed to $Si_{65.5}Sn_{30.0}Ti_{30.0}Al$. (Si 65.5% by mass-Sn 3.0% by mass-Ti 30.0% by mass-Al 1.5% by mass).

Example 7

A negative electrode active material, a negative electrode, and a lithium ion secondary battery (coin cell) were fabricated by the same method as in Example 1 described above except that the alloy seed was changed to $Si_{63.2}Sn_{5.0}Ti_{30.0}Al_{1.1}$ (Si 63.2% by mass-Sn 5.0% by mass-Ti 30.0% by mass-Al 1.8% by mass).

Example 8

A negative electrode active material, a negative electrode, and a lithium ion secondary battery (coin cell) were fabricated by the same method as in Example 1 described above except that the alloy seed was changed to $Si_{66.5}Sn_{2.0}Ti_{30.0}Al_{1.5}$ (Si 66.5% by mass-Sn 2.0% by mass-Ti 30.0% by mass-Al 1.5% by mass).

Comparative Example 1

A negative electrode active material, a negative electrode, and a lithium ion secondary battery (coin cell) were fabricated by the same method as in Example 1 described above except that the alloy seed was changed to $Si_{65.0}Sn_{5.0}Ti_{30.0}$ (Si 65.0% by mass-Sn 5.0% by mass-Ti 30.0% by mass). The thickness of the ribbon-like alloy (rapidly quenched ribbon alloy) thus obtained was 20 μm. In addition, the average particle diameter D50 of the Si-containing alloy (negative electrode active material) powder thus obtained was 7 μm and D90 was 20 μm.

Comparative Example 2

A negative electrode active material, a negative electrode, and a lithium ion secondary battery (coin cell) were fabricated by the same method as in Example 1 described above except that the alloy seed was changed to $Si_{60.0}Sn_{10.0}Ti_{30.0}$ (Si 60.0% by mass-Sn 10.0% by mass-Ti 30.0% by mass). The thickness of the ribbon-like alloy (rapidly quenched ribbon alloy) thus obtained was 21 μm. In addition, the average particle diameter D50 of the Si-containing alloy (negative electrode active material) powder thus obtained was 7 μm and D90 was 20 μm.

[Analysis on Structural Constitution of Negative Electrode Active Material]

The structural constitution (microstructure) of the negative electrode active material (silicon-containing alloy) fabricated in Example 1 was analyzed. Details are as described above with reference to FIG. 3 to FIG. 13. It has been confirmed that the microstructure of the Si-containing alloy of Example 1 has a first phase containing a silicide ($TiSi_2$) of a Ti element which is a transition metal and a second phase (a-Si phase) containing tin (Sn) and aluminum (Al) in part and containing amorphous or low crystalline Si as a main component and further has a structure of which a part is composed of a plurality of independent first phases and a part has a eutectic structure composed of the first phase and the second phase.

Incidentally, the same results as in Example 1 were obtained in Examples 2 to 8 although the results except the cross-sectional SEM images (FIG. 17 and FIG. 20) of Examples 2 and 3 are not illustrated. In other words, it has been confirmed that the microstructures of the Si-containing alloys of Examples 2 to 8 also have a first phase containing a silicide ($TiSi_2$) of a Ti element which is a transition metal and a second phase (a-Si phase) containing tin (Sn) and aluminum (Al) in part and containing amorphous or low crystalline Si as a main component and further have a structure of which a part is composed of a plurality of independent first phases and a part has a eutectic structure composed of the first phase and the second phase.

The modal radii of the independent first phases and the first phases and second phases in the eutectic structure of the negative electrode active material (Si-containing alloy) fabricated in Example 1 are as described above with reference to FIG. 14. In addition, the modal radii of the independent first phase and the first phase and second phase in the eutectic structure of the negative electrode active materials (Si-containing alloys) fabricated in Examples 2 to 8 and Comparative Examples 1 and 2 were calculated by the precipitation calculation described above. The results obtained are illustrated in FIG. 18, FIG. 21, FIG. 23, FIG. 25, FIG. 27, FIG. 29, FIG. 31, FIG. 33, and FIG. 35. The results on the modal radii of the precipitated phases are illustrated in FIG. 14, FIG. 18, FIG. 21, FIG. 23, FIG. 25, FIG. 27, FIG. 29, FIG. 31, FIG. 33, FIG. 35, and the following Table 1.

In addition, the ratio E of a silicide of a transition metal in the eutectic structure to silicides of all transition metals in the rapidly quenched ribbon in the Si-containing alloy was calculated from the results (FIG. 15) on the precipitation simulation of $TiSi_2$ and Si in the alloy composition of Example 1. The ratio E of a silicide of a transition metal in the eutectic structure to silicides of all transition metals in the rapidly quenched ribbon in the Si-containing alloy was calculated in the same manner from the results (FIG. 19, FIG. 22, FIG. 24, FIG. 26, FIG. 28, FIG. 30, FIG. 32, FIG. 34, and FIG. 36) on the precipitation simulation of $TiSi_2$ and Si in the alloy compositions of Examples 2 to 8 and Comparative Examples 1 and 2 as well. The results on these are illustrated in FIG. 15(a), FIG. 19(a), FIG. 22(a), FIG. 24(a), FIG. 26(a), FIG. 28(a), FIG. 30(a), FIG. 32(a), FIG. 34(a), FIG. 36(a), and Table 1.

[Evaluation on Amorphous Phase Forming Ability (Critical Cooling Velocity)]

In the negative electrode active material (Si-containing alloy) fabricated in Example 1, the critical cooling velocity in the liquid phase composition at the start of eutectic formation of the mother alloy composition is as described above with reference to FIG. 15. In addition, in the negative electrode active material (Si-containing alloy) fabricated in each of Examples 2 to 8 and Comparative Examples 1 and 2, the critical cooling velocity in the liquid phase composition at the start of eutectic formation of the mother alloy composition was calculated (FIG. 19, FIG. 22, FIG. 24, FIG. 26, FIG. 28, FIG. 30, FIG. 32, FIG. 34, and FIG. 36). The results on these are illustrated in FIG. 15(b), FIG. 19(b), FIG. 22(b), FIG. 24(b), FIG. 26(b), FIG. 28(b), FIG. 30(b), FIG. 32(b), FIG. 34(b), FIG. 36(b), and Table 1.

TABLE 1

| | Composition of Si-containing alloy | Atomic ratio of Sn to Al (Sn:Al) | Modal radius A of independent first phases | Eutectic structure — Modal radius B of first phases | Eutectic structure — Modal radius C of second phases | Eutectic structure — Modal radius B of first phases/modal radius C of second phases (= D3) | Modal radius A of independent first phases/modal radius C of second phases of eutectic structure (= D2) | E | F | E/F |
|---|---|---|---|---|---|---|---|---|---|---|
| Example 1 | $Si_{60.0}Sn_{8.1}Ti_{30.1}Al_{1.8}$ | 1:1 | 220 | 45 | 63 | 0.71 | 3.49 | 0.438 | 1.9E+08 | 2.3E−09 |
| Example 2 | $Si_{64.7}Sn_{5.0}Ti_{29.9}Al_{0.4}$ | 3:1 | 250 | 66 | 60 | 1.10 | 4.17 | 0.651 | 2.6E+08 | 2.5E−09 |
| Example 3 | $Si_{64.0}Sn_{4.9}Ti_{30.0}Al_{1.1}$ | 1:1 | 240 | 60 | 60 | 1.00 | 4.00 | 0.492 | 2.1E+08 | 2.4E−09 |
| Example 4 | $Si_{64.6}Sn_{5.0}Ti_{29.9}Al_{0.6}$ | 2:1 | 248 | 66 | 58 | 1.14 | 4.28 | 0.645 | 2.5E+08 | 2.6E−09 |

TABLE 1-continued

| | Composition of Si-containing alloy | Atomic ratio of Sn to Al (Sn:Al) | Modal radius A of independent first phases | Modal radius (nm) Eutectic structure | | Modal radius A of independent first phases/modal radius C of eutectic structure (= D2) | E | F | E/F |
|---|---|---|---|---|---|---|---|---|---|
| | | | | Modal radius B of first phases | Modal radius C of second phases | Modal radius B of first phases/modal radius C of second phases (= D3) | | | |
| Example 5 | $Si_{59.3}Sn_{9.9}Ti_{29.7}Al_{1.1}$ | 2:1 | 230 | 53 | 57 | 0.93 | 4.04 | 0.431 | 2.6E+08 | 1.7E−09 |
| Example 6 | $Si_{65.5}Sn_{3.0}Ti_{30.0.4}l_{1.5}$ | 0.45:1 | 233 | 57 | 61 | 0.93 | 3.82 | 0.639 | 1.6E+08 | 4.1E−09 |
| Example 7 | $Si_{63.2}Sn_{5.0}Ti_{30.0}Al_{1.8}$ | 0.62:1 | 225 | 53 | 64 | 0.83 | 3.52 | 0.468 | 1.6E+08 | 3.0E−09 |
| Example 8 | $Si_{66.5}Sn_{2.0}Ti_{30.0}Al_{1.5}$ | 0.3:1 | 233 | 57 | 60 | 0.93 | 3.82 | 0.656 | 1.5E+08 | 4.4E−09 |
| Comparative Example 1 | $Si_{65.0}Sn_{5.0}Ti_{30.0}$ | — | 255 | 70 | 55 | 1.27 | 4.64 | 0.635 | 3.1E+08 | 2.1E−09 |
| Comparative Example 2 | $Si_{60.0}Sn_{10.0}Ti_{30.0}$ | — | 253 | 55 | 50 | 1.10 | 5.06 | 0.455 | 4.3E+08 | 1.1E−09 |

Modal radius B of first phases/modal radius C of second phases: the ratio of the modal radius B of the first phases to the modal radius C of the second phases in the eutectic structure: D3
Modal radius A of independent first phases/modal radius C of second phases of eutectic structure: the ratio of the modal radius A of the independent first phases to the modal radius C of the second phases in the eutectic structure: D2
E: the ratio E of a silicide of a transition metal in the eutectic structure to silicides of all transition metals in the rapidly quenched ribbon of the Si-containing alloy
F: the critical cooling velocity of the liquid phase composition at the start of eutectic formation in the mother alloy (alloy seed) composition (K/sec)

[Evaluation on Cycle Durability]

The cycle durability of each lithium ion secondary battery (coin cell) fabricated in each of Examples 1 to 3 and Comparative Examples 1 and 2 was evaluated under the following charge and discharge test conditions.

(Charge and Discharge Test Conditions)

1) Charge and discharge tester: HJ 0501 SM8A (manufactured by HOKUTO DENKO CORP.)

2) Charge and discharge conditions [charge process] 0.3 C, 2 V→10 mV (constant current and constant voltage mode)

[discharge process] 0.3 C, 10 mV→2 V (constant current mode)

3) Thermostatic chamber: PFU-3K (manufactured by ESPEC CORP.)

4) Evaluation temperature: 300 K (27° C.).

The evaluation cell was charged from 2 V to 10 mV at 0.1 mA in a constant current and constant voltage mode in a thermostatic chamber set at the above evaluation temperature by using a charge and discharge tester in the charge process (referred to as the process of intercalating Li into the evaluation electrode). Thereafter, the evaluation cell was discharged from 10 mV to 2 V at 0.3 C in a constant current mode in the discharge process (referred to as the process of deintercalating Li from the evaluation electrode). The charge and discharge cycle described above was taken as one cycle, and the charge and discharge test was performed from the initial cycle (1st cycle) to the 50th cycle under the same charge and discharge conditions. Thereafter, the results for the proportion (discharge capacity retention [%]) of the discharge capacity in the 50th cycle to the discharge capacity in the 1st cycle are illustrated in FIG. 46 and the following Table 2.

TABLE 2

| | Initial capacity (mAh/g) | | | Discharge capacity retention (%) (after 50 cycles) |
|---|---|---|---|---|
| | Charge capacity | Discharge capacity | Efficiency (%) | |
| Example 1 | 1247 | 1076 | 86.3 | 96.4 |
| Example 2 | 1414 | 1237 | 87.4 | 90.1 |
| Example 3 | 1411 | 1228 | 87.0 | 79.8 |
| Comparative Example 1 | 1393 | 1223 | 87.8 | 73.6 |
| Comparative Example 2 | 1450 | 1256 | 86.6 | 71.5 |

From the results presented in Table 2 above, it can be seen that the lithium ion batteries in which the negative electrode active material according to the present invention is used exhibit excellent cycle durability as the discharge capacity retention after 50 cycles is maintained at a high value. In addition, the capacity is higher in Examples in which the Si-containing alloy negative electrode is used than in a negative electrode active material in which a carbon material is used (the corresponding Comparative Example is omitted since this fact is known so much (see the background art) and there is no need to show Comparative Example using a negative electrode material). It is considered that the reason why the high cycle durability can be realized while such a high capacity is exhibited is because the Si-containing alloy constituting the negative electrode active material has a quaternary alloy composition to be represented by Si—Sn-M-Al (M is one or two or more transition metal elements). On the other hand, it can be seen that the cycle durability of the lithium ion batteries in which the negative electrode active materials of Comparative Examples are used is lower than that of the lithium ion batteries in which the negative electrode active materials of Examples are used. It is considered that this is because the stability of the Si-containing alloy in the liquid state is relatively high in the Si—Sn-M-Al alloys of Examples in which Al is contained in a small amount as compared with the Si—Sn—Ti alloys of Comparative Examples to which Al is not added since Si and Al are attracted to each other in the liquid state but repel each other in the solid phase. It is considered that the chemical structure of the Si phase is hardly changed at the time of intercalation and deintercalation of Li associated with charge and discharge and it is possible to exhibit still higher cycle durability since the amorphous phase forming ability of the Si-containing alloy can be enhanced and the degree of amorphousness of the Si phase in the eutectic structure is increased by this.

REFERENCE SIGNS LIST 10, 50 Lithium ion secondary battery (stacked type battery)
11 Negative electrode current collector
12 Positive electrode current collector
13 Negative electrode active material layer
15 Positive electrode active material layer
17 Electrolyte layer
19 Single cell layer
21, 57 Power generating element
25, 58 Negative electrode current collecting plate
27, 59 Positive electrode current collecting plate
29, 52 Battery exterior material (laminate film)

The invention claimed is:

1. A negative electrode active material for an electrical device, comprising a Si-containing alloy having a composition to be represented by the following Chemical Formula (1):

$$Si_xSn_yM_zAl_wA_a \quad (1)$$

wherein M is one or two or more transition metal elements selected from the group consisting of Ti, Zr, Ni, Cu, Mo, Nb, Sc, Co, Cr and Fe, A is an unavoidable impurity, and x, y, z, w, and a represent values of percentage by mass, wherein y, z, and w are $2 \leq y \leq 10$, $25 \leq z \leq 35$, and $0.3 \leq w \leq 3$, respectively, and x and a are remainder, and x+y+z+w+a=100.

2. The negative electrode active material for an electrical device according to claim 1, wherein an atomic ratio of Sn to Al in the Si-containing alloy is from 0.3:1 to 3:1.

3. The negative electrode active material for an electrical device according to claim 1, wherein a microstructure of the Si-containing alloy has a first phase containing a silicide of a transition metal as a main component and a second phase containing Sn and Al in part and amorphous or low crystalline Si as a main component and further has a structure of which a part is composed of a plurality of the first phases which are independent and a part has a eutectic structure composed of the first phase and the second phase.

4. A negative electrode active material for an electrical device, comprising a Si-containing alloy having a composition to be represented by the following Chemical Formula (1):

$$Si_xSn_yM_zAl_wA_a \quad (1)$$

wherein M is one or two or more transition metal elements, A is an unavoidable impurity, and x, y, z, and w represent values of percentage by mass, wherein y, z, and w are $0<y<100$, $0<z<100$, and $0<w<100$, respectively, and x and a are remainder), and wherein a microstructure of the Si-containing alloy has a first phase containing a silicide of a transition metal as a main component and a second phase containing Sn and Al in part and amorphous or low crystalline Si as a main component and further has a structure of which a part is composed of a plurality of the first phases which are independent and a part has a eutectic structure composed of the first phase and the second phase.

5. The negative electrode active material for an electrical device according to claim 3, wherein a modal radius A of the first phases which are independent in the microstructure is 250 nm or less.

6. The negative electrode active material for an electrical device according to claim 3, wherein a ratio of a modal radius A of the first phases which are independent to a modal radius C of the second phases of the eutectic structure in the microstructure: D2 (modal radius A of the first phases which are independent/modal radius C of the second phases of eutectic structure) is 4.5 or less.

7. The negative electrode active material for an electrical device according to claim 3, wherein a ratio of a modal radius B of the first phases to a modal radius C of the second phases in the eutectic structure: D3 (modal radius B of the first phases of the eutectic structure/modal radius C of the second phases of the eutectic structure) is 1 or less.

8. The negative electrode active material for an electrical device according to claim 1, wherein M is Ti.

9. A method for producing the negative electrode active material for an electrical device according to claim 1, the method comprising fabricating a rapidly quenched ribbon of a Si-containing alloy using a mother alloy having the same composition as that of the Si-containing alloy by a liquid quenching solidification method.

10. The production method according to claim 9, wherein a critical cooling velocity F of liquid phase composition at the start of eutectic formation in the mother alloy composition is $3 \times 10^8$ K/sec or less.

11. The negative electrode active material for an electrical device according to claim 10, wherein the critical cooling velocity F and a ratio E of silicide of a transition metal in the eutectic structure to silicide of all transition metals in the rapidly quenched ribbon in the Si-containing alloy satisfy $E/F > 2.2 \times 10^{-9}$ sec/K.

12. A negative electrode for an electrical device, comprising the negative electrode active material for an electrical device according to claim 1.

13. An electrical device comprising the negative electrode for an electrical device according to claim 12.

14. The negative electrode active material for an electrical device according to claim 1, wherein a is less than 0.5 percent by mass.

15. The negative electrode active material for an electrical device according to claim 1, wherein a is less than 0.1 percent by mass.

* * * * *